(12) United States Patent
Toeltsch et al.

(10) Patent No.: US 11,807,655 B2
(45) Date of Patent: Nov. 7, 2023

(54) CATALYSTS

(71) Applicant: BOREALIS AG, Vienna (AT)

(72) Inventors: Wilfried Toeltsch, Linz (AT); Simon Schwarzenberger, Linz (AT); Ismo Lehtiniemi, Porvoo (FI); Luigi Resconi, Linz (AT); Ville Virkkunen, Porvoo (FI); Noureddine Ajellal, Porvoo (FI); Vyatcheslav V. Izmer, Moscow (RU); Dmitry S. Kononovich, Moscow (RU); Alexander Z. Voskoboynikov, Moscow (RU)

(73) Assignee: BOREALIS AG, Vienna (AT)

( * ) Notice: Subject to any disclaimer, the term of this patent is extended or adjusted under 35 U.S.C. 154(b) by 1129 days.

(21) Appl. No.: 16/475,269

(22) PCT Filed: Dec. 21, 2017

(86) PCT No.: PCT/EP2017/084273
§ 371 (c)(1),
(2) Date: Jul. 1, 2019

(87) PCT Pub. No.: WO2018/122134
PCT Pub. Date: Jul. 5, 2018

(65) Prior Publication Data
US 2022/0363703 A1    Nov. 17, 2022

(30) Foreign Application Priority Data
Dec. 29, 2016 (EP) ..................................... 16207302

(51) Int. Cl.
*C07F 17/00* (2006.01)
*C08F 4/6592* (2006.01)
(Continued)

(52) U.S. Cl.
CPC .......... *C07F 17/00* (2013.01); *C08F 4/65912* (2013.01); *C08F 4/65916* (2013.01);
(Continued)

(58) Field of Classification Search
CPC ............................. C07F 17/00; C08F 4/65927
See application file for complete search history.

(56) References Cited

U.S. PATENT DOCUMENTS 6,057,408 A   5/2000  Winter et al.
6,252,019 B1  6/2001  Ewen et al.
(Continued)

FOREIGN PATENT DOCUMENTS

EP    1858907 A1   11/2007
EP    2532687 A2   12/2012
(Continued)

OTHER PUBLICATIONS

PCT/EP2017/084273; International Search Report and Written Opinion dated Apr. 10, 2018 (15 pages).
(Continued)

Primary Examiner — Caixia Lu
(74) Attorney, Agent, or Firm — Meunier Carlin & Curfman LLC

(57) ABSTRACT
Claimed are metallocene-complexes of formula (I) [formula (I')] wherein M is Hf or Zr, L is a bridge comprising 1-2 C- or Si-atoms, The other variables are as defined in the claims.
(Continued)

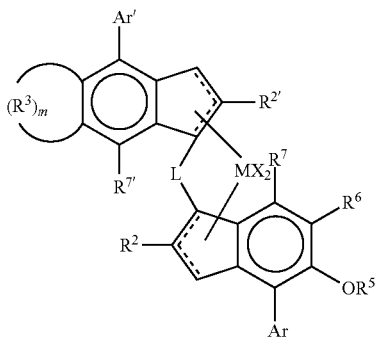

(I')

24 Claims, 4 Drawing Sheets

(51) Int. Cl.
| | | |
|---|---|---|
| C08F 110/06 | (2006.01) | |
| C08F 210/16 | (2006.01) | |
| C08F 4/659 | (2006.01) | |
| C08F 10/06 | (2006.01) | |

(52) U.S. Cl.
CPC .......... *C08F 4/65927* (2013.01); *C08F 10/06* (2013.01); *C08F 110/06* (2013.01); *C08F 210/16* (2013.01)

(56) References Cited

U.S. PATENT DOCUMENTS

| 10,167,355 B2 | 1/2019 | Ajellal et al. |
| 10,301,411 B2 | 5/2019 | Ajellal et al. |
| 2005/0288461 A1 | 12/2005 | Jensen et al. |
| 2008/0081887 A1 | 4/2008 | Wang et al. |
| 2012/0123078 A1 | 5/2012 | Lee et al. |
| 2014/0206819 A1 | 7/2014 | Hafner et al. |
| 2014/0221584 A1 | 8/2014 | Hafner et al. |
| 2015/0337060 A1 | 11/2015 | Castro et al. |
| 2016/0176997 A1 | 6/2016 | Resconi et al. |
| 2017/0037164 A1 | 2/2017 | Ajellal et al. |
| 2017/0037165 A1 | 2/2017 | Ajellal et al. |
| 2017/0342175 A1 | 11/2017 | Hagadorn et al. |
| 2019/0308995 A1 | 10/2019 | Ajellal et al. |

FOREIGN PATENT DOCUMENTS

| EP | 2657285 A1 | 10/2013 |
| EP | 2722346 A1 | 4/2014 |
| EP | 2729529 A1 | 5/2014 |
| EP | 2813517 A1 | 12/2014 |
| EP | 2933275 A1 | 10/2015 |
| EP | 2933277 A1 | 10/2015 |
| EP | 1548018 B1 | 10/2018 |
| EP | 2511305 B1 | 5/2019 |
| WO | 9414856 A1 | 7/1994 |
| WO | 9512622 A1 | 5/1995 |
| WO | 9714727 A1 | 4/1997 |
| WO | 9840331 A1 | 9/1998 |
| WO | 0009515 A1 | 2/2000 |
| WO | 00024792 A1 | 5/2000 |
| WO | 00024793 A1 | 5/2000 |
| WO | 02002576 A1 | 1/2002 |
| WO | 03049856 A1 | 6/2003 |
| WO | 03050131 A1 | 6/2003 |
| WO | 03051934 A2 | 6/2003 |
| WO | 03102042 A1 | 12/2003 |
| WO | 2005058916 A2 | 6/2005 |
| WO | 2006069733 A1 | 7/2006 |
| WO | 2006087497 A2 | 8/2006 |
| WO | 2006097497 A1 | 9/2006 |
| WO | 2006100258 A1 | 9/2006 |
| WO | 2007116034 A1 | 10/2007 |
| WO | 2007122098 A1 | 11/2007 |
| WO | 2009054831 A1 | 4/2009 |
| WO | 2010052260 A1 | 5/2010 |
| WO | 2010052263 A1 | 5/2010 |
| WO | 2010052264 A1 | 5/2010 |
| WO | 2011076443 A1 | 6/2011 |
| WO | 2011076780 A1 | 6/2011 |
| WO | 2011135004 A2 | 11/2011 |
| WO | 2011135005 A2 | 11/2011 |
| WO | 2012001051 A1 | 1/2012 |
| WO | 2012001052 A2 | 1/2012 |
| WO | 2012075560 A1 | 6/2012 |
| WO | 2012084961 A1 | 6/2012 |
| WO | 2013007650 A1 | 1/2013 |
| WO | 2014096171 A1 | 6/2014 |
| WO | 2015158780 A1 | 10/2015 |
| WO | 2015158790 A1 | 10/2015 |
| WO | 2015158790 A2 | 10/2015 |
| WO | 2015158791 A2 | 10/2015 |
| WO | 2016038210 A1 | 3/2016 |
| WO | 2016038211 A1 | 3/2016 |
| WO | 2018091684 A1 | 5/2018 |
| WO | 2018108917 A1 | 6/2018 |
| WO | 2018108918 A1 | 6/2018 |
| WO | 2019002345 A1 | 1/2019 |
| WO | 2019/052820 A1 | 3/2019 |
| WO | 2019179959 A1 | 9/2019 |

OTHER PUBLICATIONS

Nifant'ev, Ilya E. et al., "5-Methoxy-Substituted Zirconium Bis-indenyl ansa-complexes: Synthesis, Structure, and Catalytic Activity in the Polymerization and Copolymerization of Alkenes," Organometallics, 2012, 31, 4962-4970.
Del Hierro et al. Soluble Fraction analysis in propylene, The Column, Feb. 2014, 18-23.
Endres, et al., "Die fluorige Phase: Organische Chemie mit hochfluorierten Reagenzien und Lösungsmitteln", Chemie in unserer Zeit, 2000, 34(6), 382-393.
Ewen, et al., "Crystal structures and stereospecific propylene polymerizations with chiral hafnium metallocene catalysts", JACS, 1987, 109, 6544-6545.
Lo Nostro, , "Phase separation properties of fluorocarbons, hydrocarbons and their copolymers", Advances in Colloid and Interface Science, 1995, 56, 245-287.
Cheng. Carbon-$^{13}$NMR analysis of ethylene-propylene rubbers, Macromolecules, 1984, 17, 1950-1955.
Gahleitner et al. Crystallinity and mechanical properties of PP-homopolymers as influenced by molecular structure and nucleation, Journal of Applied Polymer Science, 1996, 61(4), 649-657.
Grein et al. Impact modified isotactic polypropylene with controlled rubber intrinsic viscosities: Some new aspects about morphology and fracture, Journal of Applied Polymer Science, 2003, 87(10), 1702-1712.
Kuklin et al. Quantitative structure-property relationships in propene polymerization by zirconenes with a rac-SiMe$_2$[Ind]$_2$ based ligand frameworks, Journal of Melcular Catalysis A: Chemical, 2016, 412, 39-46.
Premphet et al. Polypropylene/metallocene ethylene-octene copolymer blends with a bimodal particle size distribution: Mechanical properties and their controlling factors, Jounral of Applied Polymer Science, 2002, 85(11), 2412-2418.
Singh et al. Triad sequence determination of ethylene-propylene copolymers—application of quantitative $^{13}$C NMR, Polymer Testing, 2009, 28(5), 475.
Wang et al. Structural Analysis of Ethylene/Propylene Copolymers Synthesized with a Constrained Geometry Catalyst, Macromolecules, 2000, 33(4), 1157-1162.
Busico et al. Microstructure of polypropylene, Process in Polymer Science, 2001, 26(3), 443-533.

(56) References Cited

OTHER PUBLICATIONS

Busico et al. Full Assignment of the $^{13}$C NMR Spectra of Regioregular Polypropylenes: Methyl and Methylene Region, Macromolecules 1997, 30(20), 6251-6263.

Busico et al., Alk-1-ene Polymerization in the Presence of a Monocyclopentadienyl Zirconium(IV) Actamidinate Catalyst: Microstructural and Mechanistic Insights, Macromol. Rapid Commun, vol. 28, 2007, pp. 1128-1134.

Castignolles et al., Detection and quantification of branching in polyacrylates by size-exclusion chromatography (SEC) and melt-state $^{13}$C NMR spectroscopy, Polymer 50 (2009) 2373-83.

Chukanova, et al., "Polymerization of propylene using isospecific rac-Me2Si(2-Me,4-Phlnd)2ZrCl2 catalyst immobilized on polyethylene with grafted poly(acrylic acid)", Polymer science. Series A, Chemistry, physics 43.8 (2001): 787-792.

Ewen, et al., "Evaluation of the dimethylsilyl-bis(2-methyl-4-phenyl-1-indenyl) ligand with group 4 triad metals in propene polymerizations with methylaluminoxane", Macromolecular Rapid Communications vol. 19, Issue 1, Jan. 1998, pp. 71-73.

Filip, et al., "Heteronuclear decoupling under fast MAS by a rotor-synchronized Hahn-echo pulse train", Journal of Magnetic Resonance, vol. 176, Issue 2, Oct. 2005, pp. 239-243.

Griffin, et al., "Low-load rotor-synchronised Hahn-echo pulse train (RS-HEPT) 1H decoupling in solid-state NMR: factors affecting MAS spin-echo dephasing times.", Mag. Res. in Chem. 2007 45, S1, S198.

Hasegawa et al. High-temperature ethylene/alpha-olefin copolymerization with a zirconene catalyst: Effects of the zirconene ligand and polymerization conditions on copolymerization behavior, Journal of Polymer Science: Part A; Polymer Chemistry, 2000, 38, 4641-4648.

Hintermann, et al., Beilstein J. Org. Chem. 2007, 3, 1-5.

Hopf et al. Highly syndiotactic polypropene with $C_s$-symmetric metallocene/MAO catalysts. Catalysis Communications, 2002, 2, 459.

Kaminsky et al. Polymerization of Ethene and Longer Chained Olefins by Metallocene Catalysis, Macromol Symp 2005, 226, 25.

Kim et al. Ethylene/1-Hexene Copolymerizations of Syndioselective Metallocenes: Direct Comparison of $Me_2C(Cp)(Flu)ZrMe_2$ with $Et(Cp)(Flu)ZrMe_2$, J POlym Sci Part A Polym Chem, 1999, 37, 2763.

Klimke, et al., "Optimisation and Application of Polyolefin Branch Quantification by Melt-State 13C NMR Spectroscopy", Macromolecular Chemistry and Physics vol. 207, Issue 4, Feb. 24, 2006 pp. 382-395.

Liu, et al., "Poly(ethylene-co-1-octene) Characterization by High-Temperature Multidimensional NMR at 750 MHz", Macromolecules 2001, 34, 4757-4767.

Matsubara, et al., "Synthesis and Structures of Nickel Halide Complexes Bearing Mono- and Bis-coordinated N-Heterocyclic Carbene Ligands, Catalyzing Grignard Cross-Coupling Reactions", Organometallics, 2006, 25 (14), pp. 3422-3427.

Parkinson, et al., "Effect of Branch Length on 13C NMR Relaxation Properties in Molten Poly[ethylene-co-($\alpha$-olefin)] Model Systems", Macromol. Chem. Phys. 2007;208:2128-2133.

Parkinson, et al., "NMR Spectroscopy of Polymers: Innovative Strategies for Complex Macromolecules, Chapter 24, 401 (2011)."

Pollard, "Observation of Chain Branching in Polyethylene in the Solid State and Melt via 13C NMR Spectroscopy and Melt NMR Relaxation Time Measurements", Macromolecules, 2004, 37 (3), pp. 813-825.

Qui, et al., "Improved Peak Assignments for the 13C NMR Spectra of Poly(ethylene-co-1-octene)s", Macromolecules 2007, 40, 6879-6884.

Randall, A Review of high resolution liquid $^{13}$Carbon nuclear magnetic resonance characterizations of ethylene-based polymers, Journal of Macromolecular Science, Reviews in Macromolecular Chemistry and Physics, 1989, C29, 201-317.

Resconi et al. Selectivity in Propene Polymerization with Metallocene Catalysts, Chemical Reviews, 2000, 100, 1253-1346.

Song et al. Synthesis of aryl-substituted indanones and indenes via a highly efficient ligand-free palladium-catalyzed Suzuki coupling process, ARKIOVIC, 2016, 4, 306-327.

Stadler et al. Influence of Type and Content of Various Comonomers on Long-Chain Branching of Ethene/alpha-olefin Copolymers, Macromolecules, 2006, 39, 1474.

Stork, et al., "The Stereochemistry of the SN2' Reaction. I. Preparation of Pure trans-6-Alkyl-2-cyclohexen-1-ols", J. Am. Chem. Soc. 1956, 78, 4604-4608.

Tynys et al. Propylene polymerisations with novel heterogeneous combination metallocene catalyst systems, Polymer, 2007, 48, 1893-1902.

Ushakova, et al., Ethylene polymerization and ethylene-1-hexene copolymerization over immobilized metallocene catalysts, Kinetics and Catalysis, Feb. 2012, vol. 53, Issue 1, pp. 75-83.

Wang, et al., "Long Chain Branching in Ethylene Polymerization Using Binary Homogeneous Metallocene Catalyst System", Polymer Reaction Engineering, vol. 7, 1999—Issue 3, pp. 327-346.

Yano et al. Novel zirconocene catalysts for the production of high molecular weight LLDPE in high-temperature polymerization, Macromolecular Chemistry and Physics, 1999, 200(4), 933-941.

Yano et al. Ethylene/1-hexene copolymerization with $Ph_2C(Cp)(Flu)ZrCl_2$ derivatives: correlation between ligand structure and copolymerization behavior at high temperature, Macromolecular Chemistry and Physics, 1999, 200, 1542.

Yano et al. Effect of ligand structures on high temperature homo- and copolymerization of ethylene by cationic hafnocene catalysts based on tetrakis(pentafluorophenyl)borate, Journal of Molecular Catalysis A: Chemical, 2000, 156(1-2), 133-141.

Zhou, et al., "A new decoupling method for accurate quantification of polyethylene copolymer composition and triad sequence distribution with 13C NMR.", J Magn Reson. Aug. 2007;187(2):225-33. Epub May 23, 2007.

CATALYSTS

This invention relates to new bisindenyl ligands, complexes thereof and catalysts comprising those complexes. The invention also relates to the use of the new bisindenyl metallocene catalysts for the production of polypropylene homopolymers or propylene copolymers, especially with ethylene, with high activity levels, high molecular weight, and hence low MFR, and with ideal melting points. The catalysts are especially useful in the manufacture of propylene ethylene copolymers as they exhibit remarkable catalyst activity in such polymerisations.

Metallocene catalysts have been used to manufacture polyolefins for many years. Countless academic and patent publications describe the use of these catalysts in olefin polymerisation. Metallocenes are now used industrially and polyethylenes and polypropylenes in particular are often produced using cyclopentadienyl based catalyst systems with different substitution patterns.

The present inventors sought new metallocenes, which provide high activity, especially in the case of the homopolymerization of propylene or in the case of copolymerization between propylene and ethylene. The desired catalysts should also have improved performance in the production of high melting temperature and high molecular weight polypropylene homopolymers. The desired catalysts should also have improved performance in the production of propylene-ethylene copolymers, for instance having high activity for high Mw copolymer products. The desired catalysts should also provide propylene-ethylene copolymers having desirable melting points. Various prior art references aim for one or more of these features.

$C_2$-symmetric metallocenes are disclosed for example in WO2007/116034. This document reports the synthesis and characterisation of, inter alia, the metallocene rac-Me$_2$Si(2-Me-4-Ph-5-OMe-6-tBuInd)$_2$ZrCl$_2$ and the use of it as a polymerisation catalyst after activation with MAO for the homopolymerisation of propylene and copolymerisation of propylene with ethylene and higher alpha-olefins in solution polymerisation.

WO02/02576 describes, inter alia, rac-Me$_2$Si[2-Me-4-(3,5-tBu$_2$Ph)Ind]$_2$ZrCl$_2$ and rac-Me$_2$Si[2-Me-4-(3,5-tBu$_2$Ph)Ind]$_2$ZrCl$_2$ (see also WO2014/096171) and its use in the manufacture of high Mw and high melting point polypropylene.

WO06/097497 describes, inter alia, rac-Me$_2$Si(2-Me-4-Ph-1,5,6,7-tetrahydro-s-indacen-1-yl)$_2$ZrCl$_2$ supported on silica and its use in the homo- and copolymerisation of propylene with ethylene.

WO2011/076780 describes the use of rac-Me$_2$Si(2-Me-4-Ph-1,5,6,7-tetrahydro-s-indacen-1-yl)$_2$ZrCl$_2$ activated with methylalumoxane in solid particulated form without an external carrier, for propylene homopolymerisation U.S. Pat. No. 6,057,408 describes the influence of the 4-aryl substituent on the molecular weight of ethylene-propylene copolymers produced in liquid slurry.

Asymmetrical metallocenes able to produce isotactic polypropylene have been described in the literature. WO2013/007650, describes certain asymmetrical catalysts comprising alkoxy groups at the 5-position of one of the rings such as dimethylsilylene 6-tert-butyl-5-methoxy-2-methyl-4-phenyl-1H-inden-1-yl)-($\eta^5$-6-tert-butyl-2-methyl-4-phenyl-1H-inden-1-yl)zirconium dichloride. Despite its good performance, catalysts based on this reference are limited in terms of polypropylene homopolymer melting temperature, productivity at low MFR. In addition, the overall productivity of the catalyst still needs to be improved.

WO2015/158790 discloses, inter alia, the complex "2-Zr" [dimethylsilanediyl [$\eta^5$-6-tert-butyl-4-(3,5-di-tert-butylphenyl)-5-methoxy-2-methylinden-1-yl]-[$\eta^5$-4-(3,5-di-tert-butylphenyl)-2-methyl-5,6,7-trihydro-s-indacen-1-yl] zirconium dichloride] and describes the use of this complex in the formation of ethylene/1-octene copolymers in a solution process. A direct comparison is made between a catalyst system of this metallocene, MAO and Trityl tetrakis(pentafluorophenyl)borate, against equivalent systems in which the metallocene is also $C_1$ and has two indenyl ligands "1-Zr" [anti-dimethylsilylene(2-methyl-4-phenyl-5-methoxy-6-tert-butyl-indenyl)(2-methyl-4-(4-tert-butylphenyl)indenyl)zirconium dichloride] or is $C_2$ and has two indacenyl ligands "3-Zr" [dimethylsilylenebis-(2-i-butyl-4-(4'-tert-butylphenyl)-5,6,7-trihydro-s-indacen-1-yl)zirconium dichloride]. The catalyst system containing 2-Zr is found to be inferior in terms of 1-octene incorporation to those containing 1-Zr and 3-Zr.

The catalysts of the invention should ideally be suited for use in solution or in conventional solid supported form, e.g. using silica or alumina supports, or can be used in solid form, however, being free of external support or carrier.

The present applicant has previously developed an alternative to conventional inorganic supports. In WO03/051934, the inventors proposed an alternative form of catalyst which is provided in solid form but does not require a conventional external carrier material such as silica. The invention is based on the finding that a homogeneous catalyst system containing an organometallic compound of a transition metal can be converted, in a controlled way, to solid, uniform catalyst particles by first forming a liquid/liquid emulsion system, which comprises as the dispersed phase, said solution of the homogeneous catalyst system, and as the continuous phase a solvent immiscible therewith, and then solidifying said dispersed droplets to form solid particles comprising the said catalyst.

The invention described in WO03/051934 enabled the formation of solid spherical catalyst particles of said organo transition metal catalyst without using e.g. external porous carrier particles, such as silica, normally required in the art. Thus, problems relating to catalyst silica residues can be solved by this type of catalyst. Further, it could be seen that catalyst particles having improved morphology, will give, due to the replica effect, polymer particles having improved morphology as well. Catalysts of this invention should be able to utilise this method.

The inventors have developed new metallocene catalysts having improved polymerisation behaviour, higher catalyst productivity, improved performance in the production of high molecular weight polypropylene homopolymers, and reduced chain transfer to ethylene, enabling the production of propylene-ethylene copolymers. During copolymer manufacture, the reduced chain transfer to ethylene, enables the production of propylene-ethylene copolymers having higher molecular weights than are currently achievable using alternative $C_1$ metallocenes.

A number of known metallocenes are set out in the table below:

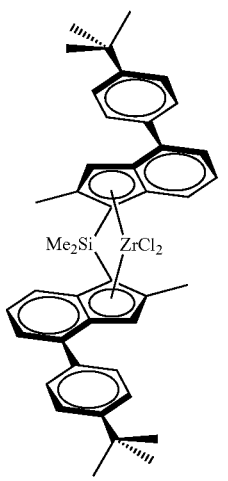

CE3
rac-
dimethylsilanediylbis
[2-methyl-4-(4-tert-
butylphenyl)indenyl]
zirconium dichloride

WO98/040331

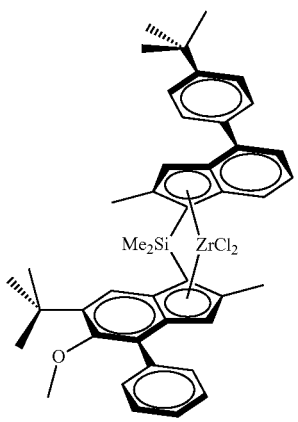

CE2
rac-anti-
dimethylsilanediyl
(2-methyl-4-(4'-
tert-butylphenyl)
inden-1-yl)(2-
methyl-4-phenyl-5-
methoxy-6-tert-
butyl inden-1-yl)
zirconium
dichloride
WO2013/007650

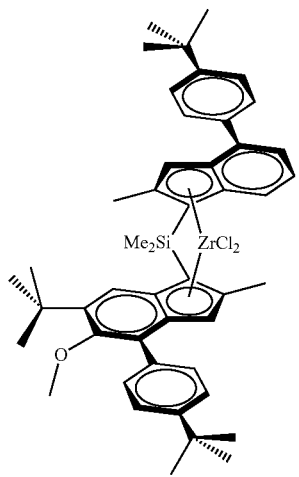

CE1
rac-anti-
dimethylsilanediyl
(2-methyl-4-(4-tert-
butylphenyl) inden-
1-yl)(2-methyl-4-
(4'-tert-
butylphenyl)-5-
methoxy-6-tert-
butyl inden-1-yl)
zirconium
dichloride

WO2013/007650

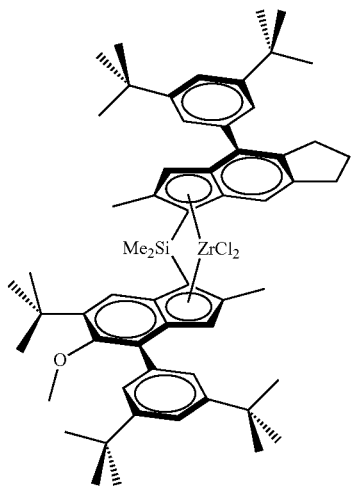

CE4
rac-anti-
dimethylsilanediyl
[2-methyl-4-(3',5'-
di-tert-
butylphenyl)-
1,5,6,7-tetrahydro-
s-indacen-1-yl][2-
methyl-4-(3',5'-di-
tert-butylphenyl)-5-
methoxy-6-tert-
butylinden-1-
yl]zirconium
dichloride
WO2015/158790

The metallocene structures above exhibit moderate activity, and provide high melting polypropylene, or high molecular weight C2/C3 copolymers. However, it would be desirable to provide catalysts which have even higher activity, and which provide higher molecular weight polypropylene and high molecular weight C2/C3 polymers. The present invention solves this problem.

The inventors have now found that further modification of the $C_1$-symmetric metallocene ligand structure provides improved performance in both C3 homopolymerisation and C3/C2 random copolymerisation.

In particular, the catalysts of the invention enable
very high activity in propylene homopolymerisation and propylene ethylene copolymerisation;
improved performance in production of high molecular weight propylene homopolymers;
improved comonomer incorporation in propylene copolymers;
high activity for high Mw polymer products;
desirable melting points.

Moreover, most metallocenes whose structure has been optimized to produce high molecular weight isotactic PP, show molecular weight limitations when used to produce ethylene-propylene copolymers in the gas phase. It is known that tensile and impact properties of a heterophasic PP/EPR, for a given rubber comonomer composition, can be improved by increasing the molecular weight of the rubber phase (as described for example in J. Appl. Polym. Sci. 2002, vol. 85, pp. 2412-2418 and in J. Appl. Polym. Sci. 2003, vol. 87, pp. 1702-1712). In addition, conventional metallocene catalysts produce a homopolymer matrix (hPP) with narrow Mw/Mn (usually below 3.0). It is known that a broad molecular weight distribution (Mw/Mn as measured by GPC) of the hPP matrix is beneficial for processability and stiffness (as described for example in J. Appl. Polym. Sci. 1996, vol. 61, pp. 649-657).

We have additionally found that the metallocene complexes of the invention, thanks to the combination of indenyl ligands having different substitution patterns, can produce ethylene propylene rubber in the gas phase having higher molecular weight compared to metallocenes of the prior art. They can also increase the Mw/Mn of the hPP component within a heterophasic PP/EPR blend. Especially, when producing a reactor blend in three steps (three reactors), the Mw/Mn of the homopolymer matrix can be made relatively broad.

Heterophasic PP/EPR blends can be made with rubber contents above 50 wt %, having good bulk densities and which are free-flowing also at the highest rubber contents.

SUMMARY OF INVENTION

Viewed from one aspect the invention provides a complex of formula (I):

(I')

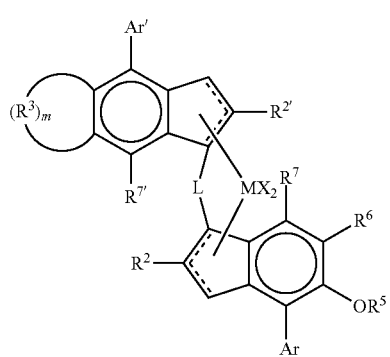

M is Hf or Zr;
each X is a sigma ligand;
L is a bridge of formula -$(ER^8{}_2)_y$—;
y is 1 or 2;
E is C or Si;
each $R^8$ is independently a $C_1$-$C_{20}$-hydrocarbyl, tri($C_1$-$C_{20}$-alky)silyl, $C_6$-$C_{20}$-aryl, $C_7$-$C_{20}$-arylalkyl or $C_7$-$C_{20}$-alkylaryl or L is an alkylene group such as methylene or ethylene;
Ar and Ar' are each independently an aryl or heteroaryl group optionally substituted by 1 to 3 groups $R^1$ or $R^{1'}$ respectively;
$R^1$ and $R^{1'}$ are each independently the same or can be different and are a linear or branched $C_1$-$C_6$-alkyl group, $C_{7\text{-}20}$ arylalkyl, $C_{7\text{-}20}$ alkylaryl group or $C_{6\text{-}20}$ aryl group with the proviso that if there are four or more $R^1$ and groups present in total, one or more of $R^1$ and $R^{1'}$ is other than tert butyl;
$R^2$ and $R^{2'}$ are the same or are different and are a $CH_2$—$R^9$ group, with $R^9$ being H or linear or branched $C_{1\text{-}6}$-alkyl group, $C_{3\text{-}8}$ cycloalkyl group, $C_{6\text{-}10}$ aryl group;
each $R^3$ is a —$CH_2$—, —$CHRx$- or $C(Rx)_2$- group wherein Rx is $C_{1\text{-}4}$ alkyl and where m is 2-6;
$R^5$ is a linear or branched $C_1$-$C_6$-alkyl group, $C_{7\text{-}20}$ arylalkyl, $C_{7\text{-}20}$ alkylaryl group or $C_6$-$C_{20}$-aryl group;
$R^6$ is a $C(R^{10})_3$ group, with $R^{10}$ being a linear or branched $C_1$-$C_6$ alkyl group; and
$R^7$ and $R^{7'}$ are the same or are different and are H or a linear or branched $C_1$-$C_6$-alkyl group.

Viewed from another aspect the invention provides a complex of formula (Ia)

(I)

(Ia)

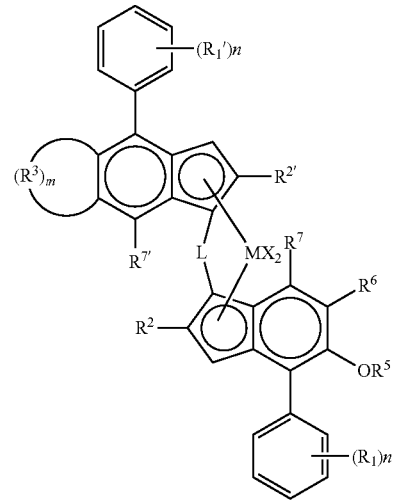

M is Hf or Zr;
each X is a sigma ligand;
L is a bridge of formula -$(ER^8{}_2)_y$—;
y is 1 or 2;
E is C or Si;
each $R^8$ is independently a $C_1$-$C_{20}$-hydrocarbyl, tri($C_1$-$C_{20}$-alky)silyl, $C_6$-$C_{20}$-aryl, $C_7$-$C_{20}$-arylalkyl or $C_7$-$C_{20}$-alkylaryl or L is an alkylene group such as methylene or ethylene;
each n is independently 0, 1, 2 or 3;

$R^1$ and $R^{1'}$ are each independently the same or can be different and are a linear or branched $C_1$-$C_6$-alkyl group, $C_{7-20}$ arylalkyl, $C_{7-20}$ alkylaryl group or $C_{6-20}$ aryl group with the proviso that if there are four or more $R^1$ and R" groups present in total, one or more of $R^1$ and $R^{1'}$ is other than tert butyl;

$R^2$ and $R^{2'}$ are the same or are different and are a $CH_2$—$R^9$ group, with $R^9$ being H or linear or branched $C_{1-6}$-alkyl group, $C_{3-8}$ cycloalkyl group, $C_{6-10}$ aryl group;

each $R^3$ is a —$CH_2$—, —CHRx- or $C(Rx)_2$- wherein Rx is $C_{1-4}$ alkyl and where m is 2-6;

$R^5$ is a linear or branched $C_1$-$C_6$-alkyl group, $C_{7-20}$ arylalkyl, $C_{7-20}$ alkylaryl group or $C_6$-$C_{20}$-aryl group;

$R^6$ is a $C(R^{10})_3$ group, with $R^{10}$ being a linear or branched $C_1$-$C_6$ alkyl group; and $R^7$ and $R^{7'}$ are the same or are different and are H or a linear or branched $C_1$-$C_6$-alkyl group.

In a preferred embodiment of formula (Ia), L isof formula —$SiR^8{}_2$—, wherein each $R^8$ is independently a $C_1$-$C_{20}$-hydrocarbyl, $C_6$-$C_{20}$-aryl, $C_7$-$C_{20}$-arylalkyl or $C_7$-$C_{20}$-alkylaryl.

Viewed from another aspect the invention provides a complex of formula (Ib):

(I)

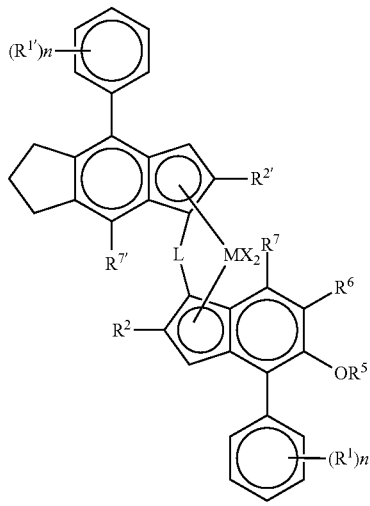

(Ib)

wherein
M is Hf or Zr;
each X is a sigma ligand;
L is an alkylene bridge (e.g. methylene or ethylene) or a bridge of the formula —$SiR^8{}_2$—, wherein each $R^8$ is independently a $C_1$-$C_{20}$-hydrocarbyl, tri($C_1$-$C_{20}$-alkyl) silyl, $C_6$-$C_{20}$-aryl, $C_7$-$C_{20}$-arylalkyl or $C_7$-$C_{20}$-alkylaryl;
each n is independently 0, 1, 2 or 3;
$R^1$ and $R^{1'}$ are each independently the same or can be different and are a linear or branched $C_1$-$C_6$-alkyl group, $C_{7-20}$ arylalkyl, $C_{7-20}$ alkylaryl group or $C_{6-20}$ aryl group with the proviso that if there are four or more $R^1$ and groups present in total, one or more of $R^1$ and $R^{1'}$ is other than tert butyl;
$R^2$ and $R^{2'}$ are the same or are different and are a $CH_2$—$R^9$ group, with $R^9$ being H or linear or branched $C_{1-6}$-alkyl group, $C_{3-8}$ cycloalkyl group, $C_{6-10}$ aryl group;

$R^5$ is a linear or branched $C_1$-$C_6$-alkyl group, $C_{7-20}$ arylalkyl, $C_{7-20}$ alkylaryl group or $C_6$-$C_{20}$-aryl group;
$R^6$ is a $C(R^{10})_3$ group, with $R^{10}$ being a linear or branched $C_1$-$C_6$ alkyl group; and
$R^7$ and $R^{7'}$ are the same or are different and are H or a linear or branched $C_1$-$C_6$-alkyl group.

Viewed from another aspect the invention provides a catalyst comprising
(i) a complex of formula (I) as hereinbefore defined and
(ii) a cocatalyst comprising a compound of a group 13 metal, The catalyst of the invention can be used in non-supported form or in solid form. The catalyst of the invention may be used as a homogeneous catalyst or heterogeneous catalyst.

The catalyst of the invention in solid form, preferably in solid particulate form, can be either supported on an external carrier material, like silica or alumina, or, in a particularly preferred embodiment, is free from an external carrier, however still being in solid form. For example, the solid catalyst isobtainable by a process in which
(a) a liquid/liquid emulsion system is formed, said liquid/liquid emulsion system comprising a solution of the catalyst components (i) and (ii) dispersed in a solvent so as to form dispersed droplets; and
(b) solid particles are formed by solidifying said dispersed droplets.

Viewed from another aspect the invention provides a process for the manufacture of a catalyst as hereinbefore defined comprising obtaining a complex of formula (I) and a cocatalyst as hereinbefore described;
forming a liquid/liquid emulsion system, which comprises a solution of catalyst components (i) and (ii) dispersed in a solvent, and solidifying said dispersed droplets to form solid particles.

Viewed from another aspect the invention provides the use in propylene polymerisation of a catalyst as hereinbefore defined, especially for the formation of a polypropylene homopolymer or propylene copolymer, e.g. with ethylene or a C4-10 alpha olefin such as 1-hexene.

Viewed from another aspect the invention provides a process for the polymerisation propylene comprising reacting propylene and optional comonomers with a catalyst as hereinbefore described, especially for the formation polypropylene homopolymer or propylene copolymer, e.g. with ethylene.

Definitions

Throughout the description the following definitions are employed.

By "free from an external carrier" is meant that the catalyst does not contain an external support, such as an inorganic support, for example, silica or alumina, or an organic polymeric support material.

The term "$C_{1-20}$ hydrocarbyl group" includes $C_{1-20}$ alkyl, $C_{2-20}$ alkenyl, $C_{2-20}$ alkynyl, $C_{3-20}$ cycloalkyl, $C_{3-20}$ cycloalkenyl, $C_{6-20}$ aryl groups, $C_{7-20}$ alkylaryl groups or $C_{7-20}$ arylalkyl groups or of course mixtures of these groups such as cycloalkyl substituted by alkyl. Linear and branched hydrocarbyl groups cannot contain cyclic units. Aliphatic hydrocarbyl groups cannot contain aryl rings.

Unless otherwise stated, preferred $C_{1-20}$ hydrocarbyl groups are $C_{1-20}$ alkyl, $C_{4-20}$ cycloalkyl, $C_{5-20}$ cycloalkyl-alkyl groups, $C_{7-20}$ alkylaryl groups, $C_{7-20}$ arylalkyl groups or $C_{6-20}$ aryl groups, especially $C_{1-10}$ alkyl groups, $C_{6-10}$ aryl groups, or $C_{7-12}$ arylalkyl groups, e.g. $C_{1-8}$ alkyl groups. Most especially preferred hydrocarbyl groups are methyl, ethyl, propyl, isopropyl, tert-butyl, isobutyl, $C_{5-6}$-cycloalkyl, cyclohexylmethyl, phenyl or benzyl.

The term "halo" includes fluoro, chloro, bromo and iodo groups, especially chloro or fluoro groups, when relating to the complex definition.

The oxidation state of the metal ion is governed primarily by the nature of the metal ion in question and the stability of the individual oxidation states of each metal ion.

It will be appreciated that in the complexes of the invention, the metal ion M is coordinated by ligands X so as to satisfy the valency of the metal ion and to fill its available coordination sites. The nature of these σ-ligands can vary greatly.

The terms "C4 phenyl ring" and "C4' phenyl ring" relate to the substituted phenyl rings attached to the 4 and 4' positions of the indenyl and indacenyl rings, respectively. The numbering of these rings will be evident from the structures indicated herein.

Catalyst activity is defined in this application to be the amount of polymer produced/g catalyst/h. Catalyst metal activity is defined here to be the amount of polymer produced/g Metal/h. The term productivity is also sometimes used to indicate the catalyst activity although herein it designates the amount of polymer produced per unit weight of catalyst.

The term "molecular weight" is used herein to refer to weight average molecular weight Mw unless otherwise stated.

There can be up to 6 $R^1$ and $R^{1'}$ groups combined in the complex of formula (I). It is required that if there are four or more $R^1$ and $R^{1'}$ groups, at least one is not tert butyl. There may be 0, 1, 2 or 3 tert butyl groups on the complex but no more.

DETAILED DESCRIPTION OF INVENTION

This invention relates to a series of new ligands, complexes and hence catalysts that are ideal for the polymerisation of propylene. The complexes of the invention are asymmetrical. Asymmetrical means simply that the two ligands forming the metallocene are different, that is, each ligand bears a set of substituents that are chemically different.

The complexes of the invention are preferably chiral, racemic bridged bisindenyl $C_1$-symmetric metallocenes. Although the complexes of the invention are formally $C_1$-symmetric, the complexes ideally retain a pseudo-$C_2$-symmetry since they maintain $C_2$-symmetry in close proximity of the metal center although not at the ligand periphery. By nature of their chemistry both anti and syn enantiomer pairs (in case of $C_1$-symmetric complexes) are formed during the synthesis of the complexes. For the purpose of this invention, racemic-anti means that the two indenyl ligands are oriented in opposite directions with respect to the cyclopentadienyl-metal-cyclopentadienyl plane, while racemic-syn means that the two indenyl ligands are oriented in the same direction with respect to the cyclopentadienyl-metal-cyclopentadienyl plane, as shown in the scheme below.

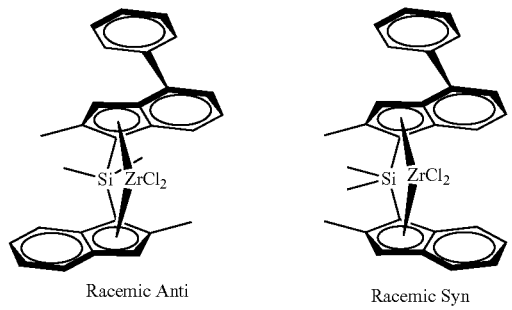

Racemic Anti          Racemic Syn

Formula (I), and any sub formulae, are intended to cover both syn- and anti-configurations. Preferred complexes are in the anti configuration.

It is preferred if the metallocenes of the invention are employed as the racemic or racemic-anti isomers. Ideally therefore at least 95% mol, such as at least 98% mol, especially at least 99% mol of the metallocene is in the racemic or racemic-anti isomeric form.

In the catalysts of the invention the following preferences apply. Catalysts according to the invention are of formula (I):

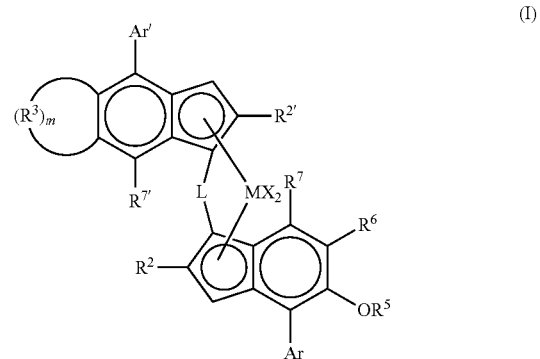

(I)

In a complex of formula (I) it is preferred if M is Zr or Hf, preferably Zr;

Each X is a sigma ligand. Most preferably each X is independently a hydrogen atom, a halogen atom, $C_{1-6}$ alkoxy group or an R group, where R is a $C_{1-6}$ alkyl, phenyl or benzyl group. Most preferably X is chlorine, benzyl or a methyl group. Preferably both X groups are the same. The most preferred options are two chlorides, two methyl or two benzyl groups, especially two chlorides.

L is -$(ER^8{}_2)_y$—. It is preferred if E is Si. It is preferred if y is 1. -$(ER^8{}_2)_y$— is preferably a methylene or ethylene linker or L is a bridge of the formula —$SiR^8{}_2$—, wherein each $R^8$ is independently a $C_1$-$C_{20}$-hydrocarbyl, $C_6$-$C_{20}$-aryl, $C_7$-$C_{20}$-arylalkyl or $C_7$-$C_{20}$-alkylaryl. The term $C_{1-20}$ hydrocarbyl group therefore includes $C_{1-20}$ alkyl, $C_{2-20}$alkenyl, $C_{2-20}$alkynyl, $C_{3-20}$ cycloalkyl, $C_{3-20}$ cycloalkenyl, $C_{6-20}$ aryl groups, $C_{7-20}$alkylaryl groups or $C_{7-20}$ arylalkyl groups or of course mixtures of these groups such as cycloalkyl substituted by alkyl. Unless otherwise stated, preferred $C_{1-20}$ hydrocarbyl groups are $C_{1-20}$ alkyl, $C_{4-20}$ cycloalkyl, $C_{5-20}$ cycloalkyl-alkyl groups, $C_{7-20}$ alkylaryl groups, $C_{7-20}$ arylalkyl groups or $C_{6-20}$ aryl groups. If L is an alkylene linker group, ethylene and methylene are preferred.

Preferably both $R^8$ groups are the same. It is preferred if $R^8$ is a $C_1$-$C_{10}$-hydrocarbyl or $C_6$-$C_{10}$-aryl group, such as methyl, ethyl, propyl, isopropyl, tertbutyl, isobutyl, $C_{5-6}$-cycloalkyl, cyclohexylmethyl, phenyl or benzyl, more preferably both $R^8$ are a $C_1$-$C_6$-alkyl, $C_{3-8}$cycloalkyl or $C_6$-aryl group, such as a $C_1$-$C_4$-alkyl, C5-6 cycloalkyl or $C_6$-aryl group and most preferably both $R^8$ are methyl or one is methyl and another cyclohexyl. Alkylene linkers are preferably methylene or ethylene. L is most preferably —Si(CH$_3$)$_2$—.

Ar and Ar' are preferably phenyl rings.

Each substituent $R^1$ and $R^{1'}$ are independently the same or different, and are preferably a linear or branched $C_1$-$C_6$-alkyl group or $C_{6-20}$ aryl groups, more preferably a linear or branched $C_1$-$C_4$ alkyl group. Preferably each $R^1$ and each $R^{1'}$ are independently methyl, ethyl, isopropyl or —CMe$_3$, especially methyl or —CMe$_3$. Preferably each $R^1$ is the same and each $R^{1'}$ is the same.

Each n is independently 0, 1, 2 or 3, preferably 1 or 2. The total of the two "n" values is ideally 2, 3 or 4. When n is 1 the ring is preferably substituted with the group $R^1$ or $R^{1'}$ at the para position (4 or 4' position). When n is 2 the ring is preferably substituted with the groups $R^1$ or $R^{1'}$ at the ortho positions (3 and 5, or 3' and 5' positions).

In all embodiments of the invention the substitution of the C(4) and C(4') phenyl groups are subject to the proviso that the complex is substituted in total with 0, 1, 2 or 3 CMe$_3$ groups across the C(4) and C(4') phenyl rings combined, preferably 0, 1 or 2 CMe$_3$ groups across the C(4) and C(4') phenyl rings combined. Alternatively stated, if the two n values sum to 4 or more, at least one $R^1$ or group present cannot represent tert butyl.

Ideally, no C(4) or C(4') ring will comprise two branched substituents. If a C(4) or C(4') ring contains two substituents (i.e. n is 2) then it is preferred if $R^1$ or $R^{1'}$ is C1-4 linear alkyl, e.g. methyl.

If a C(4) or C(4') ring contains one substituent (i.e. n is 1) then it is preferred that $R^1$ or $R^{1'}$ is a branched C4-6 alkyl, e.g. tert butyl.

In a particular embodiment, Ar and Ar' in formula I (or any formula below) are independently selected from phenyl rings substituted in the 3,5- or 4-positions with a linear or branched $C_1$-$C_4$ alkyl group; i.e. corresponding to 3,5 or 4-position substitutions with $R^1$ and $R_{1'}$ being a $C_1$-$C_4$ alkyl group and n being 1 or 2. In a particular embodiment, Ar and Ar' in formula I are independently selected from 3,5-dimethyl phenyl, 3,5-ditertbutyl and 4-(tert-butyl)-phenyl. Therefore, in a particular embodiment, in the complex of formula I, both Ar and Ar' are 3,5-dimethyl phenyl, both Ar and Ar' are 4-(tert-butyl)-phenyl, or one of Ar and Ar' is 3,5-dimethyl phenyl and the other is 4-(tert-butyl)-phenyl. Other preferred options include one of Ar or Ar' being 3,5-ditertbutylphenyl with the other being 3,5-dimethylphenyl or 4-tertbutylphenyl. These particular embodiments may be applied to all of the structures II-VIII described herein, where technically viable. In other words, in a particular embodiment, $R^1$, $R^{1'}$ and each independent value of n are selected such that the C(4) or C(4') phenyl rings are 3,5-dimethyl phenyl, 3,5-ditertbutylphenyl and/or 4-(tert-butyl)-phenyl.

In an embodiment at least one of the C(4) or C(4') phenyl rings is 3,5-dimethyl phenyl.

In an embodiment at least one of the C(4) or C(4') phenyl rings is 4-(tert-butyl)-phenyl.

$R^2$ and $R^{2'}$ are each the same or different, and are a CH$_2$—$R^9$ group, with $R^9$ being H or linear or branched $C_1$-$C_6$-alkyl group, like methyl, ethyl, n-propyl, i-propyl, n-butyl, butyl, sec.-butyl and tert.-butyl or $C_{3-8}$cycloalkyl (e.g. cyclohexyl) or $C_{6-10}$ aryl (pref phenyl). Preferably $R^2$ and $R^{2'}$ are the same and are a CH$_2$—$R^9$ group, with $R^9$ being H or linear or branched $C_1$-$C_4$-alkyl group, more preferably $R^2$ and $R^{2'}$ are the same and are a CH$_2$—$R^9$ group, with $R^9$ being H or linear or branched $C_1$-$C_3$-alkyl group. Most preferably $R^2$ and $R^{2'}$ are both methyl.

$R^3$ is preferably —CH$_2$—. The subscript m is preferably 2 to 4, such as 3 (thus forming a 5 membered ring).

$R^5$ is a preferably linear or branched $C_1$-$C_6$-alkyl group or $C_{6-20}$ aryl group, such as methyl, ethyl, n-propyl, i-propyl, n-butyl, i-butyl, sec.-butyl and tert.-butyl, preferably a linear $C_1$-$C_4$-alkyl group, more preferably a $C_1$-$C_2$-alkyl group and most preferably methyl.

$R^6$ is a C($R^{10}$)$_3$ group, with each $R^{10}$ being the same or different and being a linear or branched $C_1$-$C_6$-alkyl group. Preferably each $R^{10}$ are the same or different with $R^{th}$ being a linear or branched $C_1$-$C_4$-alkyl group, more preferably with $R^{10}$ being the same and being a $C_1$-$C_2$-alkyl group. Most preferably $R^6$ is a tert.-butyl group and hence all $R^{10}$ groups are methyl.

$R^7$ and $R^{7'}$ are each the same or different, and are H or a linear or branched $C_1$-$C_6$-alkyl group, preferably H or a linear or branched $C_1$-$C_4$-alkyl group, and more preferably H or a $C_1$-$C_2$-alkyl group. In some embodiments one of $R^7$ or $R^{7'}$ is H and the other is a linear or branched $C_1$-$C_6$-alkyl group, preferably a linear or branched $C_1$-$C_4$-alkyl group and more preferably a $C_1$-$C_2$-alkyl group. It is especially preferred that $R^7$ and $R^{7'}$ are the same. It is most preferred that both $R^7$ and $R^{7'}$ are H.

In a preferred embodiment, the invention provides a complex of formula (II)

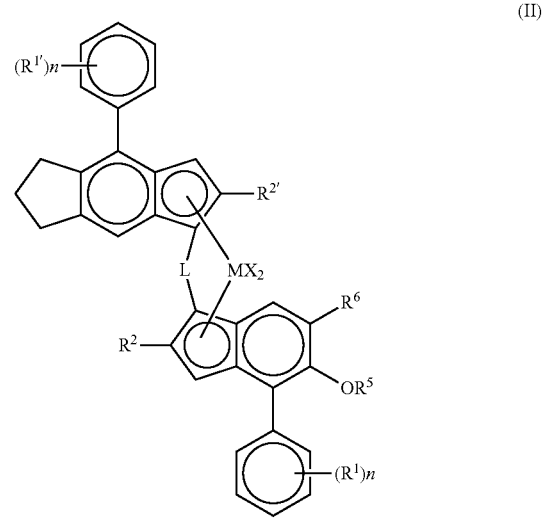

(II)

wherein

M is Hf or Zr;

X is a sigma ligand, preferably each X is independently a hydrogen atom, a halogen atom, $C_{1-6}$ alkoxy group, $C_{1-6}$ alkyl, phenyl or benzyl group;

L is an alkylene bridge or a bridge of the formula —SiR$^8$$_2$—, wherein each $R^8$ is independently $C_1$-$C_6$-alkyl, $C_{3-8}$ cycloalkyl or $C_6$-aryl group;

each n is independently 1 or 2;

$R^1$ and $R^{1'}$ are each independently the same or can be different and are a linear or branched $C_1$-$C_6$-alkyl group with the proviso that if there are four $R^1$ and $R^{1'}$ groups present, all 4 cannot simultaneously be tert butyl;

$R^2$ and $R^{2'}$ are the same or are different and are a CH$_2$—$R^9$ group, with $R^9$ being H or linear or branched $C_{1-6}$-alkyl group;

$R^5$ is a linear or branched $C_1$-$C_6$-alkyl group; and $R^6$ is a C($R^{10}$)$_3$ group, with $R^{10}$ being a linear or branched $C_1$-$C_6$ alkyl group.

In a further preferred embodiment, the invention provides a complex of formula (III)

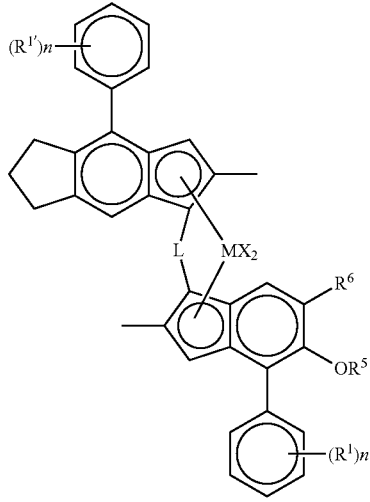

(III)

wherein
M is Hf or Zr;
each X is a sigma ligand, preferably each X is independently a hydrogen atom, a halogen atom, $C_{1-6}$ alkoxy group, $C_{1-6}$ alkyl, phenyl or benzyl group;
L is —$SiR^8_2$—, wherein each $R^8$ is $C_{1-6}$ alkyl or $C_{3-8}$ cycloalkyl;
each n is independently 1 or 2;
$R^1$ and $R^{1'}$ are each independently the same or can be different and are a linear or branched $C_1$-$C_6$-alkyl group, group with the proviso that if there are four $R^1$ and $R^{1'}$ groups present, all 4 cannot simultaneously be tert butyl;
$R^5$ is a linear or branched $C_1$-$C_6$-alkyl group; and
$R^6$ is a $C(R^{10})_3$ group, with $R^{10}$ being a linear or branched $C_1$-$C_6$ alkyl group.

In a further preferred embodiment, the invention provides a complex of formula (IV)

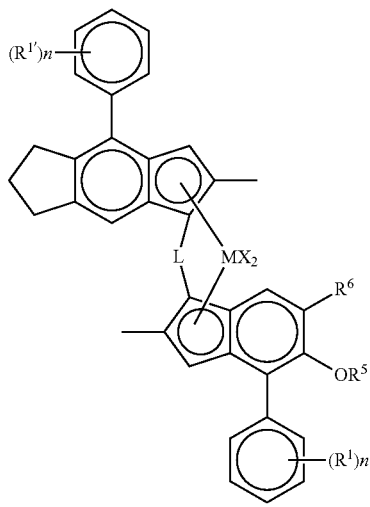

(IV)

wherein
M is Hf or Zr;
each X is a hydrogen atom, a halogen atom, $C_{1-6}$ alkoxy group, $C_{1-6}$ alkyl, phenyl or benzyl group;
L is —$SiR^8_2$—, wherein each $R^8$ is $C_{1-4}$ alkyl or $C_{5-6}$ cycloalkyl;
each n is independently 1 or 2;
$R^1$ and $R^{1'}$ are each independently the same or can be different and are a linear or branched $C_1$-$C_6$-alkyl group with the proviso that if there are four $R^1$ and $R^{1'}$ groups present, all 4 cannot simultaneously be tert butyl,
$R^5$ is a linear or branched $C_1$-$C_6$-alkyl group; and
$R^6$ is a $C(R^{10})_3$ group, with $R^{10}$ being a linear or branched $C_1$-$C_6$ alkyl group.

In a further preferred embodiment, the invention provides a complex of formula (V)

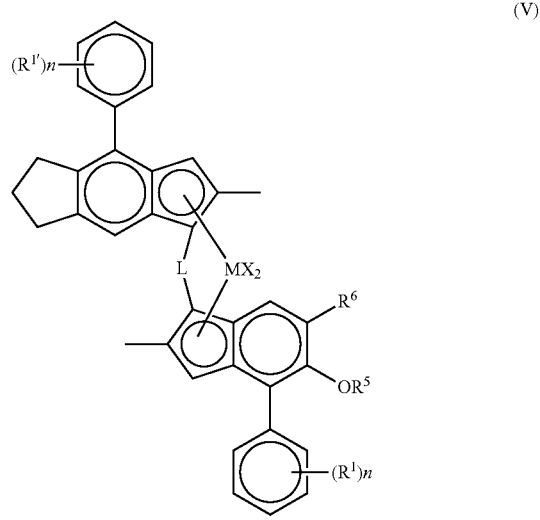

(V)

wherein
M is Hf or Zr;
X is a hydrogen atom, a halogen atom, $C_{1-6}$ alkoxy group, $C_{1-6}$ alkyl, phenyl or benzyl group;
L is —$SiMe_2$;
each n is independently 1 or 2;
$R^1$ and $R^{1'}$ are each independently the same or can be different and are a linear or branched $C_1$-$C_6$-alkyl group, group with the proviso that if there are four $R^1$ and $R^{1'}$ groups present, all 4 cannot simultaneously be tert butyl,
$R^5$ is a linear or branched $C_1$-$C_4$-alkyl group; and
$R^6$ is a $C(R^{10})_3$ group, with $R^{10}$ being a linear or branched $C_1$-$C_4$ alkyl group.

In a further preferred embodiment, the invention provides a complex of formula (VI)

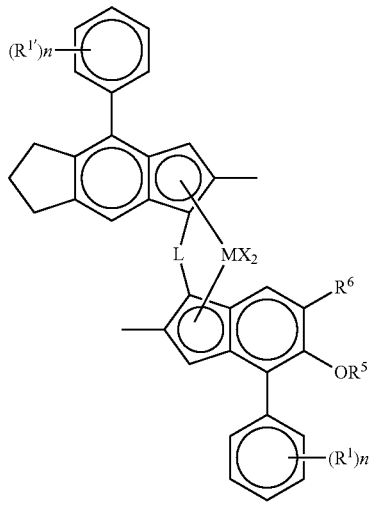

(VI)

wherein
M is Hf or Zr;
X is a hydrogen atom, a halogen atom, $C_{1-6}$ alkoxy group, $C_{1-6}$ alkyl, phenyl or benzyl group;
L is —SiMe$_2$;
each n is independently 1 or 2;
$R^1$ and $R^{1'}$ are each independently the same or can be different and are a linear or branched $C_1$-$C_6$-alkyl group, group with the proviso that if there are four $R^1$ and $R^{1'}$ groups present, all 4 cannot simultaneously be tert butyl;
$R^5$ is a linear $C_1$-$C_4$-alkyl group such as methyl; and
$R^6$ is tert butyl.

In a further preferred embodiment, the invention provides a complex of formula (VII)

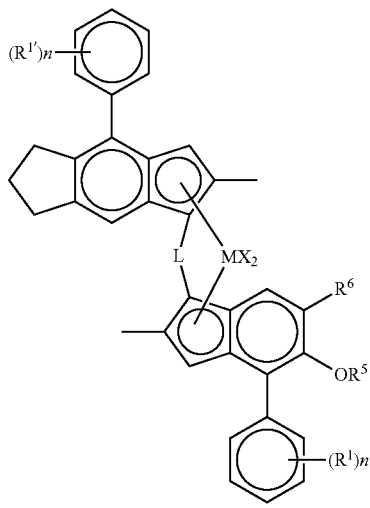

(VII)

wherein
M is Hf or Zr;
X is a hydrogen atom, a halogen atom, $C_{1-6}$ alkoxy group, $C_{1-6}$ alkyl, phenyl or benzyl group, especially chlorine;
L is —SiMe$_2$;
each n is independently 1 or 2;
$R^1$ and $R^{1'}$ are each independently the same or can be different and are a linear or branched $C_1$-$C_4$-alkyl group with the proviso that if there are four $R^1$ and $R^{1'}$ groups present, all 4 cannot simultaneously be tert butyl;
$R^5$ is methyl; and
$R^6$ is tert butyl.

In a preferred embodiment, the invention provides a complex of formula (VIII)

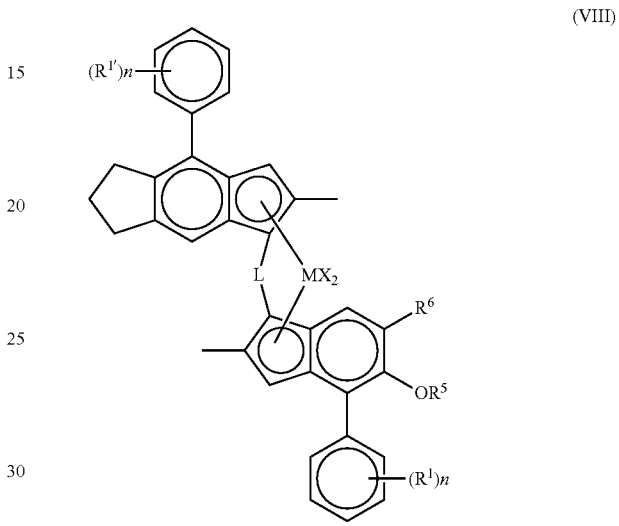

(VIII)

wherein
M is Hf or Zr;
X is Cl;
L is —SiMe$_2$;
each n is independently 1 or 2;
$R^1$ and $R^{1'}$ are each independently methyl or tert butyl with the proviso that if there are four $R^1$ and $R^{1'}$ groups present, all 4 cannot simultaneously be tert butyl,
$R^5$ is methyl; and
$R^6$ is tert butyl.

In any of formula (I) to (VIII) it is preferred if the 4-position substituent on either indenyl or indacenyl ring is a 3,5-dimethylphenyl- or 4-tBu-phenyl group.

In any of formula (I) to (VIII) it is preferred if the 4-position substituent on one of the indenyl or indacenyl ring is a 3,5-ditertbutyl and the other indenyl or indacenyl ring carries a 4-position 3,5-dimethylphenyl- or 4-tBu-phenyl group. In such a structure it is preferred if the ditertbutylphenyl is present on the indenyl ring.

In any of formula (I) to (VIII) it is preferred that if n=2 then both $R^1$ groups are the same.

In any of formula (I) to (VIII) it is preferred that if n=2 then both $R^{1'}$ groups are the same.

In any of formula (I) to (VIII) it is preferred that if n=2 then $R^1$ groups are on the 3,5-position.

In any of formula (I) to (VIII) it is preferred that if n=2 then $R^{1'}$ groups are on the 3,5-position.

In any of formula (I) to (VIII) it is preferred that if n=1 then $R^1$ is on the 4-position.

In any of formula (I) to (VIII) it is preferred that if n=1 then $R^{1'}$ is on the 4-position.

Particular complexes of the invention include:
Racemic-anti-dimethylsilanediyl[2-methyl-4-(4-tert-butylphenyl)-5,6,7-trihydro-s-indacen-1-yl][2-methyl-4-

(4-tert-butylphenyl)-5-methoxy-6-tert-butylindenyl zirconium dichloride or dimethyl, Racemic-anti-dimethylsilanediyl[2-iso-butyl-4-(4-tert-butylphenyl)-5,6,7-trihydro-s-indacen-1-yl][2-methyl-4-(4-tert-butylphenyl)-5-methoxy-6-tert-butylindenyl zirconium dichloride or dimethyl, Racemic-anti-dimethylsilanediyl[2-neo-pentyl-4-(4-tert-butylphenyl)-5,6,7-trihydro-s-indacen-1-yl][2-methyl-4-(4-tert-butylphenyl)-5-methoxy-6-tert-butylindenyl zirconium dichloride or dimethyl, Racemic-anti-dimethylsilanediyl[2-benzyl-4-(4-tert-butylphenyl)-5,6,7-trihydro-s-indacen-1-yl][2-methyl-4-(4-tert-butylphenyl)-5-methoxy-6-tert-butylindenyl zirconium dichloride or dimethyl, Racemic-anti-dimethylsilanediyl[2-cyclohexylmethyl-4-(4-tert-butylphenyl)-5,6,7-trihydro-s-indacen-1-yl][2-methyl-4-(4-tert-butylphenyl)-5-methoxy-6-tert-butylindenyl zirconium dichloride or dimethyl, Racemic-anti-dimethylsilanediyl[2-methyl-4-(3,5-dimethylphenyl)-5,6,7-trihydro-s-indacen-1-yl][2-methyl-4-(3,5-dimethylphenyl)-5-methoxy-6-tert-butylindenyl zirconium dichloride or dimethyl, Racemic-anti-dimethylsilanediyl[2-iso-butyl-4-(3,5-dimethylphenyl)-5,6,7-trihydro-s-indacen-1-yl][2-methyl-4-(3,5-dimethylphenyl)-5-methoxy-6-tert-butylindenyl zirconium dichloride or dimethyl, Racemic-anti-dimethylsilanediyl[2-neo-pentyl-4-(3,5-dimethylphenyl)-5,6,7-trihydro-s-indacen-1-yl][2-methyl-4-(3,5-dimethylphenyl)-5-methoxy-6-tert-butylindenyl zirconium dichloride or dimethyl, Racemic-anti-dimethylsilanediyl[2-benzyl-4-(3,5-dimethylphenyl)-5,6,7-trihydro-s-indacen-1-yl][2-methyl-4-(3,5-dimethylphenyl)-5-methoxy-6-tert-butylindenyl zirconium dichloride or dimethyl, Racemic-anti-dimethylsilanediyl[2-cyclohexylmethyl-4-(3,5-dimethylphenyl)-5,6,7-trihydro-s-indacen-1-yl][2-methyl-4-(3,5-dimethylphenyl)-5-methoxy-6-tert-butylindenyl zirconium dichloride or dimethyl, Racemic-anti-dimethylsilanediyl[2-cyclohexylmethyl-4-(3,5-dimethylphenyl)-5,6,7-trihydro-s-indacen-1-yl][2-methyl-4-(3,5-dimethylphenyl)-5-methoxy-6-tert-butylindenyl zirconium dichloride or dimethyl, Racemic-anti-dimethylsilanediyl[2-methyl-4-(4-tert-butylphenyl)-5,6,7-trihydro-s-indacen-1-yl][2-methyl-4-(3,5-ditert-butylphenyl)-5-methoxy-6-tert-butylindenyl zirconium dichloride or dimethyl, Racemic-anti-dimethylsilanediyl[2-methyl-4-(3,5-ditert-butylphenyl)-5,6,7-trihydro-s-indacen-1-yl][2-methyl-4-(4-tert-butylphenyl)-5-methoxy-6-tert-butylindenyl zirconium dichloride or dimethyl, Racemic-anti-dimethylsilanediyl[2-methyl-4-(3,5-dimethylphenyl)-5,6,7-trihydro-s-indacen-1-yl][2-methyl-4-(4-tertbutylphenyl)-5-methoxy-6-tert-butylindenyl zirconium dichloride or dimethyl, Racemic-anti-dimethylsilanediyl[2-methyl-4-(4-tert-butylphenyl)-5,6,7-trihydro-s-indacen-1-yl][2-methyl-4-(3,5-dimethylphenyl)-5-methoxy-6-tert-butylindenyl zirconium dichloride or dimethyl,

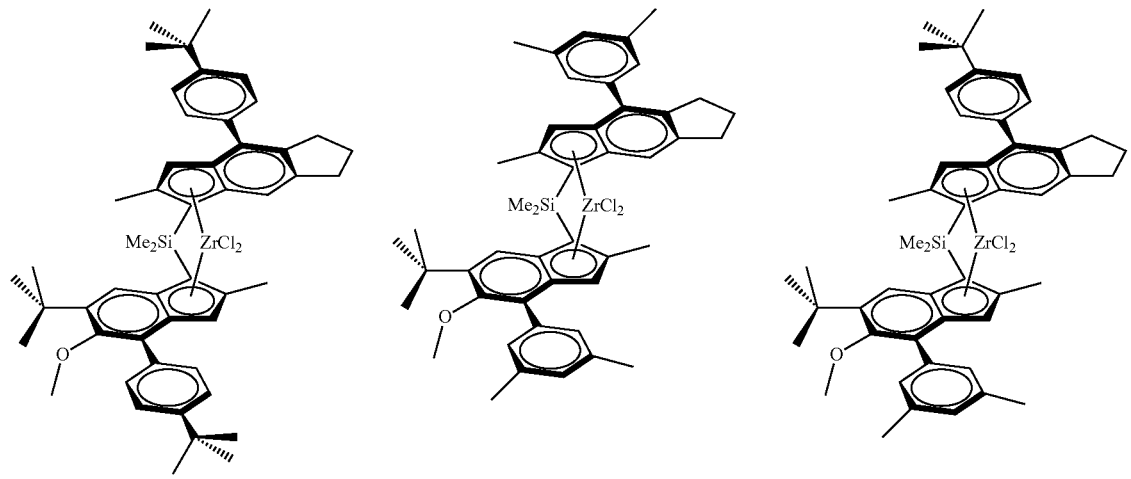

MC-IE1
rac-anti-dimethylsilanediyl
[2-methyl-4-(4'-tert-butylphenyl)-1,5,6,7-tetrahydro-s-indacen-1-yl][2-methyl-4-(4'-tert-butylphenyl)-5-methoxy-6-tert-butylinden-1-yl]
zirconium dichloride MC-IE2
rac-anti-dimethylsilanediyl
[2-methyl-4-(3',5'-dimethylphenyl)-1,5,6,7-tetrahydro-s-indacen-1-yl][2-methyl-4-(3',5'-dimethylphenyl)-5-methoxy-6-tert-butylinden-1-yl]
zirconium dichloride MC-IE3
rac-anti-dimethylsilanediyl
[2-methyl-4-(4'-tert-butylphenyl)-1,5,6,7-tetrahydro-s-indacen-1-yl][2-methyl-4-(3',5'-dimethylphenyl)-5-methoxy-6-tert-butylinden-1-yl]
zirconium dichloride

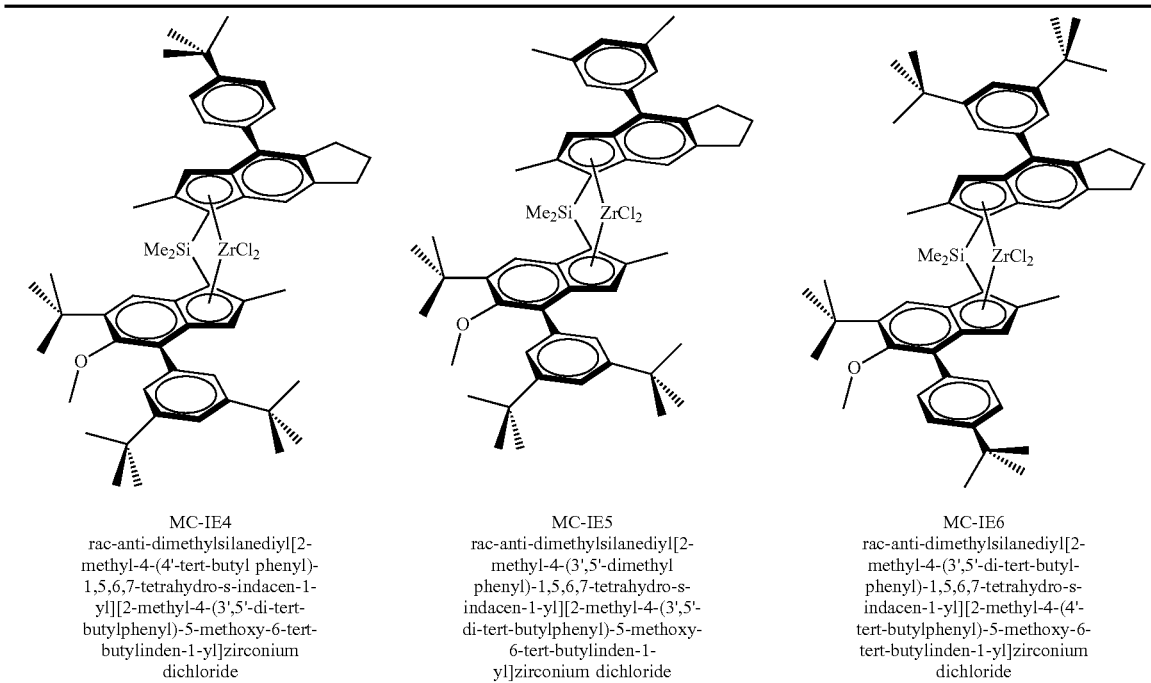

| MC-IE4 | MC-IE5 | MC-IE6 |
|---|---|---|
| rac-anti-dimethylsilanediyl[2-methyl-4-(4'-tert-butyl phenyl)-1,5,6,7-tetrahydro-s-indacen-1-yl][2-methyl-4-(3',5'-di-tert-butylphenyl)-5-methoxy-6-tert-butylinden-1-yl]zirconium dichloride | rac-anti-dimethylsilanediyl[2-methyl-4-(3',5'-dimethyl phenyl)-1,5,6,7-tetrahydro-s-indacen-1-yl][2-methyl-4-(3',5'-di-tert-butylphenyl)-5-methoxy-6-tert-butylinden-1-yl]zirconium dichloride | rac-anti-dimethylsilanediyl[2-methyl-4-(3',5'-di-tert-butyl-phenyl)-1,5,6,7-tetrahydro-s-indacen-1-yl][2-methyl-4-(4'-tert-butylphenyl)-5-methoxy-6-tert-butylinden-1-yl]zirconium dichloride |

For the avoidance of doubt, any narrower definition of a substituent offered above can be combined with any other broad or narrowed definition of any other substituent.

Throughout the disclosure above, where a narrower definition of a substituent is presented, that narrower definition is deemed disclosed in conjunction with all broader and narrower definitions of other substituents in the application.

Synthesis

The ligands required to form the catalysts of the invention can be synthesised by any process and the skilled organic chemist would be able to devise various synthetic protocols for the manufacture of the necessary ligand materials. WO2007/116034 discloses the necessary chemistry and is herein incorporated by reference. Synthetic protocols can also generally be found in WO2002/02576, WO2011/135004, WO2012/084961, WO2012/001052, WO2011/076780 and WO2015/158790. The examples section also provides the skilled person with sufficient direction.

Intermediates

Whilst the invention primarily relates to complexes and catalysts thereof, the ligands used to form those complexes are also new. The invention further relates therefore to ligands of formula (Ib') from which the $MX_2$ coordination has been removed and the proton returned to the indenyl. Ligands of interest are therefore of formula (I')

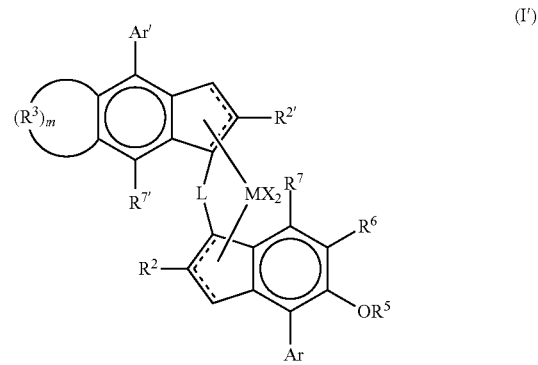

preferably (Ib')

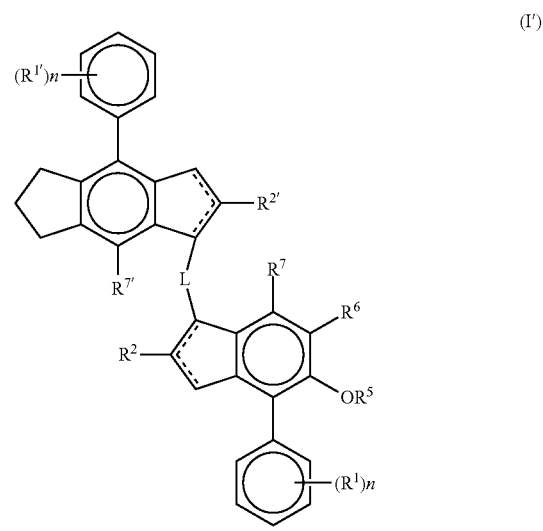

wherein the substituents are as hereinbefore defined and the dotted lines represent a double bond present in between carbons 1 and 2 or 2 and 3 of the indenyl ring, and between carbons 1' and 2' or 2' and 3' of the indacenyl ring. It will be appreciated therefore that this molecule contains double bond isomers. By double bond isomers is meant the compounds where the double bond is positioned between the 2 and 3 atoms rather than 1 and 2 atoms of the bicyclic ring. It may be that more than one double bond isomer is present in a sample. Preferred ligands are analogues of the complexes (II) to (VIII) described above from which $MX_2$ coordination has been removed and the proton returned to the indenyl.

Cocatalyst

To form an active catalytic species it is normally necessary to employ a cocatalyst as is well known in the art. Cocatalysts comprising one or more compounds of Group 13 metals, like organoaluminium compounds or borates used to activate metallocene catalysts are suitable for use in this invention.

The olefin polymerisation catalyst system of the invention comprises (i) a complex as defined herein; and normally (ii) an aluminium alkyl compound (or other appropriate cocatalyst), or the reaction product thereof. Thus the cocatalyst is preferably an alumoxane, like MAO or an alumoxane other than MAO.

Borate cocatalysts can also be employed. It will be appreciated by the skilled man that where boron based cocatalysts are employed, it is normal to preactivate the complex by reaction thereof with an aluminium alkyl compound, such as TIBA. This procedure is well known and any suitable aluminium alkyl, e.g. $Al(C_{1-6}\text{-alkyl})_3$. can be used.

It is also possible to use a mixture of Al based and B based cocatalysts.

The aluminoxane cocatalyst can be one of formula (X):

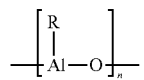

(X)

where n is usually from 6 to 20 and R has the meaning below.

Aluminoxanes are formed on partial hydrolysis of organoaluminum compounds, for example those of the formula $AlR_3$, $AlR_2Y$ and $Al_2R_3Y_3$ where R can be, for example, C1-C10 alkyl, preferably C1-C5 alkyl, or C3-10-cycloalkyl, C7-C12-arylalkyl or alkylaryl and/or phenyl or naphthyl, and where Y can be hydrogen, halogen, preferably chlorine or bromine, or C1-C10 alkoxy, preferably methoxy or ethoxy. The resulting oxygen-containing aluminoxanes are not in general pure compounds but mixtures of oligomers of the formula (X).

The preferred aluminoxane is methylaluminoxane (MAO). Since the aluminoxanes used according to the invention as cocatalysts are not, owing to their mode of preparation, pure compounds, the molarity of aluminoxane solutions hereinafter is based on their aluminium content.

It has been surprisingly found however, that in the context of heterogeneous catalysis, where catalysts are not supported on any external carrier or supported as described above, that in specific cases higher activities can be achieved if a boron based cocatalyst is also employed as a cocatalyst. It will be appreciated by the skilled man that where boron based cocatalysts are employed, it is normal to preactivate the complex by reaction thereof with an aluminium alkyl compound, such as TIBA. This procedure is well known and any suitable aluminium alkyl, preferably an aluminium alkyl compounds of the formula (X) $AlR_3$ with R being a linear or branched $C_2$-$C_8$-alkyl group, can be used.

Preferred aluminium alkyl compounds are triethylaluminium, tri-isobutylaluminium, tri-isohexylaluminium, tri-n-octylaluminium and tri-isooctylaluminium.

Boron based cocatalysts of interest include boron compounds containing a borate $3^+$ ion, i.e. borate compounds. These compounds generally contain an anion of formula:

$(Z)_4B^-$          (XI)

where Z is an optionally substituted phenyl derivative, said substituent being a halo-$C_{1-6}$-alkyl or halo group. Preferred options are fluoro or trifluoromethyl. Most preferably, the phenyl group is perfluorinated. Such ionic cocatalysts preferably contain a non-coordinating anion such as tetrakis(pentafluorophenyl)borate.

Suitable counterions are protonated amine or aniline derivatives or phosphonium ions. These may have the general formula (XII) or (XIII):

$NQ_4^+$          (XI) or $PQ_4^+$          (XIII)

where Q is independently H, $C_{1-6}$-alkyl, $C_{3-8}$ cycloakyl, phenyl$C_{1-6}$-alkylene- or optionally substituted Ph. Optional substituents may be $C_{1-6}$-alkyl, halo or nitro. There may be one or more than one such substituent. Preferred substituted Ph groups include therefore para-substituted phenyl, preferably tolyl or dimethylphenyl.

It is preferred if at least one Q group is H, thus preferred compounds are those of formula:

$NHQ_3^+$          (VI) or $PHQ_3^+$          (XIV)

Preferred phenyl-$C_{1-6}$-alkyl- groups include benzyl.

Suitable counterions therefore include: methylammonium, anilinium, dimethylammonium, diethylammonium, N-methylanilinium, diphenylammonium, N,N-dimethylanilinium, trimethylammonium, triethylammonium, tri-n-butylammonium, methyldiphenylammonium, p-bromo-N,N-dimethylanilinium or p-nitro-N,N-dimethylanilinium, especially dimethylammonium or N,N-dimethylanilinium. The use of pyridinium as an ion is a further option.

Phosphonium ions of interest include triphenylphosphonium, triethylphosphonium, diphenylphosphonium, tri(methylphenyl)phosphonium and tri(dimethylphenyl)phosphonium.

A more preferred counterion is trityl ($CPh_3^+$) or analogues thereof in which the Ph group is functionalised to carry one or more alkyl groups. Highly preferred borates of use in the invention therefore comprise the tetrakis(pentafluorophenyl)borate ion.

Preferred ionic compounds which can be used according to the present invention include:
tributylammoniumtetra(pentafluorophenyl)borate,
tributylammoniumtetra(trifluoromethylphenyl)borate,
tributylammoniumtetra-(4-fluorophenyl)borate,
N,N-dimethylcyclohexylammoniumtetrakis-(pentafluorophenyOborate,
N,N-dimethylbenzylammoniumtetrakis(pentafluorophenyOborate,
N,N-dimethylaniliniumtetrakis(pentafluorophenyl)borate,
N,N-di(propyl)ammoniumtetrakis(pentafluorophenyl)borate, di(cyclohexyl)ammoniumtetrakis(pentafluorophenyl)borate,
triphenylcarbeniumtetrakis(pentafluorophenyOborate,
or ferroceniumtetrakis(pentafluorophenyl)borate.

Preference is given to triphenylcarbeniumtetrakis(pentafluorophenyl) borate,
N,N-dimethylcyclohexylammoniumtetrakis(pentafluorophenyl)borate,
N,N-dimethylbenzylammoniumtetrakis(pentafluorophenyl)borate or
N,N-dimethylaniliniumtetrakis(pentafluorophenyl)borate.

It has been surprisingly found that certain boron cocatalysts are especially preferred. Preferred borates of use in the invention therefore comprise the trityl ion. Thus the use of N,N-dimethylammonium-tetrakispentafluorophenylborate and $Ph_3CB(PhF_5)_4$ and analogues therefore are especially favoured.

In one embodiment, preferably both cocatalysts, an aluminoxane and a boron based cocatalyst, are used in the catalyst system of the present invention.

Suitable amounts of cocatalyst will be well known to the skilled man.

The molar ratio of boron to the metal ion of the metallocene may be in the range 0.5:1 to 10:1 mol/mol, preferably 1:1 to 10:1, especially 1:1 to 5:1 mol/mol.

The molar ratio of Al in the aluminoxane to the metal ion of the metallocene may be in the range 1:1 to 2000:1 mol/mol, preferably 10:1 to 1000:1, and more preferably 50:1 to 500:1 mol/mol.

Catalyst Manufacture

The metallocene complex of the present invention can be used in combination with a suitable cocatalyst as a catalyst for the polymerization of propylene, e.g. in a solvent such as toluene or an aliphatic hydrocarbon, (i.e. for polymerization in solution), as it is well known in the art. Preferably, polymerization of propylene takes place in the condensed phase or in gas phase.

The catalyst of the invention can be used in supported or unsupported form. The particulate support material used is preferably an organic or inorganic material, such as silica, alumina or zirconia or a mixed oxide such as silica-alumina, in particular silica, alumina or silica-alumina. The use of a silica support is preferred. The skilled man is aware of the procedures required to support a metallocene catalyst.

Especially preferably the support is a porous material so that the complex may be loaded into the pores of the support, e.g. using a process analogous to those described in WO94/14856 (Mobil), WO95/12622 (Borealis) and WO2006/097497. The particle size is not critical but is preferably in the range 5 to 200 µm, more preferably 20 to 80 µm. The use of these supports is routine in the art.

In an alternative embodiment, no support is used at all. Such a catalyst can be prepared in solution, for example in an aromatic solvent like toluene, by contacting the metallocene (as a solid or as a solution) with the cocatalyst, for example methylaluminoxane or a borane or a borate salt previously dissolved in an aromatic solvent, or can be prepared by sequentially adding the dissolved catalyst components to the polymerization medium. In a preferred embodiment, the metallocene (when X differs from alkyl or hydrogen) is prereacted with an aluminum alkyl, in a ratio metal/aluminum of from 1:1 up to 1:500, preferably from 1:1 up to 1:250, and then combined with a solution of the borane or borate cocatalyst dissolved in an aromatic solvent, either in a separate vessel or directly into the polymerization reactor. Preferred metal/boron ratios are between 1:1 and 1:100, more preferably 1:1 to 1:10.

In one particularly preferred embodiment, no external carrier is used but the catalyst is still presented in solid particulate form. Thus, no external support material, such as inert organic or inorganic carrier, for example silica as described above is employed.

In order to provide the catalyst of the invention in solid form but without using an external carrier, it is preferred if a liquid/liquid emulsion system is used. The process involves forming dispersing catalyst components (i) and (ii) in a solvent, and solidifying said dispersed droplets to form solid particles.

In particular, the method involves preparing a solution of one or more catalyst components; dispersing said solution in an solvent to form an emulsion in which said one or more catalyst components are present in the droplets of the dispersed phase; immobilising the catalyst components in the dispersed droplets, in the absence of an external particulate porous support, to form solid particles comprising the said catalyst, and optionally recovering said particles.

This process enables the manufacture of active catalyst particles with improved morphology, e.g. with a predetermined spherical shape, surface properties and particle size and without using any added external porous support material, such as an inorganic oxide, e.g. silica. By the term "preparing a solution of one or more catalyst components" is meant that the catalyst forming compounds may be combined in one solution which is dispersed to the immiscible solvent, or, alternatively, at least two separate catalyst solutions for each part of the catalyst forming compounds may be prepared, which are then dispersed successively to the solvent.

In a preferred method for forming the catalyst at least two separate solutions for each or part of said catalyst may be prepared, which are then dispersed successively to the immiscible solvent.

More preferably, a solution of the complex comprising the transition metal compound and the cocatalyst is combined with the solvent to form an emulsion wherein that inert solvent forms the continuous liquid phase and the solution comprising the catalyst components forms the dispersed phase (discontinuous phase) in the form of dispersed droplets. The droplets are then solidified to form solid catalyst particles, and the solid particles are separated from the liquid and optionally washed and/or dried. The solvent forming the continuous phase may be immiscible to the catalyst solution at least at the conditions (e.g. temperatures) used during the dispersing step.

The term "immiscible with the catalyst solution" means that the solvent (continuous phase) is fully immiscible or partly immiscible i.e. not fully miscible with the dispersed phase solution.

Preferably said solvent is inert in relation to the compounds of the catalyst system to be produced. Full disclosure of the necessary process can be found in WO03/051934 which is herein incorporated by reference.

The inert solvent must be chemically inert at least at the conditions (e.g. temperature) used during the dispersing step. Preferably, the solvent of said continuous phase does not contain dissolved therein any significant amounts of catalyst forming compounds. Thus, the solid particles of the catalyst are formed in the droplets from the compounds which originate from the dispersed phase (i.e. are provided to the emulsion in a solution dispersed into the continuous phase).

The terms "immobilisation" and "solidification" are used herein interchangeably for the same purpose, i.e. for forming free flowing solid catalyst particles in the absence of an external porous particulate carrier, such as silica. The solidification happens thus within the droplets. Said step can be effected in various ways as disclosed in said WO03/051934 Preferably solidification is caused by an external stimulus to the emulsion system such as a temperature change to cause the solidification. Thus in said step the catalyst component (s) remain "fixed" within the formed solid particles. It is also possible that one or more of the catalyst components may take part in the solidification/immobilisation reaction.

Accordingly, solid, compositionally uniform particles having a predetermined particle size range can be obtained.

Furthermore, the particle size of the catalyst particles of the invention can be controlled by the size of the droplets in the solution, and spherical particles with a uniform particle size distribution can be obtained.

The invention is also industrially advantageous, since it enables the preparation of the solid particles to be carried out as a one-pot procedure. Continuous or semicontinuous processes are also possible for producing the catalyst.

Dispersed Phase

The principles for preparing two phase emulsion systems are known in the chemical field. Thus, in order to form the two phase liquid system, the solution of the catalyst component (s) and the solvent used as the continuous liquid phase have to be essentially immiscible at least during the dispersing step. This can be achieved in a known manner e.g. by choosing said two liquids and/or the temperature of the dispersing step/solidifying step accordingly.

A solvent may be employed to form the solution of the catalyst component (s). Said solvent is chosen so that it dissolves said catalyst component (s). The solvent can be preferably an organic solvent such as used in the field, comprising an optionally substituted hydrocarbon such as linear or branched aliphatic, alicyclic or aromatic hydrocarbon, such as a linear or cyclic alkane, an aromatic hydrocarbon and/or a halogen containing hydrocarbon.

Examples of aromatic hydrocarbons are toluene, benzene, ethylbenzene, propylbenzene, butylbenzene and xylene. Toluene is a preferred solvent. The solution may comprise one or more solvents. Such a solvent can thus be used to facilitate the emulsion formation, and usually does not form part of the solidified particles, but e.g. is removed after the solidification step together with the continuous phase.

Alternatively, a solvent may take part in the solidification, e.g. an inert hydrocarbon having a high melting point (waxes), such as above 40° C., suitably above 70° C., e.g. above 80° C. or 90° C., may be used as solvents of the dispersed phase to immobilise the catalyst compounds within the formed droplets.

In another embodiment, the solvent consists partly or completely of a liquid monomer, e.g. liquid olefin monomer designed to be polymerised in a "prepolymerisation" immobilisation step.

Continuous Phase

The solvent used to form the continuous liquid phase is a single solvent or a mixture of different solvents and may be immiscible with the solution of the catalyst components at least at the conditions (e.g. temperatures) used during the dispersing step. Preferably said solvent is inert in relation to said compounds.

The term "inert in relation to said compounds" means herein that the solvent of the continuous phase is chemically inert, i.e. undergoes no chemical reaction with any catalyst forming component. Thus, the solid particles of the catalyst are formed in the droplets from the compounds which originate from the dispersed phase, i.e. are provided to the emulsion in a solution dispersed into the continuous phase.

It is preferred that the catalyst components used for forming the solid catalyst will not be soluble in the solvent of the continuous liquid phase. Preferably, said catalyst components are essentially insoluble in said continuous phase forming solvent.

Solidification takes place essentially after the droplets are formed, i.e. the solidification is effected within the droplets e.g. by causing a solidifying reaction among the compounds present in the droplets. Furthermore, even if some solidifying agent is added to the system separately, it reacts within the droplet phase and no catalyst forming components go into the continuous phase.

The term "emulsion" used herein covers both bi- and multiphasic systems.

In a preferred embodiment said solvent forming the continuous phase is an inert solvent including a halogenated organic solvent or mixtures thereof, preferably fluorinated organic solvents and particularly semi, highly or perfluorinated organic solvents and functionalised derivatives thereof. Examples of the above-mentioned solvents are semi, highly or perfluorinated hydrocarbons, such as alkanes, alkenes and cycloalkanes, ethers, e.g. perfluorinated ethers and amines, particularly tertiary amines, and functionalised derivatives thereof. Preferred are semi, highly or perfluorinated, particularly perfluorinated hydrocarbons, e.g. perfluorohydrocarbons of e.g. C3-C30, such as C4-C10. Specific examples of suitable perfluoroalkanes and perfluorocycloalkanes include perfluoro-hexane, -heptane, -octane and -(methylcyclohexane). Semi fluorinated hydrocarbons relates particularly to semifluorinated n-alkanes, such as perfluoroalkyl-alkane.

"Semi fluorinated" hydrocarbons also include such hydrocarbons wherein blocks of —C—F and —C—H alternate. "Highly fluorinated" means that the majority of the —C—H units are replaced with —C—F units. "Perfluorinated" means that all —C—H units are replaced with —C—F units. See the articles of A. Enders and G. Maas in "Chemie in unserer Zeit", 34. Jahrg. 2000, Nr. 6, and of Pierandrea Lo Nostro in "Advances in Colloid and Interface Science", 56 (1995) 245-287, Elsevier Science.

Dispersing Step

The emulsion can be formed by any means known in the art: by mixing, such as by stirring said solution vigorously to said solvent forming the continuous phase or by means of mixing mills, or by means of ultra sonic wave, or by using a so called phase change method for preparing the emulsion by first forming a homogeneous system which is then transferred by changing the temperature of the system to a biphasic system so that droplets will be formed.

The two phase state is maintained during the emulsion formation step and the solidification step, as, for example, by appropriate stirring.

Additionally, emulsifying agents/emulsion stabilisers can be used, preferably in a manner known in the art, for facilitating the formation and/or stability of the emulsion. For the said purposes e.g. surfactants, e.g. a class based on hydrocarbons (including polymeric hydrocarbons with a molecular weight e.g. up to 10 000 and optionally interrupted with a heteroatom(s)), preferably halogenated hydrocarbons, such as semi- or highly fluorinated hydrocarbons optionally having a functional group selected e.g. from —OH, —SH, $NH_2$, $NR''_2$. —COOH, —$COONH_2$, oxides of alkenes, —CR''=$CH_2$, where R" is hydrogen, or C1-C20 alkyl, C2-20-alkenyl or C2-20-alkynyl group, oxo-groups, cyclic ethers and/or any reactive derivative of these groups, like alkoxy, or carboxylic acid alkyl ester groups, or, preferably semi-, highly- or perfluorinated hydrocarbons having a functionalised terminal, can be used. The surfactants can be added to the catalyst solution, which forms the dispersed phase of the emulsion, to facilitate the forming of the emulsion and to stabilize the emulsion.

Alternatively, an emulsifying and/or emulsion stabilising aid can also be formed by reacting a surfactant precursor bearing at least one functional group with a compound reactive with said functional group and present in the catalyst solution or in the solvent forming the continuous phase. The obtained reaction product acts as the actual emulsifying aid and or stabiliser in the formed emulsion system.

Examples of the surfactant precursors usable for forming said reaction product include e.g. known surfactants which bear at least one functional group selected e.g. from —OH, —SH, $NH_2$, $NR''_2$. —COOH, —$COONH_2$, oxides of alkenes, —CR''=$CH_2$, where R'' is hydrogen, or C1-C20 alkyl, C2-20-alkenyl or C2-20-alkynyl group, oxo-groups, cyclic ethers with 3 to 5 ring atoms, and/or any reactive derivative of these groups, like alkoxy or carboxylic acid alkyl ester groups; e.g. semi-, highly or perfluorinated hydrocarbons bearing one or more of said functional groups. Preferably, the surfactant precursor has a terminal functionality as defined above.

The compound reacting with such surfactant precursor is preferably contained in the catalyst solution and may be a further additive or one or more of the catalyst forming compounds. Such compound is e.g. a compound of group 13 (e.g. MAO and/or an aluminium alkyl compound and/or a transition metal compound).

If a surfactant precursor is used, it is preferably first reacted with a compound of the catalyst solution before the addition of the transition metal compound. In one embodiment e.g. a highly fluorinated C1-n (suitably C4-30- or C5-15) alcohol (e.g. highly fluorinated heptanol, octanol or nonanol), oxide (e.g. propenoxide) or acrylate ester is reacted with a cocatalyst to form the "actual" surfactant. Then, an additional amount of cocatalyst and the transition metal compound is added to said solution and the obtained solution is dispersed to the solvent forming the continuous phase. The "actual" surfactant solution may be prepared before the dispersing step or in the dispersed system. If said solution is made before the dispersing step, then the prepared "actual" surfactant solution and the transition metal solution may be dispersed successively (e.g. the surfactant solution first) to the immiscible solvent, or be combined together before the dispersing step.

Solidification

The solidification of the catalyst component(s) in the dispersed droplets can be effected in various ways, e.g. by causing or accelerating the formation of said solid catalyst forming reaction products of the compounds present in the droplets. This can be effected, depending on the used compounds and/or the desired solidification rate, with or without an external stimulus, such as a temperature change of the system.

In a particularly preferred embodiment, the solidification is effected after the emulsion system is formed by subjecting the system to an external stimulus, such as a temperature change. Temperature differences of e.g. 5 to 100° C., such as 10 to 100° C., or 20 to 90° C., such as 50 to 90° C.

The emulsion system may be subjected to a rapid temperature change to cause a fast solidification in the dispersed system. The dispersed phase may e.g. be subjected to an immediate (within milliseconds to few seconds) temperature change in order to achieve an instant solidification of the component (s) within the droplets. The appropriate temperature change, i.e. an increase or a decrease in the temperature of an emulsion system, required for the desired solidification rate of the components cannot be limited to any specific range, but naturally depends on the emulsion system, i.a. on the used compounds and the concentrations/ratios thereof, as well as on the used solvents, and is chosen accordingly. It is also evident that any techniques may be used to provide sufficient heating or cooling effect to the dispersed system to cause the desired solidification.

In one embodiment the heating or cooling effect is obtained by bringing the emulsion system with a certain temperature to an inert receiving medium with significantly different temperature, e.g. as stated above, whereby said temperature change of the emulsion system is sufficient to cause the rapid solidification of the droplets. The receiving medium can be gaseous, e.g. air, or a liquid, preferably a solvent, or a mixture of two or more solvents, wherein the catalyst component (s) is (are) immiscible and which is inert in relation to the catalyst component (s). For instance, the receiving medium comprises the same immiscible solvent used as the continuous phase in the first emulsion formation step.

Said solvents can be used alone or as a mixture with other solvents, such as aliphatic or aromatic hydrocarbons, such as alkanes. Preferably a fluorinated solvent as the receiving medium is used, which may be the same as the continuous phase in the emulsion formation, e.g. perfluorinated hydrocarbon.

Alternatively, the temperature difference may be effected by gradual heating of the emulsion system, e.g. up to 10° C. per minute, preferably 0.5 to 6° C. per minute and more preferably in 1 to 5° C. per minute.

In case a melt of e.g. a hydrocarbon solvent is used for forming the dispersed phase, the solidifcation of the droplets may be effected by cooling the system using the temperature difference stated above.

Preferably, the "one phase" change as usable for forming an emulsion can also be utilised for solidifying the catalytically active contents within the droplets of an emulsion system by, again, effecting a temperature change in the dispersed system, whereby the solvent used in the droplets becomes miscible with the continuous phase, preferably a fluorous continuous phase as defined above, so that the droplets become impoverished of the solvent and the solidifying components remaining in the "droplets" start to solidify. Thus the immisciblity can be adjusted with respect to the solvents and conditions (temperature) to control the solidification step.

The miscibility of e.g. organic solvents with fluorous solvents can be found from the literature and be chosen accordingly by a skilled person. Also the critical temperatures needed for the phase change are available from the literature or can be determined using methods known in the art, e.g. the Hildebrand-Scatchard-Theorie. Reference is also made to the articles of A. Enders and G. and of Pierandrea Lo Nostro cited above.

Thus according to the invention, the entire or only part of the droplet may be converted to a solid form. The size of the "solidified" droplet may be smaller or greater than that of the original droplet, e.g. if the amount of the monomer used for the prepolymerisation is relatively large.

The solid catalyst particles recovered can be used, after an optional washing step, in a polymerisation process of propylene. Alternatively, the separated and optionally washed solid particles can be dried to remove any solvent present in the particles before use in the polymerisation step. The separation and optional washing steps can be effected in a known manner, e.g. by filtration and subsequent washing of the solids with a suitable solvent.

The droplet shape of the particles may be substantially maintained. The formed particles may have an average size range of 1 to 500 μm, e.g. 5 to 500 μm, advantageously 5 to 200 μm or 10 to 150 μm. Even an average size range of 5 to 60 μm is possible. The size may be chosen depending on the polymerisation the catalyst is used for. Advantageously, the particles are essentially spherical in shape, they have a low porosity and a low surface area.

The formation of solution can be effected at a temperature of 0-100° C., e.g. at 20-80° C. The dispersion step may be effected at −20° C.-100° C., e.g. at about −10-70° C., such as at −5 to 30° C., e.g. around 0° C.

To the obtained dispersion an emulsifying agent as defined above, may be added to improve/stabilise the droplet formation. The solidification of the catalyst component in the droplets is preferably effected by raising the temperature of the mixture, e.g. from 0° C. temperature up to 100° C., e.g. up to 60-90° C., gradually. E.g. in 1 to 180 minutes, e.g. 1-90 or 5-30 minutes, or as a rapid heat change. Heating time is dependent on the size of the reactor.

During the solidification step, which is preferably carried out at about 60 to 100° C., preferably at about 75 to 95° C., (below the boiling point of the solvents) the solvents may preferably be removed and optionally the solids are washed with a wash solution, which can be any solvent or mixture of solvents such as those defined above and/or used in the art, preferably a hydrocarbon, such as pentane, hexane or heptane, suitably heptane. The washed catalyst can be dried or it can be slurried into an oil and used as a catalyst-oil slurry in polymerisation process.

All or part of the preparation steps can be done in a continuous manner. Reference is made to WO2006/069733 describing principles of such a continuous or semicontinuous preparation methods of the solid catalyst types, prepared via emulsion/solidification method.

Catalyst Off-Line Prepolymerisation

The use of the heterogeneous catalysts, where no external support material is used (also called "self-supported" catalysts) might have, as a drawback, a tendency to dissolve to some extent in the polymerisation media, i.e. some active catalyst components might leach out of the catalyst particles during slurry polymerisation, whereby the original oval morphology of the catalyst might be lost. These leached catalyst components are very active possibly causing problems during polymerisation. Therefore, the amount of leached components should be minimized, i.e. all catalyst components should be kept in heterogeneous form.

Furthermore, the self-supported catalysts generate, due to the high amount of catalytically active species in the catalyst system, high temperatures at the beginning of the polymerisation which may cause melting of the product material. Both effects, i.e. the partial dissolving of the catalyst system and the heat generation, might cause fouling, sheeting and deterioration of the polymer material morphology.

In order to minimise the possible problems associated with high activity or leaching, it is possible to "off line prepolymerise" the catalyst before using it in polymerisation process.

It has to be noted that off line prepolymerisation in this regard is part of the catalyst preparation process, being a step carried out after a solid catalyst is formed. The catalyst off line prepolymerisation step is not part of the actual polymerisation process configuration comprising a prepolymerisation step. After the catalyst off line prepolymerisation step, the solid catalyst can be used in polymerisation.

Catalyst "off line prepolymerisation" takes place following the solidification step of the liquid-liquid emulsion process. Pre-polymerisation may take place by known methods described in the art, such as that described in WO 2010/052263, WO 2010/052260 or WO 2010/052264. Preferable embodiments of this aspect of the invention are described herein.

As monomers in the catalyst off-line prepolymerisation step preferably alpha-olefins are used. Preferable $C_2$-$C_{10}$ olefins, such as ethylene, propylene, 1-butene, 1-pentene, 1-hexene, 4-methyl-1-pentene, 1-heptene, 1-octene, 1-nonene 1-decene, styrene and vinylcyclohexene are used. Most preferred alpha-olefins are ethylene and propylene, especially propylene.

The catalyst off-line prepolymerisation may be carried out in gas phase or in an inert diluent, typically oil or fluorinated hydrocarbon, preferably in fluorinated hydrocarbons or mixture of fluorinated hydrocarbons. Preferably perfluorinated hydrocarbons are used. The melting point of such (per) fluorinated hydrocarbons is typically in the range of 0 to 140° C., preferably 30 to 120° C., like 50 to 110° C.

Where the catalyst off line prepolymerisation is done in fluorinated hydrocarbons, the temperature for the pre-polymerisation step is below 70° C., e.g. in the range of −30 to 70° C., preferably 0-65° C. and more preferably in the range 20 to 55° C. Pressure within the reaction vessel is preferably higher than atmospheric pressure to minimize the eventual leaching of air and/or moisture into the catalyst vessel. Preferably the pressure is in the range of at least 1 to 15 bar, preferably 2 to 10 bar. The reaction vessel is preferably kept in an inert atmosphere, such as under nitrogen or argon or similar atmosphere.

Offline prepolymerisation is continued until the desired pre-polymerisation degree, defined as weight of polymer matrix/weight of solid catalyst before pre-polymerisation step, is reached. The degree is below 25, preferably 0.5 to 10.0, more preferably 1.0 to 8.0, most preferably 2.0 to 6.0.

Use of the off-line catalyst prepolymerisation step offers the advantage of minimising leaching of catalyst components and thus local overheating.

After off line prepolymerisation, the catalyst can be isolated and stored.

Polymerisation

The catalysts according to the invention are especially suited to the formation of propylene homopolymers or propylene-ethlene copolymers. The ethylene content in such a propylene-ethylene polymer may vary depending on the desired properties of the polymer. Typically ethylene content will range from 0.1 to 10 mol %. Especially, the catalysts of the present invention are used to manufacture propylene homopolymers or propylene random copolymers with ethylene as comonomer.

Polymerization in the method of the invention may be effected in one or more, e.g. 1, 2 or 3, polymerization reactors, using conventional polymerization techniques, e.g. gas phase, solution phase, slurry or bulk polymerization or combinations thereof, like a combination of a slurry and at least one gas phase reactor.

In case of propylene polymerisation for slurry reactors, the reaction temperature will generally be in the range 60 to 110° C. (e.g. 60-90° C.), the reactor pressure will generally be in the range 5 to 80 bar (e.g. 20-60 bar), and the residence time will generally be in the range 0.1 to 5 hours (e.g. 0.3 to 2 hours). The monomer is usually used as reaction medium.

For gas phase reactors, the reaction temperature used will generally be in the range 60 to 115° C. (e.g. 70 to 110° C.), the reactor pressure will generally be in the range 10 to 25 bar, and the residence time will generally be 0.5 to 8 hours (e.g. 0.5 to 4 hours). The gas used will be the monomer optionally as mixture with a non-reactive gas such as nitrogen or propane. In addition to actual polymerisation steps and reactors, the process can contain any additional polymerisation steps, like prepolymerisation step, and any further after reactor handling steps as known in the art.

For solution polymerization, an aliphatic or aromatic solvent can be used to dissolve the monomer and the polymer, and the polymerization temperature will generally be in the range 80 to 200° C. (e.g. 90 to 150° C.)

Generally the quantity of catalyst used will depend upon the nature of the catalyst, the reactor types and conditions and the properties desired for the polymer product. As is well known in the art hydrogen can be used for controlling the molecular weight of the polymer.

The metallocene catalysts of the invention possess excellent catalyst activity and good comonomer response. The catalysts are also able to provide polymers of high weight average molecular weight Mw.

Moreover, the random copolymerisation behaviour of metallocene catalysts of the invention shows a reduced tendency of chain transfer to ethylene. Polymers obtained with the metallocenes of the invention have normal particle morphologies.

It is especially preferred if the catalysts of the invention are used in the manufacture of heterophasic PP/EPR blends. These reactor blends may be produced in two-steps (homopolypropylene in bulk+ ethylene-propylene rubber in gas phase) or three steps (hPP in bulk+ hPP in gas phase+ EPR in gas phase). Such polymers may typically be characterized by one or more of the following features: EPR is fully soluble in xylene at room temperature. The iV(EPR) is above 2.0 dL/g when measured in decaline. The Mw/Mn of the hPP, as measured by GPC, is greater than 3.5.

Viewed from another aspect the invention provides a process for the preparation of a heterophasic polypropylene copolymer comprising:

(I) polymerising propylene in bulk in the presence of a catalyst as herein defined to form a polypropylene homopolymer matrix;
(II) in the presence of said matrix and said catalyst and in the gas phase, polymerising propylene and ethylene to form a heterophasic polypropylene copolymer comprising a homopolymer matrix and an ethylene propylene rubber.

Viewed from another aspect the invention provides a process for the preparation of a heterophasic polypropylene copolymer comprising:

(I) polymerising propylene in bulk in the presence of a catalyst as herein defined to form a polypropylene homopolymer;
(II) in the presence of said homopolymer and said catalyst and in the gas phase, polymerising propylene to form a polypropylene homopolymer matrix;
(III) in the presence said matrix and said catalyst and in the gas phase, polymerising propylene and ethylene to form a heterophasic polypropylene copolymer comprising a homopolymer matrix and an ethylene propylene rubber (EPR).

In such a process, it is preferred if the EPR component is fully soluble in xylene at room temperature. The EPR component may have a C2 content of 15 to 60 wt %. It is preferred if the iV of the EPR is above 2.0 dL/g when measured in decaline. It is also preferred if the Mw/Mn of the hPP matrix component, as measured by GPC, is broader than 3.5, such as 4.0 to 8.0. The xylene soluble content may range from 15 to 60 wt %.

It will be appreciated that the catalyst may be subject to prepolymerisation as known in the art. The split between the steps may vary. For a two step procedure, a suitable split is 40 to 70 wt % of EPR vs 30 to 60 wt % homopolymer component, such as 50 to 70 EPR vs 50 to 30 wt % homopolymer.

For a three step process, splits are preferably 30 to 50 wt % in step (I), 30:50 wt % in step (II) and 10 to 30 wt % in step (III).

Polymers

It is a feature of the invention that the claimed catalysts enable the formation of polymers with high molecular weight. These features can be achieved at commercially interesting polymerisation temperatures, e.g. 60° C. or more. It is a preferred feature of the invention that the catalysts of the invention are used to polymerise propylene at a temperature of at least 60° C., preferably at least 65° C., such as at least 70° C. In a particular embodiment, the propylene polymers obtained using the catalysts of the invention have a polydispersity index (Mw/Mn) of 2.0 or greater, such as 2.2-6.5. In particular, propylene polymers obtained in three-stage polymerisation processes can have broad polydispersities of 4.5-6.2. Therefore, in a particular embodiment, the propylene polymers of the invention may have a polydispersity index of 2.0-7.0, such as 3.0-7.0, or 4.0-6.5.

Polypropylene Homopolymers

Polypropylene homopolymers made by the metallocenes of the invention can be made with Mw (weight average molecular weight) values in the range of 40 to 2 000 kg/mol, preferably in the range of 50 to 1 500 kg/mol depending on the use and amount of hydrogen used as Mw regulating agent. The catalysts of the invention enable the formation of polypropylene homopolymers with high melting points. In a preferred embodiment the propylene homopolymer formed by the process of the invention has a melting point of more than 149.0° C., preferably more than 149.5° C., especially more than 150.0° C. Propylene homopolymers having melting points up to 158.0° C. are possible.

Propylene-Ethylene Copolymers

Propylene-ethylene copolymers made by the metallocenes of the invention can be made with Mw values in the range of 40 to 2,000 kg/mol, preferably in the range of 50 to 1,500 kg/mol depending on the amount of comonomer content and/or use and amount of hydrogen used as Mw regulating agent. The polymers made by the catalysts of the invention are useful in all kinds of end articles such as pipes, films (cast, blown or BOPP films, such as for example BOPP for capacitor film), fibers, moulded articles (e.g. injection moulded, blow moulded, rotomoulded articles), extrusion coatings and so on.

It has been found that certain heterophasic propylene-ethylene copolymers obtained using the catalysts of the invention have high intrinsic viscosity (iV). In particular, values of 2.0 dl/g or more are preferred such as 2.0 to 5.0 dl/g for the EPR component. The catalysts therefore enable the formation of high Mw EPR components.

The invention will now be illustrated by reference to the following non-limiting examples and figures.

BRIEF DESCRIPTION OF THE FIGURES

FIG. 4 shows that ethylene has a strong positive effect on Mw with the catalysts of the invention, while with MC-CE1, MC-CE2 and MC-CE4 Mw results are comparable. With MC-CE3, ethylene has a strong negative effect on Mw.

ANALYTICAL TESTS

Figure 1:
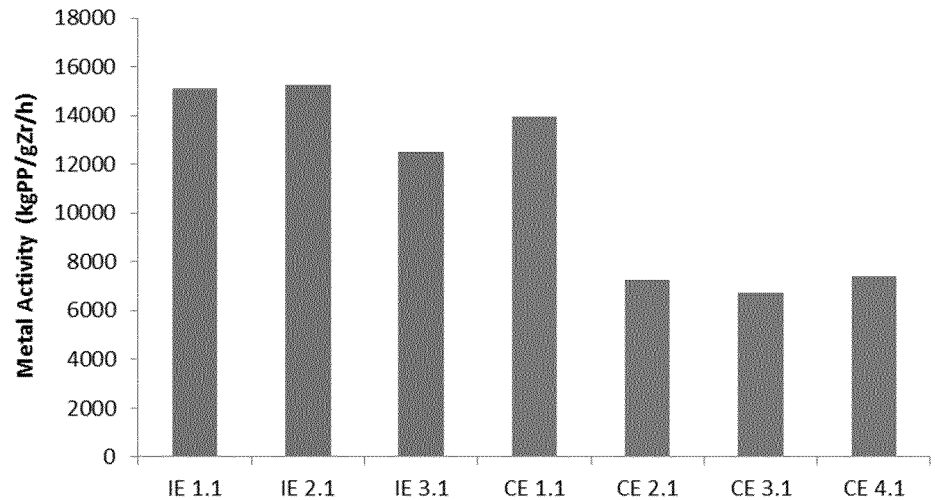
FIG. 1 illustrates metal activities of the inventive examples and closest references (comparative examples) in bulk propylene homopolymerisation experiments. Both MC-E1 and MC-E2 demonstrate improved performance over the references, while MC-E3 has performance comparable to the 0-symmetric reference MC-CE1.
Figure 2:
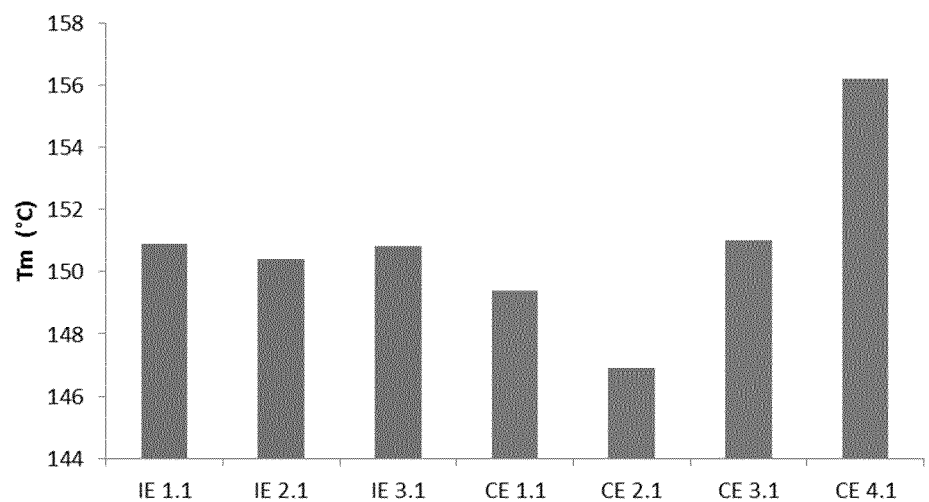
FIG. 2 illustrates polypropylene homopolymer melting temperatures for samples produced with the inventive examples and closest references (comparative examples). Inventive examples provide at least roughly 2 degrees higher melting temperature when compared to polymers produced using the known $C_1$-symmetric metallocenes. The $C_2$-symmetric references provide comparable or higher melting temperature, however, with clearly lower activity.
Figure 3:
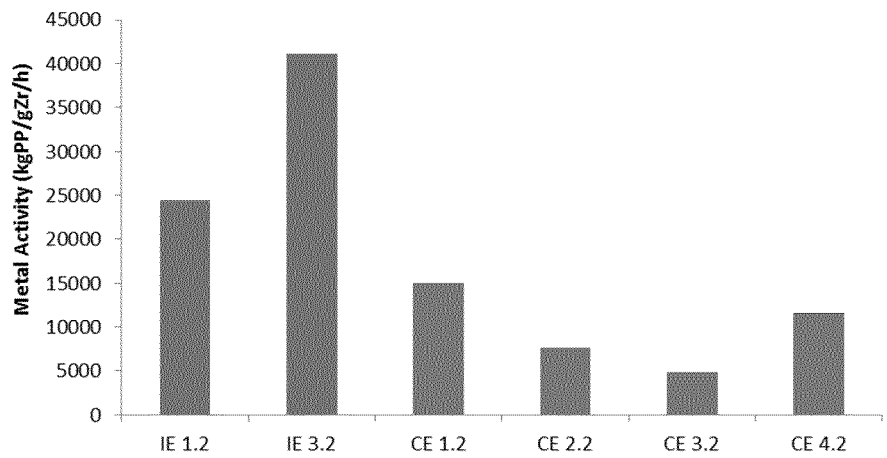
FIG. 3 illustrates metal activities of the inventive examples and closest references (comparative examples) in ethylene-propylene random copolymerisation. All inventive examples provide clearly improved performance when compared to the references.
Figure 4:
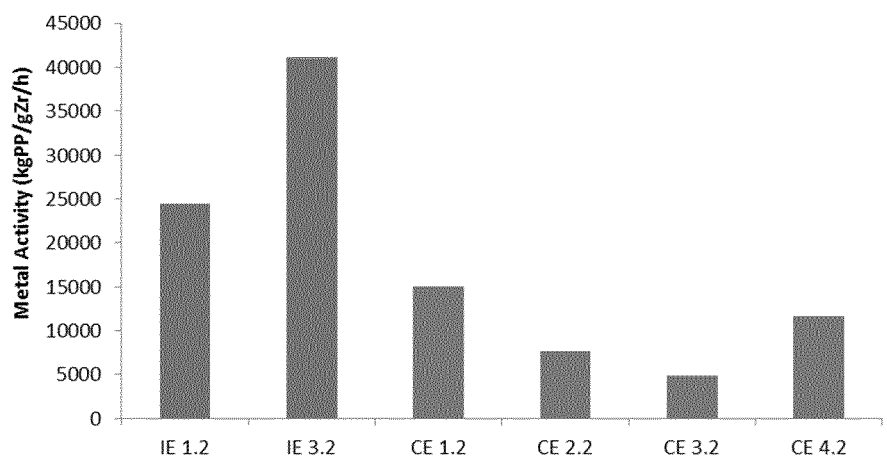
FIG. 4 illustrates Mw results for the propylene homopolymer samples produced with inventive examples and closest references (comparative examples) in bulk propylene homopolymerisation experiments. The Mw values are comparable to the results obtained with the C1-symmetric references and improved over the result with the $C_2$-symmetric references.
Figure 5:
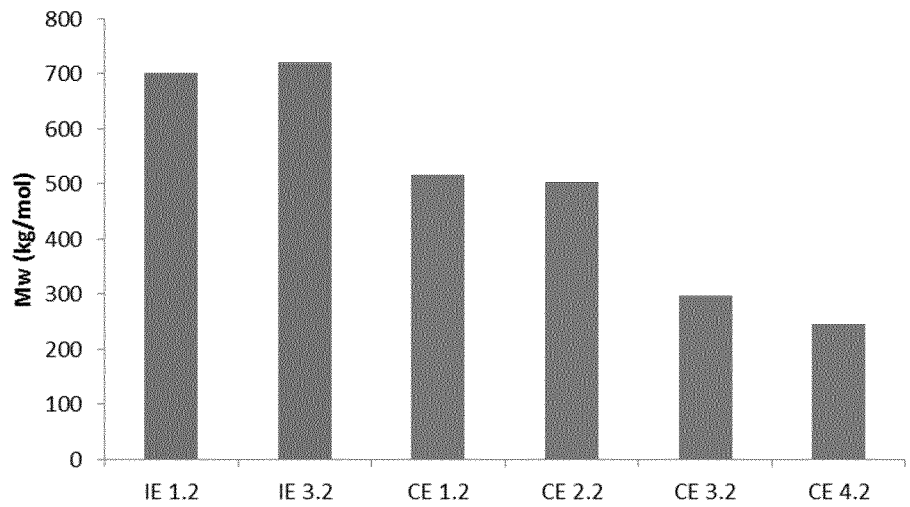
FIG. 5 illustrates that catalysts of the invention provide high Mw in ethylene-propylene random copolymerisation. Moreover, comparison of the results in FIG. 5

Measurement Methods:
Al and Zr Determination (ICP-Method)

The elementary analysis of a catalyst was performed by taking a solid sample of mass, M, cooling over dry ice. Samples were diluted up to a known volume, V, by dissolving in nitric acid ($HNO_3$, 65%, 5% of V) and freshly deionised (DI) water (5% of V). The solution was then added to hydrofluoric acid (HF, 40%, 3% of V), diluted with DI water up to the final volume, V, and left to stabilise for two hours.

The analysis was run at room temperature using a Thermo Elemental iCAP 6300 Inductively Coupled Plasma—Optical Emission Spectrometer (ICP-OES) which was calibrated using a blank (a solution of 5% $HNO_3$, 3% HF in DI water), and 6 standards of 0.5 ppm, 1 ppm, 10 ppm, 50 ppm, 100 ppm and 300 ppm of Al, with 0.5 ppm, 1 ppm, 5 ppm, 20 ppm, 50 ppm and 100 ppm of Hf and Zr in solutions of 5% HNO3, 3% HF in DI water.

Immediately before analysis the calibration is 'resloped' using the blank and 100 ppm Al, 50 ppm Hf, Zr standard, a quality control sample (20 ppm Al, 5 ppm Hf, Zr in a solution of 5% HNO3, 3% HF in DI water) is run to confirm the reslope. The QC sample is also run after every 5th sample and at the end of a scheduled analysis set.

The content of hafnium was monitored using the 282.022 nm and 339.980 nm lines and the content for zirconium using 339.198 nm line. The content of aluminium was monitored via the 167.079 nm line, when Al concentration in ICP sample was between 0-10 ppm (calibrated only to 100 ppm) and via the 396.152 nm line for Al concentrations above 10 ppm.

The reported values are an average of three successive aliquots taken from the same sample and are related back to the original catalyst by inputting the original mass of sample and the dilution volume into the software.

In the case of analysing the elemental composition of off-line prepolymerised catalysts, the polymeric portion is digested by ashing in such a way that the elements can be freely dissolved by the acids. The total content is calculated to correspond to the weight-% for the prepolymerised catalyst.

DSC Analysis

Melting temperature $T_m$ was measured on approx. 5 mg samples with a Mettler-Toledo 822e differential scanning calorimeter (DSC), according to ISO11357-3 in a heat/cool/heat cycle with a scan rate of 10° C./min in the temperature range of +23 to +225° C. under a nitrogen flow rate of 50 ml $min^{-1}$. Melting temperature was taken as the endotherm peak, respectively in the second heating step. Calibration of the instrument was performed with $H_2O$, Lead, Tin, Indium, according to ISO 11357-1.

Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The MFR is determined at 230° C. and may be determined at different loadings such as 2.16 kg ($MFR_2$) or 21.6 kg ($MFR_{21}$).

Intrinsic Viscosity

Intrinsic viscosity (iV) has been measured according to DIN ISO 1628/1, October 1999 (in Decalin at 135° C.).

GPC: Molecular weight averages, molecular weight distribution, and polydispersity index ($M_n$, $M_w$, $M_w/M_n$)

Molecular weight averages (Mw, Mn), Molecular weight distribution (MWD) and its broadness, described by polydispersity index, PDI=Mw/Mn (wherein Mn is the number average molecular weight and Mw is the weight average molecular weight) were determined by Gel Permeation Chromatography (GPC) according to ISO 16014-4:2003 and ASTM D 6474-99.

A PolymerChar GPC instrument, equipped with infrared (IR) detector was used with 3× Olexis and 1× Olexis Guard columns from Polymer Laboratories and 1,2,4-trichlorobenzene (TCB, stabilized with 250 mg/L 2,6-Di tert butyl-4-methyl-phenol) as solvent at 160° C. and at a constant flow rate of 1 mL/min. 200 μL of sample solution were injected per analysis. The column set was calibrated using universal calibration (according to ISO 16014-2:2003) with at least 15 narrow MWD polystyrene (PS) standards in the range of 0.5 kg/mol to 11 500 kg/mol. Mark Houwink constants for PS, PE and PP used are as described per ASTM D 6474-99. All samples were prepared by dissolving 5.0-9.0 mg of polymer in 8 mL (at 160° C.) of stabilized TCB (same as mobile phase) for 2.5 hours for PP or 3 hours for PE at max. 160° C. under continuous gentle shaking in the autosampler of the GPC instrument Quantification of Polypropylene Homopolymer Microstructure by NMR Spectroscopy Quantitative nuclear-magnetic resonance (NMR) spectroscopy was used to quantify the isotacticity and content of regio-defects of the polypropylene homopolymers. Quantitative $^{13}C\{^1H\}$ NMR spectra recorded in the solution-state using a Bruker Advance III 400 NMR spectrometer operating at 400.15 and 100.62 MHz for $^1H$ and $^{13}C$ respectively.

All spectra were recorded using a $^{13}$C optimised 10 mm selective excitation probehead at 125° C. using nitrogen gas for all pneumatics. Approximately 200 mg of material was dissolved in 1,2-tetrachloroethane-d$_2$ (TCE-d$_2$). This setup was chosen primarily for the high resolution needed for tacticity distribution quantification (Busico, V., Cipullo, R., Prog. Polym. Sci. 26 (2001) 443; Busico, V.; Cipullo, R., Monaco, G., Vacatello, M., Segre, A. L., Macromolecules 30 (1997) 6251). Standard single-pulse excitation was employed utilising the NOE and bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 11289). A total of 6144 (6k) transients were acquired per spectra using a 3 s recycle delay. Quantitative $^{13}$C{$^1$H} NMR spectra were processed, integrated and relevant quantitative properties determined from the integrals using proprietary computer programs. All chemical shifts are internally referenced to the methyl signal of the isotactic pentad mmmm at 21.85 ppm.

The tacticity distribution was quantified through integration of the methyl region between 23.6 and 19.7 ppm correcting for any sites not related to the stereo sequences of interest (Busico, V., Cipullo, R., Prog. Polym. Sci. 26 (2001) 443; Busico, V., Cipullo, R., Monaco, G., Vacatello, M., Segre, A. L., Macromolecules 30 (1997) 6251). The pentad isotacticity was determined through direct integration of the methyl region and reported as either the mole fraction or percentage of isotactic pentad mmmm with respect to all steric pentads i.e. [mmmm]=mmmm/sum of all steric pentads. When appropriate integrals were corrected for the presence of sites not directly associated with steric pentads.

Characteristic signals corresponding to regio irregular propene insertion were observed (Resconi, L., Cavallo, L., Fait, A., Piemontesi, F., Chem. Rev. 2000, 100, 1253). The presence of secondary inserted propene in the form of 2.1 erythro regio defects was indicated by the presence of the two methyl signals at 17.7 and 17.2 ppm and confirmed by the presence of other characteristic signals. The amount of 2.1 erythro regio defects was quantified using the average integral (e) of the e6 and e8 sites observed at 17.7 and 17.2 ppm respectively, i.e. e=0.5*(e6+e8). Characteristic signals corresponding to other types of regio irregularity were not observed (Resconi, L., Cavallo, L., Fait, A., Piemontesi, F., Chem. Rev. 2000, 100, 1253). The amount of primary inserted propene (p) was quantified based on the integral of all signals in the methyl region (CH3) from 23.6 to 19.7 ppm paying attention to correct for other species included in the integral not related to primary insertion and for primary insertion signals excluded from this region such that p=CH3+2*e. The relative content of a specific type of regio defect was reported as the mole fraction or percentage of said regio defect with respect all observed forms of propene insertion i.e. sum of all primary (1.2), secondary (2.1) and tertiary (3.1) inserted propene units, e.g. [21e]=e/(p+e+t+i). The total amount of secondary inserted propene in the form of 2,1-erythro or 2,1-threo regio defects was quantified as sum of all said regio irregular units, i.e. [21]=[21e]+[21t].

Quantification of Copolymer Microstructure by NMR Spectroscopy

Quantitative nuclear-magnetic resonance (NMR) spectroscopy was used to quantify the comonomer content and comonomer distribution of the copolymers, specifically propene-co-ethylene copolymers. Quantitative $^{13}$C NMR spectra recorded in the solution-state using a Bruker Advance III 400 NMR spectrometer operating at 400.15 and 100.62 MHz for $^1$H and $^{13}$C respectively. All spectra were recorded using a $^{13}$C optimised 10 mm selective excitation probehead at 125° C. using nitrogen gas for all pneumatics. Approximately 200 mg of material was dissolved in 1,2-tetrachloroethane-d$_2$ (TCE-d$_2$) with chromium-(III)-acetylacetonate (Cr(acac)$_3$) resulting in a 65 mM solution of relaxation agent in solvent (Singh, G., Kothari, A., Gupta, V., Polymer Testing 28 5 (2009), 475). This setup was chosen primarily for the high resolution and quantitative spectra needed for accurate ethylene content determination. Standard single-pulse excitation was employed without NOE, using an optimised tip angle, 1 s recycle delay and bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 11289). A total of 6144 (6k) transients were acquired per spectra. Quantitative $^{13}$C{$^1$H} NMR spectra were processed, integrated and relevant quantitative properties determined from the integrals using proprietary computer programs. All chemical shifts were indirectly referenced to the central methylene group of the ethylene block (EEE) at 30.00 ppm using the chemical shift of the solvent. This approach allowed comparable referencing even when this structural unit was not present.

Characteristic signals corresponding to regio irregular propene insertion were observed (Resconi, L., Cavallo, L., Fait, A., Piemontesi, F., Chem. Rev. 2000, 100, 1253).].

Characteristic signals corresponding to the incorporation of ethylene were observed (Cheng, H. N., Macromolecules 17, 1984, 1950). The comonomer content was calculated as the mole fraction or percent of incorporated ethylene with respect to all monomer in the copolymer using the method of Wang et. al. (Wang, W-J., Zhu, S., Macromolecules 33, 2000, 1157) through integration of multiple signals spanning the whole spectral $^{13}$C spectra. This analyse method was chosen for its robust nature and ability to account for the presence of regio irregular propene insertion when needed. Integral regions were slightly adjusted to increase applicability across the whole range of encountered comonomer contents.

For systems where only isolated ethylene incorporation (PPEPP) was observed the method of Wang et. al. was modified to reduce the influence of non-zero integrals used to quantify higher order comonomer sequences. In such cases the term for the absolute ethylene content was determined based upon only $E=0.5(S\beta\beta+S\beta\gamma+S\beta\delta+0.5(S\alpha\beta+S\alpha\gamma\square))$ or $E=0.5(I_h+I_G+0.5(I_C+I_D))$ using the same notation as Wang et. al. (Wang, W-J., Zhu, S., Macromolecules 33, 2000, 1157). The term used for absolute propylene content (P) was not modified and the mole fraction of ethylene calculated as [E]=E/(E+P). The comonomer content in weight percent was calculated from the mole fraction in the usual way i.e. [E wt %]=100*([E]*28.06)/(([E]*28.06)+((1−[E])*42.08)).

EXAMPLES

Metallocene Synthesis

Reagents 2,6-Dimethylaniline (Acros), 1-bromo-3,5-dimethylbenzene (Acros), 1-bromo-3,5-di-tert-butylbenzene (Acros), bis (2,6-diisopropylphenyl)imidazolium chloride (Aldrich), triphenylphosphine (Acros), NiCl$_2$(DME) (Aldrich), dichlorodimethylsilane (Merck), ZrCl$_4$ (Merck), trimethylborate (Acros), Pd(OAc)$_2$ (Aldrich), NaBH$_4$ (Acros), 2.5 M nBuLi in hexanes (Chemetal), CuCN (Merck), magnesium turnings (Acros), silica gel 60, 40-63 μm (Merck), bromine (Merck), 96% sulfuric acid (Reachim), sodium nitrite (Merck), copper powder (Alfa), potassium hydroxide (Merck), $K_2CO_3$ (Merck), 12 M HCl (Reachim), TsOH (Aldrich), $MgSO_4$ (Merck), $Na_2CO_3$ (Merck), $Na_2SO_4$ (Akzo Nobel), methanol (Merck), diethyl ether (Merck), 1,2-dimethoxyethane (DME, Aldrich), 95% ethanol (Merck), dichloromethane (Merck), hexane (Merck), THF (Merck), and toluene (Merck) were used as received. Hexane, toluene and dichloromethane for organometallic synthesis were dried over molecular sieves 4A (Merck). Diethyl ether, THF, and 1,2-dimethoxyethane for organometallic synthesis were distilled over sodium benzophenoneketyl. $CDCl_3$ (Deutero GmbH) and $CD_2Cl_2$ (Deutero GmbH) were dried over molecular sieves 4A. 4-Bromo-6-tert-butyl-5-methoxy-2-methylindan-1-one was obtained as described in WO2013/007650.
Synthesis of MC IE1

4-(4-tert-Butylphenyl)-1-methoxy-2-methyl-1,2,3,5,6,7-hexahydro-s-indacene

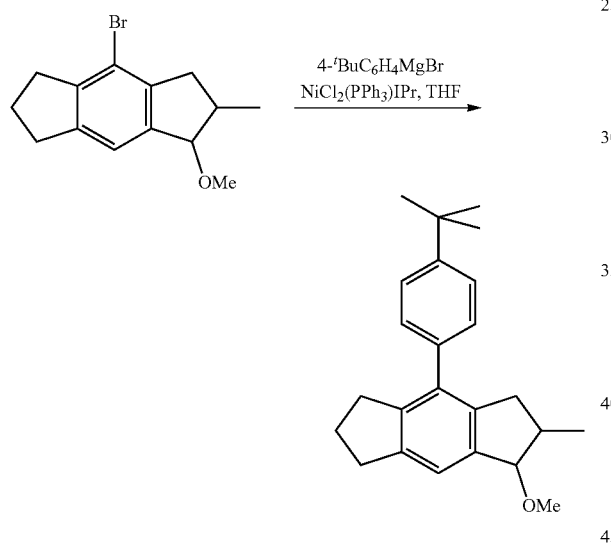

The precursor 4-bromo-1-methoxy-2-methyl-1,2,3,5,6,7-hexahydro-s-indacene was made according to the procedure described in WO2015/158790 A2 (pp 26-29).

To a mixture of 1.5 g (1.92 mmol, 0.6 mol. %) of $NiCl_2(PPh_3)IPr$ and 89.5 g (318.3 mmol) of 4-bromo-1-methoxy-2-methyl-1,2,3,5,6,7-hexahydro-s-indacene, 500 ml (500 mmol, 1.57 equiv) of 1.0 M 4-tert-butylphenylmagnesium bromide in THF was added. The resulting solution was refluxed for 3 h, then cooled to room temperature, and 1000 ml of 0.5 M HCl was added. Further on, this mixture was extracted with 1000 ml of dichloromethane, the organic layer was separated, and the aqueous layer was extracted with 250 ml of dichloromethane. The combined organic extract was evaporated to dryness to give a greenish oil. The title product was isolated by flash-chromatography on silica gel 60 (40-63 μm; eluent: hexanes-dichloromethane=3:1, vol., then 1:3, vol.). This procedure gave 107 g (ca. 100%) of 1-methoxy-2-methyl-4-(4-tert-butylphenyl)-1,2,3,5,6,7-hexahydro-s-indacene as a white solid mass.

Anal. calc. for $C_{24}H_{30}O$: C, 86.18; H, 9.04. Found: C, 85.99; H, 9.18.

$^1H$ NMR ($CDCl_3$), syn-isomer: δ 7.42-7.37 (m, 2H), 7.25-7.20 (m, 3H), 4.48 (d, J=5.5 Hz, 1H), 3.44 (s, 3H), 2.99-2.47 (m, 7H), 2.09-1.94 (m, 2H), 1.35 (s, 9H), 1.07 (d, J=6.9 Hz, 3H); Anti-isomer: δ 7.42-7.37 (m, 2H), 7.25-7.19 (m, 3H), 4.39 (d, J=3.9 Hz, 1H), 3.49 (s, 3H), 3.09 (dd, J=15.9 Hz, J=7.5 Hz, 1H), 2.94 (t, J=7.3 Hz, 2H), 2.78 (tm, J=7.3 Hz, 2H), 2.51-2.39 (m, 1H), 2.29 (dd, J=15.9 Hz, J=5.0 Hz, 1H), 2.01 (quin, J=7.3 Hz, 2H), 1.36 (s, 9H), 1.11 (d, J=7.1 Hz, 3H). $^{13}C\{^1H\}$ NMR ($CDCl_3$), syn-isomer: δ 149.31, 142.71, 142.58, 141.46, 140.03, 136.71, 135.07, 128.55, 124.77, 120.02, 86.23, 56.74, 39.41, 37.65, 34.49, 33.06, 32.45, 31.38, 25.95, 13.68; Anti-isomer: δ 149.34, 143.21, 142.90, 140.86, 139.31, 136.69, 135.11, 128.49, 124.82, 119.98, 91.53, 56.50, 40.12, 37.76, 34.50, 33.04, 32.40, 31.38, 25.97, 19.35.

4-(4-tert-Butylphenyl)-6-methyl-1,2,3,5-tetrahydro-s-indacene

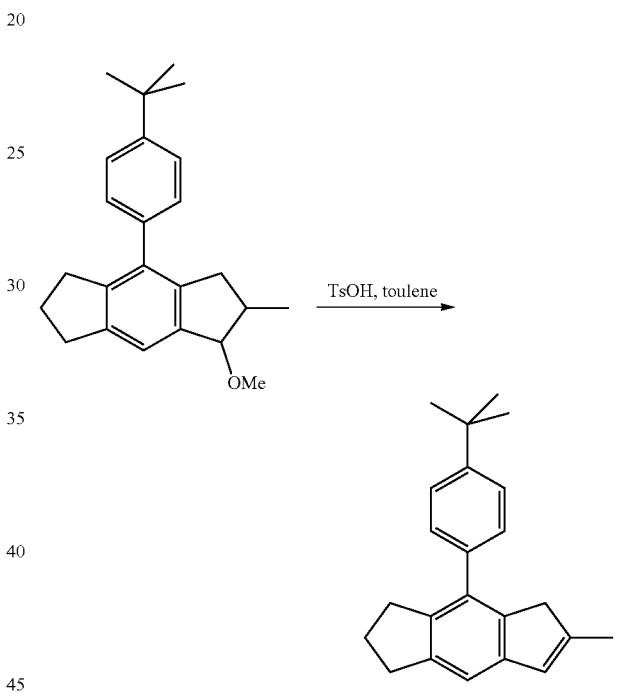

To a solution of 107 g 1-methoxy-2-methyl-4-(4-tert-butylphenyl)-1,2,3,5,6,7-hexahydro-s-indacene (prepared above) in 700 ml of toluene, 600 mg of TsOH was added, and the resulting solution was refluxed using Dean-Stark head for 10 min. After cooling to room temperature the reaction mixture was washed with 200 ml of 10% $NaHCO_3$. The organic layer was separated, and the aqueous layer was additionally extracted with 2×100 ml of dichloromethane. The combined organic extract was evaporated to dryness to give a red oil. The product was purified by flash-chromatography on silica gel 60 (40-63 μm; eluent: hexanes, then hexanes-dichloromethane=5:1, vol.) followed by vacuum distillation, b.p. 210-216° C./5-6 mm Hg. This procedure gave 77.1 g (80%) of 4-(4-tert-butylphenyl)-6-methyl-1,2,3,5-tetrahydro-s-indacene as a yellowish glassy material.

Anal. calc. for $C_{23}H_{26}$: C, 91.34; H, 8.66. Found: C, 91.47; H, 8.50.

$^1H$ NMR ($CDCl_3$): δ 7.44-7.37 (m, 2H), 7.33-7.26 (m, 2H), 7.10 (s, 1H), 6.45 (br.s, 1H), 3.17 (s, 2H), 2.95 (t, J=7.3 Hz, 2H), 2.78 (t, J=7.3 Hz, 2H), 2.07 (s, 3H), 2.02 (quin, J=7.3 Hz, 2H), 1.37 (s, 9H). $^{13}C\{^1H\}$ NMR ($CDCl_3$): δ

149.37, 145.54, 144.79, 142.91, 139.92, 138.05, 137.15, 134.06, 128.36, 127.02, 124.96, 114.84, 42.11, 34.53, 33.25, 32.16, 31.41, 25.96, 16.77.

2-methyl-[4-(4-tert-butylphenyl)-1,5,6,7-tetrahydro-s-indacen-1-yl](chloro)dimethylsilane

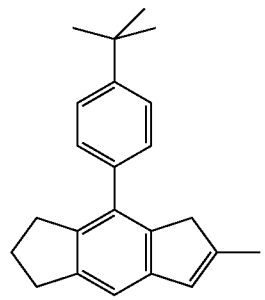

1. $^n$BuLi, Et$_2$O
2. 5 eq. Me$_2$SiCl$_2$

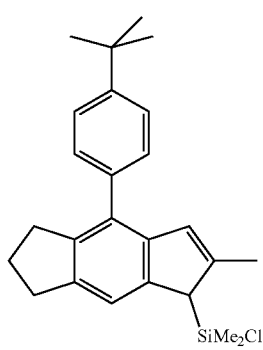

To a solution of 22.3 g (73.73 mmol) of 4-(4-tert-butylphenyl)-6-methyl-1,2,3,5-tetrahydro-s-indacene in 300 ml of ether, cooled to −50° C., 30.4 ml (73.87 mmol) of 2.43 M $^n$BuLi in hexanes was added in one portion. The resulting mixture was stirred overnight at room temperature, then the resulting suspension with a large amount of precipitate was cooled to −78° C. (wherein the precipitate was substantially dissolved to form an orange solution), and 47.6 g (369 mmol, 5 equiv.) of dichlorodimethylsilane was added in one portion. The obtained solution was stirred overnight at room temperature and then filtered through a glass frit (G4). The filtrate was evaporated to dryness to give 28.49 g (98%) of 2-methyl-[4-(4-tert-butylphenyl)-1,5,6,7-tetrahydro-s-indacen-1-yl](chloro) dimethylsilane as a colorless glass which was used without further purification.

$^1$H NMR (CDCl$_3$): δ 7-50-7.45 (m, 2H), 7.36 (s, 1H), 7.35-7.32 (m, 2H), 6.60 (s, 1H), 3.60 (s, 1H), 3.10-2.82 (m, 4H), 2.24 (s, 3H), 2.08 (quin, J=7.3 Hz, 2H), 1.42 (s, 9H), 0.48 (s, 3H), 0.22 (s, 3H). $^{13}$C{$^1$H} NMR (CDCl$_3$): δ 149.27, 144.41, 142.15, 141.41, 139.94, 139.83, 136.85, 130.19, 129.07, 126.88, 124.86, 118.67, 49.76, 34.55, 33.27, 32.32, 31.44, 26.00, 17.6

2-methyl-4-(4-tert-butylphenyl)-5-methoxy-6-tert-butyl-indan-1-one

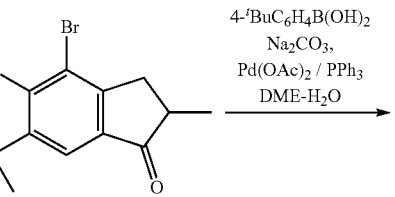

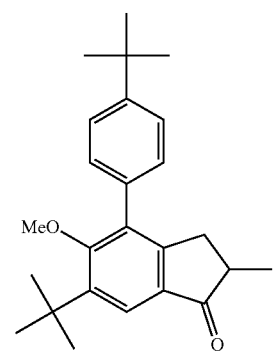

A mixture of 31.1 g (100 mmol) of 2-methyl-4-bromo-5-methoxy-6-tert-butyl-indan-1-one, 25.0 g (140 mmol) of 4-tert-butylphenylboronic acid, 29.4 g (280 mmol) of Na$_2$CO$_3$, 1.35 g (6.00 mmol, 6 mol. %) of Pd(OAc)$_2$, and 3.15 g (12.0 mmol, 12 mol. %) of PPh$_3$ in 130 ml of water and 380 ml of DME was refluxed for 6 h in argon atmosphere. The formed mixture was evaporated to dryness. To the residue 500 ml of dichloromethane and 500 ml of water were added. The organic layer was separated, the aqueous layer was additionally extracted with 100 ml of dichloromethane. The combined organic extract was dried over Na$_2$SO$_4$, evaporated to dryness, and the crude product was isolated using flash chromatography on silica gel 60 (40-63 μm; eluent: hexanes-dichloromethane=2:1, vol.). This crude product was recrystallized from n-hexane to give 29.1 g (81%) of a white solid.

Anal. calc. for C$_{25}$H$_{32}$O$_2$: C, 82.37; H, 8.85. Found: C, 82.26; H, 8.81.

$^1$H NMR (CDCl$_3$): δ 7.74 (s, 1H, 7-H in indenyl), 7.48 (d, J=8.0 Hz, 2H, 2,6-H in C$_6$H$_4$$^t$Bu), 7.33 (d, J=8.0 Hz, 2H, 3,5-H in C$_6$H$_4$$^t$Bu), 3.27 (s, 3H, OMe), 3.15 (dd, J=17.3 Hz, J=7.7 Hz, 1H, 3-H in indan-1-on), 2.67-2.59 (m, 1H, 2-H in indan-1-on), 2.48 (dd, J=17.3 Hz, J=3.7 Hz, 3'-H in indan-1-on), 1.42 (s, 9H, $^t$Bu in C$_6$H$_4$$^t$Bu), 1.38 (s, 9H, 6-$^t$Bu in indan-1-on), 1.25 (d, J=7.3 Hz, 3H, 2-Me in indan-1-one).

2-methyl-5-tert-butyl-6-methoxy-7-(4-tert-butylphenyl)-1H-indene

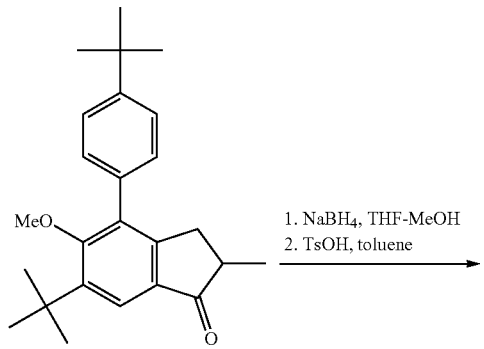

To a solution of 28.9 g (79.2 mmol) of 2-methyl-4-(4-tert-butylphenyl)-5-methoxy-6-tert-butyl-indan-1-one in 400 ml of THF cooled to 5° C. 5.00 g (132 mmol) of NaBH$_4$ was added. Further on, 100 ml of methanol was added dropwise to this mixture by vigorous stirring for ca. 7 h at 5° C. The resulting mixture was evaporated to dryness, and the residue wad partitioned between 500 ml of dichloromethane and 1000 ml of 0.5 M HCl. The organic layer was separated, the aqueous layer was additionally extracted with 100 ml of dichloromethane. The combined organic extract was evaporated to dryness to give a colorless oil. To a solution of thisoil in 500 ml of toluene 1.0 g of TsOH was added. The formed mixture was refluxed with Dean-Stark head for 15 min and then cooled to room temperature using water bath. The resulting reddish solution was washed by 10% aqueous Na$_2$CO$_3$, the organic layer was separated, the aqueous layer was extracted with 2×100 ml of dichloromethane. The combined organic extract was dried over K$_2$CO$_3$ and then passed through short pad of silica gel 60 (40-63 µm). The silica gel pad was additionally washed with 50 ml of dichloromethane. The combined organic elute was evaporated to dryness to give a yellowish crystalline mass. The product was isolated by re-crystallization of this mass from 150 ml of hot n-hexane. Crystals precipitated at 5° C. were collected dried in vacuum. This procedure gave 23.8 g of white macrocrystalline 2-methyl-5-tert-butyl-6-methoxy-7-(4-tert-butylphenyl)-1H-indene. The mother liquor was evaporated to dryness and the residue was recrystallized from 20 ml of hot n-hexane in the same way. This procedure gave additional 2.28 g of the product. Thus, the total yield of the title product was 26.1 g (95%).

Anal. calc. for C$_{25}$H$_{32}$O: C, 86.15; H, 9.25. Found: C, 86.24; H, 9.40.

$^1$H NMR (CDCl$_3$): δ 7.44 (d, J=8.5 Hz, 2H, 2,6-H in C$_6$H$_4{}^t$Bu), 7.40 (d, J=8.5 Hz, 2H, 3,5-H in C$_6$H$_4{}^t$Bu), 7.21 (s, 1H, 4-H in indenyl), 6.43 (m, 1H, 3-H in indenyl), 3.20 (s, 3H, OMe), 3.15 (s, 2H, 1-H in indenyl), 2.05 (s, 3H, 2-Me in indenyl), 1.43 (s, 9H, 5-$^t$Bu in indenyl), 1.37 (s, 9H, $^t$Bu in C$_6$H$_4{}^t$Bu).

[2-methyl-4-(4-tert-butylphenyl)-5-methoxy-6-tert-butyl-1H-inden-1-yl][2-methyl-4-(4-tert-butylphenyl)-1,5,6,7-tetrahydro-s-indacen-1-yl]dimethylsilane

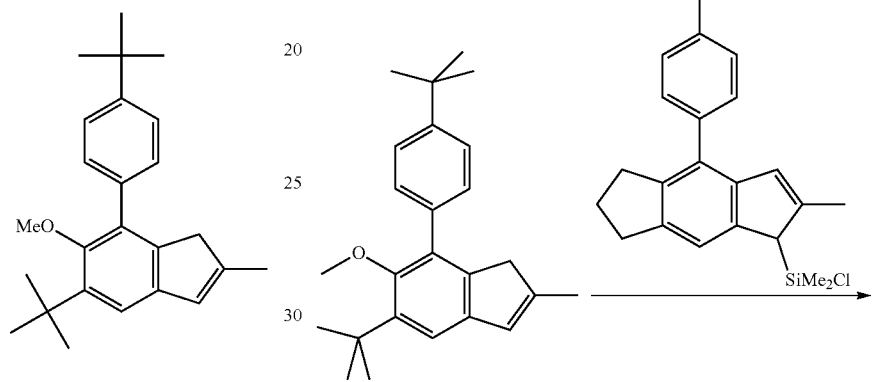

To a solution of 8.38 g (24.04 mmol) of 2-methyl-5-tert-butyl-7-(4-tert-butylphenyl)-6-methoxy-1H-indene in 150 ml of ether 9.9 ml (24.06 mmol) of 2.43 M nBuLi in hexanes was added in one portion at −50° C. This mixture was stirred overnight at room temperature, then the resulting yellow solution with yellow precipitate was cooled to −50° C., and 150 mg of CuCN was added. The obtained mixture was stirred for 0.5 h at −25° C., then a solution of 9.5 g (24.05 mmol) of 2-methyl-[4-(4-tert-butylphenyl)-1,5,6,7-tetrahydro-s-indacen-1-yl](chloro)dimethylsilane in 150 ml of ether was added in one portion. This mixture was stirred overnight at room temperature, then filtered through a pad of silica gel 60 (40-63 μm), which was additionally washed by 2×50 ml of dichloromethane. The combined filtrate was evaporated under reduced pressure, and the residue was dried in vacuum at elevated temperature. This procedure gave 17.2 g (ca. 100%) of [2-methyl-4-(4-tert-butylphenyl)-5-methoxy-6-tert-butyl-1H-inden-1-yl][2-methyl-4-(4-tert-butylphenyl)-1,5,6,7-tetrahydro-s-indacen-1-yl]dimethylsilane (ca. 95% purity by NMR spectroscopy, approx. 1:1 mixture of stereoisomers) as yellowish glassy solid which was used in the next step without additional purification.

$^1$H NMR (CDCl$_3$): δ 7.50 (s, 0.5H), 7.48-7.41 (m, 6H), 7.37-7.33 (m, 2.5H), 7.26 (s, 0.5H), 7.22 (s, 0.5H), 6.57 and 6.50 (2s, sum 2H), 3.71, 3.69, 3.67 and 3.65 (4s, sum 2H), 3.23 and 3.22 (2s, sum 3H), 3.03-2.80 (m, 4H), 2.20, 2.16 and 2.14 (3s, sum 6H), 2.08-1.99 (m, 2H), 1.43 and 1.41 (2s, sum 9H), 1.39 (s, 18H), −0.19, −0.20, −0.21 and −0.23 (4s, sum 6H). $^{13}$C{$^1$H} NMR (CDCl$_3$): δ 155.49, 155.46, 149.41, 149.14, 149.11, 147.48, 147.44, 146.01, 145.77, 143.95, 143.91, 143.76, 143.71, 142.14, 142.10, 139.52, 139.42, 139.34, 139.29, 139.20, 139.16, 137.10, 137.05, 137.03, 135.20, 130.05, 130.03, 129.73, 129.11, 127.25, 127.22, 126.20, 126.13, 125.98, 125.94, 125.05, 124.82, 120.59, 120.52, 118.51, 118.26, 60.51, 60.48, 47.31, 46.89, 46.72, 35.14, 34.55, 33.34, 33.28, 32.30, 31.47, 31.45, 31.24, 31.19, 26.02, 25.99, 17.95, 17.86.

Anti-dimethylsilanediyl[2-methyl-4-(4-tert-butylphenyl)-5-methoxy-6-tert-butylinden-1-yl][2-methyl-4-(4-tert-butylphenyl)-1,5,6,7-tetrahydro-s-indacen-1-yl]zirconium dichloride

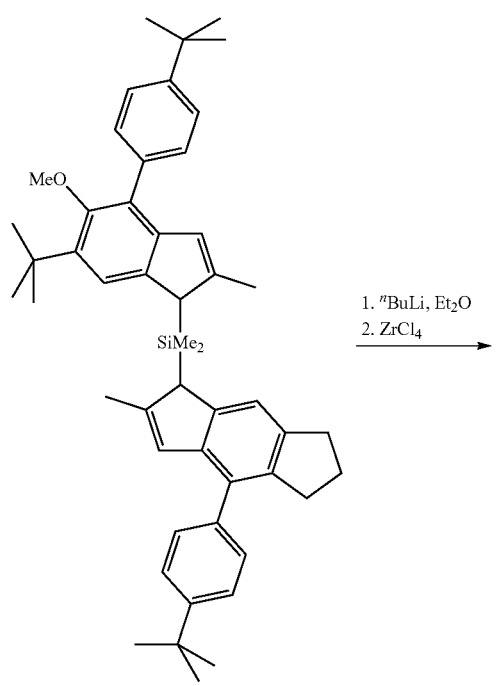

1. $^n$BuLi, Et$_2$O
2. ZrCl$_4$

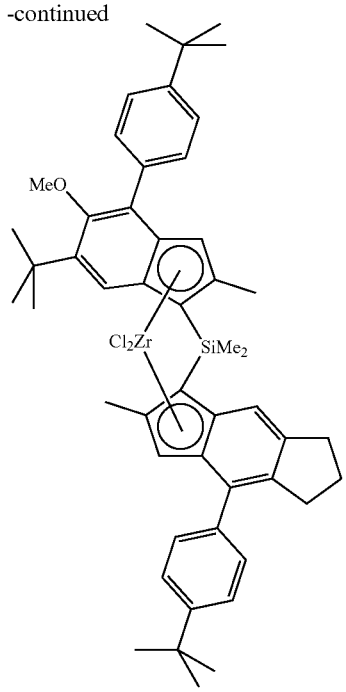

To a solution of 17.2 g (ca. 24.04 mol) of [2-methyl-4-(4-tert-butylphenyl)-5-methoxy-6-tert-butyl-1H-inden-1-yl][2-methyl-4-(4-tert-butylphenyl)-1,5,6,7-tetrahydro-s-indacen-1-yl]dimethylsilane (prepared above) in 250 ml of ether, cooled to −50° C., 19.8 ml (48.11 mmol) of 2.43 M $^n$BuLi in hexanes was added in one portion. This mixture was stirred for 4 h at room temperature, then the resulting cherry-red solution was cooled to −60° C., and 5.7 g (24.46 mmol) of ZrCl$_4$ was added. The reaction mixture was stirred for 24 h at room temperature to give red solution with orange precipitate. This mixture was evaporated to dryness. The residue was heated with 200 ml of toluene, and the formed suspension was filtered through glass frit (G4). The filtrate was evaporated to 90 ml. Yellow powder precipitated from this solution overnight at room temperature was collected, washed with 10 ml of cold toluene, and dried in vacuum. This procedure gave 4.6 g (22%) of a ca. 4 to 1 mixture of anti- and syn-zirconocenes. The mother liquor was evaporated to ca. 40 ml, and 20 ml of n-hexane was added. Orange powder precipitated from this solution overnight at room temperature was collected and dried in vacuum. This procedure gave 6.2 g (30%) of a ca. 1 to 1 mixture of anti- and syn-zirconocenes. Thus, the total yield of anti- and syn-zirconocenes isolated in this synthesis was 10.8 g (52%). Pure anti-zirconocene was obtained after crystallization of the above-described 4.6 g sample of a ca. 4 to 1 mixture of anti- and syn-zirconocenes from 20 ml of toluene. This procedure gave 1.2 g of pure anti-zirconocene.

Anti-dimethylsilanediyl[2-methyl-4-(4-tert-butylphenyl)-5-methoxy-6-tert-butylinden-1-yl][2-methyl-4-(4-tert-butylphenyl)-1,5,6,7-tetrahydro-s-indacen-1-yl]zirconium dichloride:

Anal. calc. for C$_{50}$H$_{60}$Cl$_2$OSiZr: C, 69.25; H, 6.97. Found: C, 69.43; H, 7.15.

$^1$H NMR (CDCl$_3$): δ 7.59-7.38 (group of m, 10H), 6.74 (s, 1H), 6.61 (s, 1H), 3.37 (s, 3H), 3.08-2.90 (m, 3H), 2.86-2.78 (m, 1H), 2.20 (s, 3H), 2.19 (s, 3H), 2.10-1.92 (m, 2H), 1.38 (s, 9H), 1.33 (s, 18H), 1.30 (s, 3H), 1.29 (s, 3H). $^{13}$C{$^1$H} NMR (CDCl$_3$): δ 159.94, 150.05, 149.86, 144.79, 144.01, 143.20, 135.50, 135.41, 133.87, 133.73, 133.62, 132.82, 132.29, 129.23, 128.74, 126.95, 126.87, 125.36, 125.12, 122.93, 121.68, 121.32, 120.84, 117.90, 81.65, 81.11, 62.57, 35.74, 34.58, 33.23, 32.17, 31.37, 31.36, 30.32, 26.60, 18.39, 18.30, 2.65, 2.57[1].

[1] Resonance originated from one carbon atom was not found because of overlapping with some other signal.

Synthesis of MC-IE2

4-Bromo-2,6-dimethylaniline

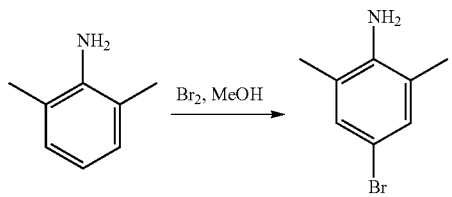

159.8 g (1.0 mol) of bromine was slowly (over 2 h) added to a stirred solution of 121.2 g (1.0 mol) of 2,6-dimethylaniline in 500 ml of methanol. The resulting dark-red solution was stirred overnight at room temperature, then poured into a cold solution of 140 g (2.5 mol) of potassium hydroxide in 1100 ml of water. The organic layer was separated, and the aqueous one was extracted with 500 ml of diethyl ether. The combined organic extract was washed with 1000 ml of water, dried over $K_2CO_3$, and evaporated in vacuum to give 202.1 g of 4-bromo-2,6-dimethylaniline (purity ca. 90%) as dark-red oil which crystallized upon standing at room temperature. This material was further used without additional purification.

$^1$H NMR (CDCl$_3$): δ 7.04 (s, 2H), 3.53 (br.s, 2H), 2.13 (s, 6H).

1-Bromo-3,5-dimethylbenzene

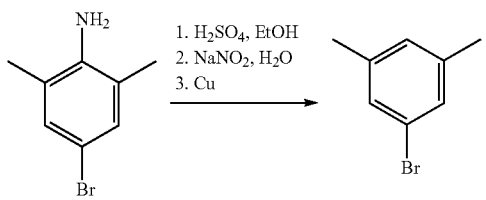

97 ml (1.82 mol) of 96% sulfuric acid was added dropwise to a solution of 134.7 g (ca. 673 mmol) of 4-bromo-2,6-dimethylaniline (prepared above, purity ca. 90%) in 1400 ml of 95% ethanol cooled to −10° C., at a such a rate to maintain the reaction temperature below 7° C. After the addition was complete, the solution was stirred at room temperature for 1 h. Then, the reaction mixture was cooled in an ice-bath, and a solution of 72.5 g (1.05 mol) of sodium nitrite in 150 ml of water was added dropwise over ca. 1 h. The formed solution was stirred at the same temperature for 30 min. Then the cooling bath was removed, and 18 g of copper powder was added. Upon completion of the rapid evolution of nitrogen additional portions (ca. 5 g each, ca. 50 g in total) of copper powder were added with 10 min intervals until gas evolution ceased completely. The reaction mixture was stirred at room temperature overnight, then filtered through a glass frit (G3), diluted with two-fold volume of water, and the crude product was extracted with 4×150 ml of dichloromethane. The combined extract was dried over $K_2CO_3$, evaporated to dryness, and then distilled in vacuum (b.p. 60-63° C./5 mm Hg) to give a yellowish liquid. This product was additionally purified by flash-chromatography on silica gel 60 (40-63 μm; eluent: hexane) and distilled once again (b.p. 51-52° C./3 mm Hg) to give 63.5 g (51%) of 1-bromo-3,5-dimethylbenzene as a colorless liquid.

$^1$H NMR (CDCl$_3$): δ 7.12 (s, 2H), 6.89 (s, 1H), 2.27 (s, 6H). $^{13}$C{$^1$H} NMR (CDCl$_3$): δ 139.81, 129.03, 128.61, 122.04, 20.99.

(3,5-Dimethylphenyl)boronic acid

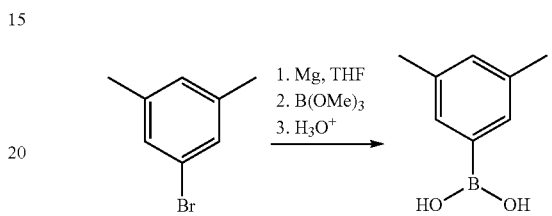

A solution of 3,5-dimethylphenylmagnesium bromide obtained from a solution of 190.3 g (1.03 mol) of 1-bromo-3,5-dimethylbenzene in 1000 ml of THF and 32 g (1.32 mol, 28% excess) of magnesium turnings was cooled to −78° C., and 104 g (1.0 mol) of trimethylborate was added in one portion. The resulting heterogeneous mixture was stirred overnight at room temperature. The boronic ester was hydrolyzed by careful addition of 1200 ml of 2 M HCl. 500 ml of diethyl ether was added, the organic layer was separated, and the aqueous layer was additionally extracted with 2×500 ml of diethyl ether. The combined organic extract was dried over $Na_2SO_4$ and then evaporated to dryness to give white mass. The latter was triturated with 200 ml of n-hexane, filtered through glass frit (G3), and the precipitate was dried in vacuo. This procedure gave 114.6 g (74%) of (3,5-dimethylphenyl)boronic acid.

Anal. calc. for $C_8H_{11}BO_2$: C, 64.06; H, 7.39. Found: C, 64.38; H, 7.72.

$^1$H NMR (DMSO-d$_6$): δ 7.38 (s, 2H), 7.00 (s, 1H), 3.44 (very br.s, 2H), 2.24 (s, 6H).

2-methyl-4-(3,5-dimethylphenyl)-5-methoxy-6-tert-butyl-indan-1-one

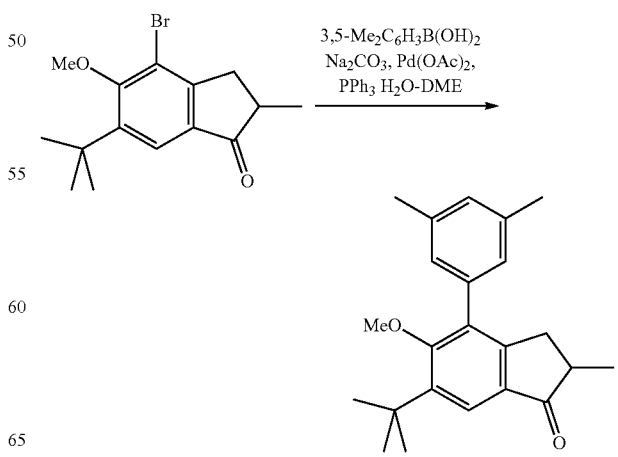

A mixture of 49.14 g (157.9 mmol) of 2-methyl-4-bromo-5-methoxy-6-tert-butylindan-1-one, 29.6 g (197.4 mmol, 1.25 eq.) of (3,5-dimethylphenyl)boronic acid, 45.2 g (427 mmol) of $Na_2CO_3$, 1.87 g (8.3 mmol, 5 mol. %) of Pd(OAc)$_2$, 4.36 g (16.6 mmol, 10 mol. %) of PPh$_3$, 200 ml of water, and 500 ml of 1,2-dimethoxyethane was refluxed for 6.5 h. DME was evaporated on a rotary evaporator, 600 ml of water and 700 ml of dichloromethane were added to the residue. The organic layer was separated, and the aqueous one was additionally extracted with 200 ml of dichloromethane. The combined extract was dried over $K_2CO_3$ and then evaporated to dryness to give a black oil. The crude product was purified by flash chromatography on silica gel 60 (40-63 µm, hexane-dichloromethane=1:1, vol., then, 1:3, vol.) to give 48.43 g (91%) of 2-methyl-4-(3,5-dimethylphenyl)-5-methoxy-6-tert-butylindan-1-one as a brownish oil.

Anal. calc. for $C_{23}H_{28}O_2$: C, 82.10; H, 8.39. Found: C, 82.39; H, 8.52.

$^1$H NMR (CDCl$_3$): δ 7.73 (s, 1H), 7.02 (s, 3H), 7.01 (s, 3H), 3.32 (s, 3H), 3.13 (dd, J=17.5 Hz, J=7.8 Hz, 1H), 2.68-2.57 (m, 1H), 2.44 (dd, J=17.5 Hz, J=3.9 Hz, 1H), 2.36 (s, 6H), 1.42 (s, 9H), 1.25 (d, J=7.5 Hz, 3H). $^{13}$C{$^1$H} NMR (CDCl$_3$): δ 208.90, 163.50, 152.90, 143.32, 138.08, 136.26, 132.68, 130.84, 129.08, 127.18, 121.30, 60.52, 42.17, 35.37, 34.34, 30.52, 21.38, 16.40.

2-methyl-5-tert-butyl-6-methoxy-7-(3,5-dimethylphenyl)-1H-indene

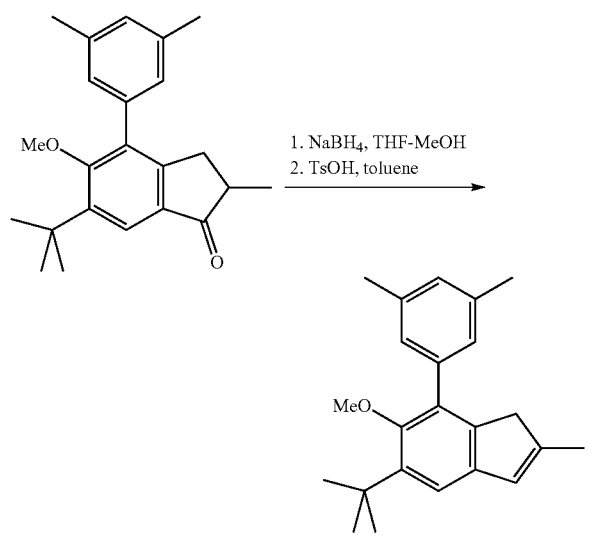

8.2 g (217 mmol) of NaBH$_4$ was added to a solution of 48.43 g (143.9 mmol) of 2-methyl-4-(3,5-dimethylphenyl)-5-methoxy-6-tert-butylindan-1-one in 300 ml of THF cooled to 5° C. Then, 150 ml of methanol was added dropwise to this mixture by vigorous stirring for ca. 7 h at 5° C. The resulting mixture was evaporated to dryness, and the residue was partitioned between 500 ml of dichloromethane and 500 ml of 2 M HCl. The organic layer was separated, the aqueous layer was additionally extracted with 100 ml of dichloromethane. The combined organic extract was evaporated to dryness to give a slightly yellowish oil. To a solution of thisoil in 600 ml of toluene 400 mg of TsOH was added, this mixture was refluxed with Dean-Stark head for 10 min and then cooled to room temperature using a water bath. The formed solution was washed by 10% $Na_2CO_3$, the organic layer was separated, the aqueous layer was extracted with 150 ml of dichloromethane. The combined organic extract was dried over $K_2CO_3$ and then passed through a short layer of silica gel 60 (40-63 µm). The silica gel layer was additionally washed by 100 ml of dichloromethane. The combined organic elute was evaporated to dryness, and the resulting oil was dried in vacuum at elevated temperature. This procedure gave 45.34 g (98%) of 2-methyl-5-tert-butyl-6-methoxy-7-(3,5-dimethylphenyl)-1H-indene which was used without additional purification.

Anal. calc. for $C_{23}H_{28}O$: C, 86.20; H, 8.81. Found: C, 86.29; H, 9.07.

$^1$H NMR (CDCl$_3$): δ 7.20 (s, 1H), 7.08 (br.s, 1H), 6.98 (br.s, 1H), 6.42 (m, 1H), 3.25 (s, 3H), 3.11 (s, 2H), 2.36 (s, 6H), 2.06 (s, 3H), 1.43 (s, 9H). $^{13}$C{$^1$H} NMR (CDCl$_3$): δ 154.20, 145.22, 141.78, 140.82, 140.64, 138.30, 137.64, 131.80, 128.44, 127.18, 126.85, 116.98, 60.65, 42.80, 35.12, 31.01, 21.41, 16.65.

[2-methyl-4-(3,5-dimethylphenyl)-5-methoxy-6-tert-Butyl-1H-inden-1-yl](chloro)dimethylsilane

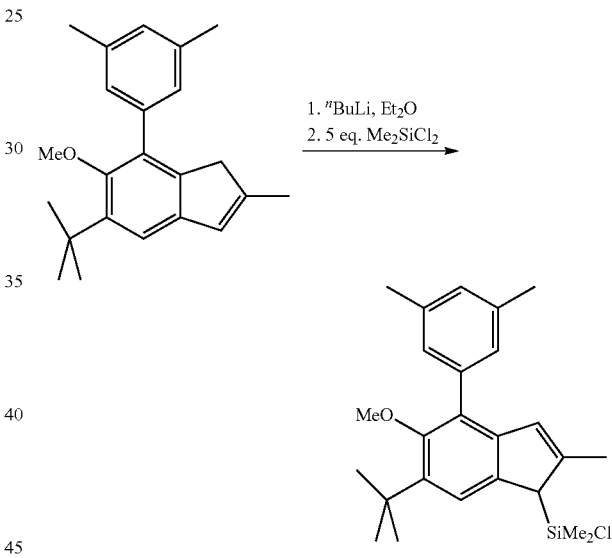

To a solution of 9.0 g (28.08 mmol) of 2-methyl-5-tert-butyl-6-methoxy-7-(3,5-dimethylphenyl)-1H-indene in 150 ml of ether, cooled to −50° C., 11.6 ml (28.19 mmol) of 2.43 M $^n$BuLi in hexanes was added in one portion. The resulting mixture was stirred for 6 h at room temperature, then the obtained yellow suspension was cooled to −60° C., and 18.1 g (140.3 mmol, 5 equiv.) of dichlorodimethylsilane was added in one portion. The obtained solution was stirred overnight at room temperature and then filtered through a glass frit (G3). The filtrate was evaporated to dryness to give [2-methyl-4-(3,5-dimethylphenyl)-5-methoxy-6-tert-Butyl-1H-inden-1-yl](chloro)dimethylsilane as a slightly yellowish oil which was further used without an additional purification.

$^1$H NMR (CDCl$_3$): δ 7.38 (s, 1H), 7.08 (s, 2H), 6.98 (s, 1H), 6.43 (s, 1H), 3.53 (s, 1H), 3.25 (s, 3H), 2.37 (s, 6H), 2.19 (s, 3H), 1.43 (s, 9H), 0.43 (s, 3H), 0.17 (s, 3H). $^{13}$C{$^1$H} NMR (CDCl$_3$): δ 155.78, 145.88, 143.73, 137.98, 137.56, 137.49, 136.74, 128.32, 127.86, 127.55, 126.64, 120.86, 60.46, 49.99, 35.15, 31.16, 21.41, 17.55, 1.11, −0.58.

49
1-methoxy-2-methyl-4-(3,5-Dimethylphenyl)-1,2,3,5,6,7-hexahydro-s-indacene

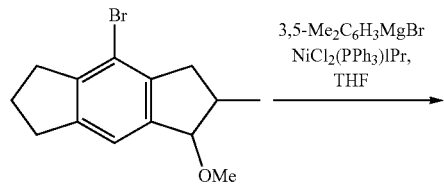

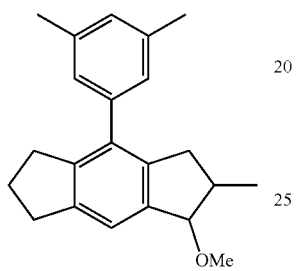

To a mixture of 2.0 g (2.56 mmol, 1.8 mol. %) of NiCl$_2$(PPh$_3$)IPr and 40.0 g (142.3 mmol) of 4-bromo-1-methoxy-2-methyl-1,2,3,5,6,7-hexahydro-s-indacene, 200 ml (200 mmol, 1.4 eq) of 3,5-dimethylphenylmagnesium bromide 1.0 M in THF was added. The resulting solution was refluxed for 3 h, then cooled to room temperature, and 400 ml of water followed by 500 ml of 1.0 M HCl solution were added. Further on, this mixture was extracted with 600 ml of dichloromethane, the organic layer was separated, and the aqueous layer was extracted with 2×100 ml of dichloromethane. The combined organic extract was evaporated to dryness to give a slightly greenish oil. The product was isolated by flash-chromatography on silica gel 60 (40-63 µm; eluent: hexanes-dichloromethane=2:1, vol., then 1:2, vol.). This procedure gave 43.02 g (99%) of 1-methoxy-2-methyl-4-(3,5-dimethylphenyl)-1,2,3,5,6,7-hexahydro-s-indacene as a colorless thick oil as a mixture of two diastereoisomers.

Anal. calc. for C$_{22}$H$_{26}$O: C, 86.23; H, 8.55. Found: C, 86.07; H, 8.82.

$^1$H NMR (CDCl$_3$), Syn-isomer: δ 7.21 (s, 1H), 6.94 (br.s, 1H), 6.90 (br.s, 2H), 4.48 (d, J=5.5 Hz, 1H), 3.43 (s, 3H), 2.94 (t, J=7.5 Hz, 2H), 2.87-2.65 (m, 3H), 2.63-2.48 (m, 2H), 2.33 (s, 6H), 2.02 (quin, J=7.5 Hz, 2H), 1.07 (d, J=6.7 Hz, 3H); Anti-isomer: δ 7.22 (s, 1H), 6.94 (br.s, 1H), 6.89 (br.s, 2H), 4.38 (d, J=4.0 Hz, 1H), 3.48 (s, 3H), 3.06 (dd, J=16.0 Hz, J=7.5 Hz, 1H), 2.93 (t, J=7.3 Hz, 2H), 2.75 (td, J=7.3 Hz, J=3.2 Hz, 2H), 2.51-2.40 (m, 1H), 2.34 (s, 6H), 2.25 (dd, J=16.0 Hz, J=5.0 Hz, 1H), 2.01 (quin, J=7.3 Hz, 2H), 1.11 (d, J=7.1 Hz, 3H). $^{13}$C{$^1$H} NMR (CDCl$_3$), Syn-isomer: δ 142.69, 142.49, 141.43, 139.97, 139.80, 137.40, 135.46, 128.34, 126.73, 120.09, 86.29, 56.76, 39.43, 37.59, 33.11, 32.37, 25.92, 21.41, 13.73; Anti-isomer: δ 143.11, 142.72, 140.76, 139.72, 139.16, 137.37, 135.43, 128.29, 126.60, 119.98, 91.53, 56.45, 40.06, 37.65, 33.03, 32.24, 25.88, 21.36, 19.36.

50
4-(3,5-Dimethylphenyl)-6-methyl-1,2,3,5-tetrahydro-s-indacene

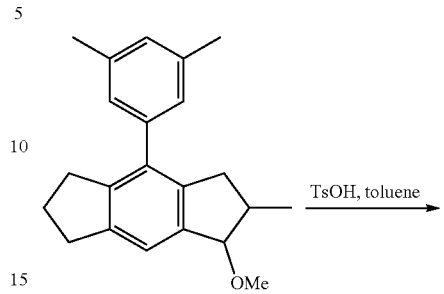

To the solution of 43.02 g (140.4 mmol) 1-methoxy-2-methyl-4-(3,5-dimethylphenyl)-1,2,3,5,6,7-hexahydro-s-indacene in 600 ml of toluene, 200 mg of TsOH was added, and the resulting solution was refluxed using Dean-Stark head for 15 min. After cooling to room temperature the reaction mixture was washed with 200 ml of 10% NaHCO$_3$. The organic layer was separated, and the aqueous layer was additionally extracted with 300 ml of dichloromethane. The combined organic extract was evaporated to dryness to give light orange oil. The product was isolated by flash-chromatography on silica gel 60 (40-63 µm; eluent: hexanes, then hexanes-dichloromethane=10:1, vol.). This procedure gave 35.66 g (93%) of 4-(3,5-dimethylphenyl)-6-methyl-1,2,3,5-tetrahydro-s-indacene as a slightly yellowish oil which spontaneously solidified to form a white mass.

Anal. calc. for C$_{21}$H$_{22}$: C, 91.92; H, 8.08. Found: C, 91.78; H, 8.25.

$^1$H NMR (CDCl$_3$): δ 7.09 (s, 1H), 6.98 (br.s, 2H), 6.96 (br.s, 1H), 6.44 (m, 1H), 3.14 (s, 2H), 2.95 (t, J=7.3 Hz, 2H), 2.76 (t, J=7.3 Hz, 2H), 2.35 (s, 6H), 2.07 (s, 3H), 2.02 (quin, J=7.3 Hz, 2H). $^{13}$C{$^1$H} NMR (CDCl$_3$): δ 145.46, 144.71, 142.81, 140.17, 139.80, 137.81, 137.50, 134.33, 128.35, 127.03, 126.48, 114.83, 42.00, 33.23, 32.00, 25.87, 21.38, 16.74.

[2-methyl-4-(3,5-dimethylphenyl)-5-methoxy-6-tert-Butyl-1H-inden-1-yl][2-methyl-4-(3,5-dimethylphenyl)-1,5,6,7-tetrahydro-s-indacen-1-yl]dimethylsilane

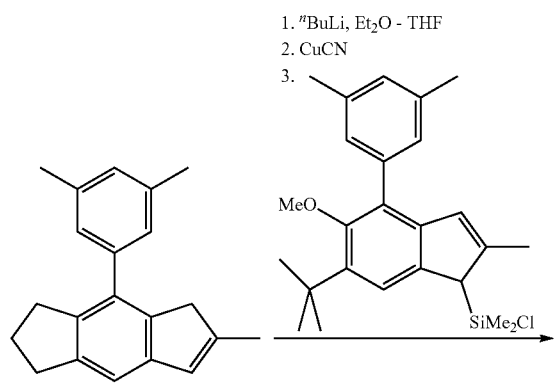

To a solution of 7.71 g (28.1 mmol) of 4-(3,5-dimethylphenyl)-6-methyl-1,2,3,5-tetrahydro-s-indacene in a mixture of 150 ml of ether and 20 ml of THF 11.6 ml (28.19 mmol) of 2.43 M $^n$BuLi in hexanes was added in one portion at −50° C. This mixture was stirred for 6 h at room temperature, then the resulting orange solution was cooled to −50° C., and 150 mg of CuCN was added. The obtained mixture was stirred for 0.5 h at −25° C., then a solution of [2-methyl-4-(3,5-dimethylphenyl)-5-methoxy-6-tert-butyl-1H-inden-1-yl](chloro)dimethylsilane (prepared above, ca. 28.08 mmol) in 150 ml of ether was added in one portion. This mixture was stirred overnight at room temperature, then filtered through a pad of silica gel 60 (40-63 μm), which was additionally washed by 2×50 ml of dichloromethane. The combined filtrate was evaporated under reduced pressure to give a yellow oil. The product was isolated by flash-chromatography on silica gel 60 (40-63 μm; eluent: hexanes-dichloromethane=10:1, vol., then 5:1, vol.). This procedure gave 11.95 g (65%) of [2-methyl-4-(3,5-dimethylphenyl)-5-methoxy-6-tert-Butyl-1H-inden-1-yl][2-methyl-4-(3,5-dimethylphenyl)-1,5,6,7-tetrahydro-s-indacen-1-yl]dimethylsilane (as ca. 1:1 mixture of stereoisomers) as a yellowish glassy solid.

Anal. calc. for $C_{46}H_{54}OSi$: C, 84.87; H, 8.36. Found: C, 85.12; H, 8.59.

$^1$H NMR (CDCl$_3$): δ 7.48 and 7.33 (2s, sum 1H), 7.26-7.18 (m, 1H), 7.16-7.07 (m, 2H), 7.04-6.95 (m, 4H), 6.51 and 6.45 (2s, sum 2H), 3.69 and 3.65 (2s, sum 2H), 3.28 and 3.26 (2s, sum 3H), 3.01-2.74 (m, 4H), 2.38 ad 2.37 (2s, sum 12H), 2.20 and 2.15 (2s, sum 6H), 2.09-1.97 (m, 2H), 1.43 and 1.42 (2s, sum 9H), −0.17, −0.18, −0.19 and −0.24 (4s, sum 6H). $^{13}C\{^1H\}$ NMR (CDCl$_3$): δ 155.29, 147.45, 147.39, 145.99, 145.75, 143.93, 143.90, 143.72, 143.69, 142.06, 142.01, 140.08, 140.06, 139.46, 139.37, 139.26, 139.03, 139.00, 138.24, 137.50, 137.34, 137.07, 136.99, 130.39, 128.23, 128.14, 127.92, 127.50, 127.46, 127.26, 126.12, 126.05, 125.99, 125.94, 120.55, 120.51, 118.46, 118.27, 60.49, 47.33, 46.86, 46.76, 35.14, 33.33, 33.28, 32.18, 31.26, 31.21, 25.95, 25.91, 21.44, 17.96, 17.88, −5.27, −5.39, −5.50, −5.82.

Anti-dimethylsilanediyl[2-methyl-4-(3,5-dimethylphenyl)-5-methoxy-6-tert-butylinden-1-yl][2-methyl-4-(3,5-dimethylphenyl)-1,5,6,7-tetrahydro-s-indacen-1-yl]zirconium dichloride

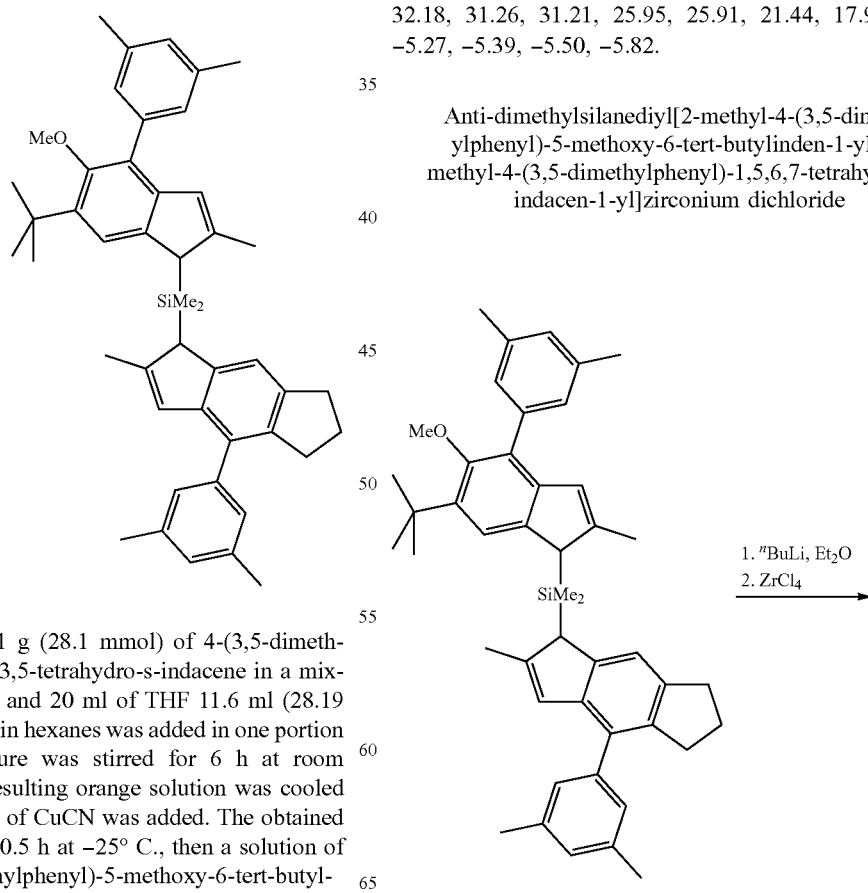

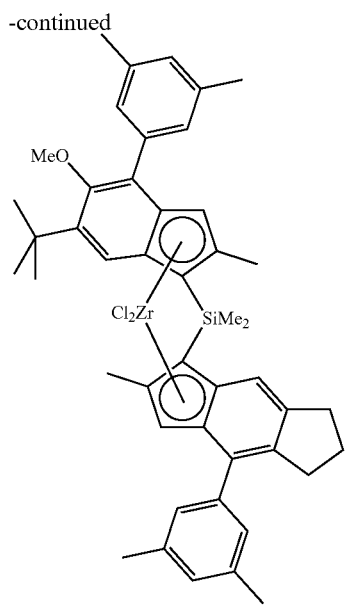

To a solution of 11.95 g (18.36 mol) of [2-methyl-4-(3,5-dimethylphenyl)-5-methoxy-6-tert-butyl-1H-inden-1-yl][2-methyl-4-(3,5-dimethylphenyl)-1,5,6,7-tetrahydro-s-indacen-1-yl]dimethylsilane (prepared above) in 200 ml of ether, cooled to −50° C., 15.1 ml (35.7 mmol) of 2.43 M ⁿBuLi in hexanes was added in one portion. This mixture was stirred for 3 h at room temperature, then the resulting red solution was cooled to −78° C., and 4.28 g (18.37 mmol) of ZrCl₄ was added. The reaction mixture was stirred for 24 h at room temperature to give light red solution with orange precipitate. This mixture was evaporated to dryness. The residue was treated with 250 ml of hot toluene, and the formed suspension was filtered through glass frit (G4). The filtrate was evaporated to 40 ml. Red powder precipitated from this solution overnight at room temperature was collected, washed with 10 ml of cold toluene, and dried in vacuum. This procedure gave 0.6 g of syn-zirconocene. The mother liquor was evaporated to ca. 35 ml, and 15 ml of n-hexane was added to the warm solution. The red powder precipitated from this solution overnight at room temperature was collected and dried in vacuum. This procedure gave 3.49 g syn-zirconocene. The mother liquor was evaporated to ca. 20 ml, and 30 ml of n-hexane was added to the warm solution. The yellow powder precipitated from this solution overnight at room temperature was collected and dried in vacuum. This procedure gave 4.76 g anti-zirconocene as a solvate with toluene (×0.6 toluene) contaminated with ca. 2% of syn-isomer. Thus, the total yield of syn- and anti-zirconocenes isolated in this synthesis was 8.85 g (59%).

Anti-dimethylsilanediyl[2-methyl-4-(3,5-dimethylphenyl)-5-methoxy-6-tert-butylinden-1-yl][2-methyl-4-(3,5-dimethylphenyl)-1,5,6,7-tetrahydro-s-indacen-1-yl]zirconium dichloride:

Anal. calc. for $C_{46}H_{52}Cl_2OSiZr \times 0.6 C_7H_8$: C, 69.59; H, 6.61. Found: C, 69.74; H, 6.68.

$^1$H NMR (CDCl₃): δ 7.47 (s, 1H), 7.40 (s, 1H), 7.37-7.03 (m, 4H), 6.95 (s, 2H), 6.71 (s, 1H), 6.55 (s, 1H), 3.43 (s, 3H), 3.03-2.96 (m, 2H), 2.96-2.87 (m, 1H), 2.87-2.76 (m, 1H), 2.34 and 2.33 (2s, sum 12H), 2.19 and 2.18 (2s, sum 6H), 2.06-1.94 (m, 2H), 1.38 (s, 9H), 1.28 (s, 3H), 1.27 (s, 3H). $^{13}$C NMR (CDCl₃): δ 159.73, 144.59, 143.99, 143.00, 138.26, 137.84, 137.59, 136.80, 135.35, 133.85, 133.63, 132.95, 132.52, 128.90, 128.80, 127.40, 126.95, 126.87, 126.65, 122.89, 121.61, 121.53, 120.82, 117.98, 81.77, 81.31, 62.62, 35.73, 33.20, 32.12, 30.37, 26.49, 21.47, 21.38, 18.40, 18.26, 2.64, 2.54.

Syn-dimethylsilanediyl[2-methyl-4-(3,5-dimethylphenyl)-5-methoxy-6-tert-butylinden-1-yl][2-methyl-4-(3,5-dimethylphenyl)-1,5,6,7-tetrahydro-s-indacen-1-yl]zirconium dichloride.

Anal. calc. for $C_{46}H_{52}Cl_2OSiZr$: C, 68.11; H, 6.46. Found: C, 68.37; H, 6.65.

$^1$H NMR (CDCl₃): δ 7.51 (s, 1H), 7.39 (s, 1H), 7.36-6.99 (m, 4H), 6.95 (s, 2H), 6.60 (s, 1H), 6.44 (s, 1H), 3.27 (s, 3H), 2.91-2.75 (m, 4H), 2.38 and 2.34 (2s, sum 18H), 1.99-1.87 (m, 1H), 1.87-1.74 (m, 1H), 1.42 (s, 3H), 1.36 (s, 9H), 1.19 (s, 3H). $^{13}$C{$^1$H} NMR (CDCl₃): δ 158.74, 143.41, 142.84, 142.31, 138.30, 137.77, 137.55, 136.85, 135.87, 135.73, 134.99, 134.75, 131.64, 128.83, 128.76, 127.97, 127.32, 126.82, 126.22, 123.91, 121.35, 121.02, 120.85, 118.56, 83.47, 83.08, 62.32, 35.53, 33.33, 31.96, 30.33, 26.53, 21.45 (two resonances), 18.56, 18.43, 2.93, 2.65.

Alternative Synthesis of MC-IE2

2-methyl-4-bromo-5-methoxy-6-tert-butyl-indan-1-one is obtained as described above.

One-Pot Synthesis of 2-methyl-5-tert-butyl-6-methoxy-7-(3,5-dimethylphenyl)-1H-indene from 2-methyl-4-bromo-5-methoxy-6-tert-butyl-indan-1-one

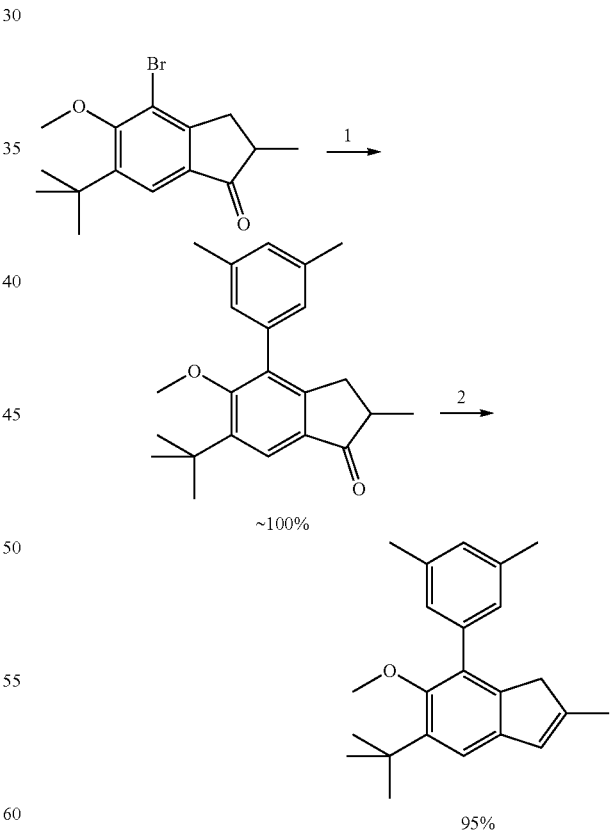

Step 1: 2 mol. % Pd(P$^t$Bu₃)₂, 2-MeTHF, 7 h at reflux

A mixture of 2-methyl-4-bromo-5-methoxy-6-tert-butyl-indan-1-one (15.75 g, 50.61 mmol), (3,5-dimethylphenyl)boronic acid (9.5 g, 63.34 mmol, 1.25 equiv.), Na₂CO₃ (14.5 g, 137 mmol), Pd(P$^t$Bu₃)₂ (0.51 g, 1 mmol), 66 ml of water and 165 ml of 2-methyltetrahydrofuran was refluxed for 7 h. After cooling to room temperature, the organic layer was separated, dried over K$_2$CO$_3$, and the resulting solution was used in the following step without additional purification.

$^1$H NMR (CDCl$_3$): δ 7.73 (s, 1H), 7.02 (s, 3H), 7.01 (s, 3H), 3.32 (s, 3H), 3.13 (dd, J=17.5 Hz, J=7.8 Hz, 1H), 2.68-2.57 (m, 1H), 2.44 (dd, J=17.5 Hz, J=3.9 Hz), 2.36 (s, 6H), 1.42 (s, 9H), 1.25 (d, J=7.5 Hz, 3H). $^{13}$C{$^1$H} NMR (CDCl$_3$): δ 208.90, 163.50, 152.90, 143.32, 138.08, 136.26, 132.68, 130.84, 129.08, 127.18, 121.30, 60.52, 42.17, 35.37, 34.34, 30.52, 21.38, 16.40

Step 2: a) NaBH$_{4/2}$-MeTHF/MeOH; b) TsOH/toluene at reflux

NaBH$_4$ (5.2 g, 138 mmol) was added to the above solution of 2-methyl-4-(3,5-dimethylphenyl)-5-methoxy-6-tert-butyl-indan-1-one in 165 ml of 2-methyltetrahydrofuran cooled to 5° C. Further on, 80 ml of methanol was added dropwise to this mixture for ca. 7 h at 5° C. The resulting mixture was evaporated to dryness, 300 ml of dichloromethane and 300 ml water were added to the residue, and thus obtained mixture was acidified with 2 M HCl to pH~6.5. The organic layer was separated; the aqueous layer was additionally extracted with 100 ml of dichloromethane. The combined organic extract was passed through a pad (~200 ml) of silica gel 60 (40-63 µm; eluent: dichloromethane). The obtained elute was evaporated to dryness to give a slightly brownish oil. 200 mg of TsOH was added to a solution of thisoil in 200 ml of toluene. This mixture was refluxed with Dean-Stark head for 10 min and then cooled to room temperature using a water bath. The formed solution was washed with 10% Na$_2$CO$_3$, the organic layer was separated, and the aqueous layer was extracted with 50 ml of dichloromethane. The combined organic extract was dried over K$_2$CO$_3$ and then evaporated to dryness. The residue was dissolved in 100 ml of n-hexane, and the obtained solution was passed through a short pad (~20 ml) of silica gel 60 (40-63 µm; eluent: n-hexane). The silica gel layer was additionally washed by 40 ml of n-hexane. The combined organic elute was evaporated to dryness, and the resulting oil was dried in vacuum at elevated temperature to give 15.35 g (95%) of 2-methyl-5-tert-butyl-6-methoxy-7-(3,5-dimethylphenyl)-1H-indene which was used in the following step without additional purification.

$^1$H NMR (CDCl$_3$): δ 7.20 (s, 1H), 7.08 (br.s, 1H), 6.98 (br.s, 1H), 6.42 (m, 1H), 3.25 (s, 3H), 3.11 (s, 2H), 2.36 (s, 6H), 2.06 (s, 3H), 1.43 (s, 9H). $^{13}$C NMR (CDCl$_3$): δ 154.20, 145.22, 141.78, 140.82, 140.64, 138.30, 137.64, 131.80, 128.44, 127.18, 126.85, 116.98, 60.65, 42.80, 35.12, 31.01, 21.41, 16.65.

Synthesis of 4-(3,5-dimethylphenyl)-6-methyl-1, 2, 3,5-tetrahydro-s-indacene

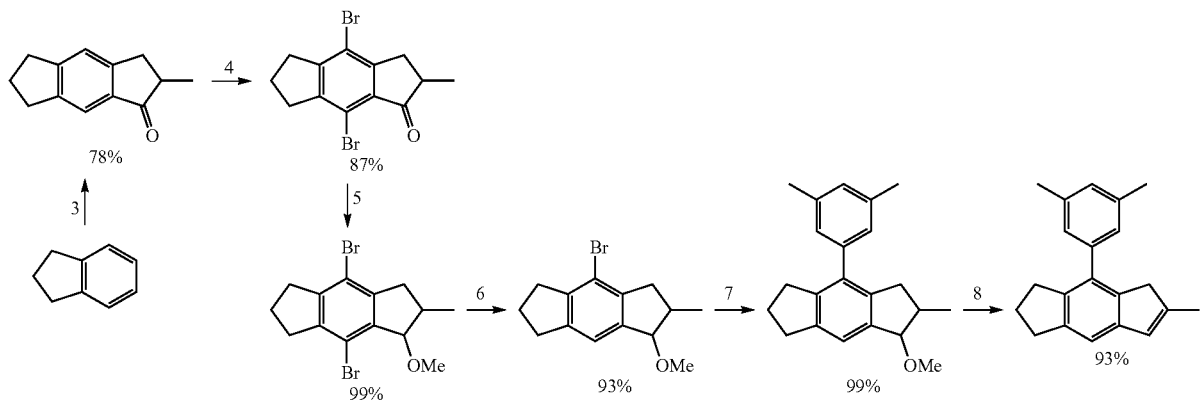

Step 3 to 6 according to patent literature (e.g. WO2015158790).

Step 7:
200 ml (200 mmol, 1.4 eq) of 3,5-dimethylphenylmagnesium bromide 1.0 M in THF was added to a mixture of 2.0 g (2.56 mmol, 1.8 mol. %) of NiCl$_2$(PPh$_3$)IPr and 40.0 g (142.3 mmol) of 1-methoxy-2-methyl-4-bromo-1,2,3,5,6,7-hexahydro-s-indacene. The resulting solution was refluxed for 3 h and then cooled to room temperature, and 400 ml of water followed by 500 ml of 1.0 M HCl solution were added. Then this mixture was extracted with 600 ml of dichloromethane, the organic layer was separated, and the aqueous layer was extracted with 2×100 ml of dichloromethane. The combined organic extract was evaporated to dryness to give a slightly greenish oil. The product was isolated by flash-chromatography on silica gel 60 (40-63 µm; eluent: hexanes-dichloromethane=2:1, vol., then 1:2, vol.). This procedure gave 43.02 g (99%) of 1-methoxy-2-methyl-4-(3,5-dimethylphenyl)-1,2,3,5,6,7-hexahydro-s-indacene as a colorless thick oil as a mixture of two diastereoisomers.

$^1$H NMR (CDCl$_3$), Syn-isomer: δ 7.21 (s, 1H), 6.94 (br.s, 1H), 6.90 (br.s, 2H), 4.48 (d, J=5.5 Hz, 1H), 3.43 (s, 3H), 2.94 (t, J=7.5 Hz, 2H), 2.87-2.65 (m, 3H), 2.63-2.48 (m, 2H), 2.33 (s, 6H), 2.02 (quin, J=7.5 Hz, 2H), 1.07 (d, J=6.7 Hz, 3H); Anti-isomer: δ 7.22 (s, 1H), 6.94 (br.s, 1H), 6.89 (br.s, 2H), 4.38 (d, J=4.0 Hz, 1H), 3.48 (s, 3H), 3.06 (dd, J=16.0 Hz, J=7.5 Hz, 1H), 2.93 (t, J=7.3 Hz, 2H), 2.75 (td, J=7.3 Hz, J=3.2 Hz, 2H), 2.51-2.40 (m, 1H), 2.34 (s, 6H), 2.25 (dd, J=16.0 Hz, J=5.0 Hz, 1H), 2.01 (quin, J=7.3 Hz, 2H), 1.11 (d, J=7.1 Hz, 3H). $^{13}$C{$^1$H} NMR (CDCl$_3$), Syn-isomer: δ 142.69, 142.49, 141.43, 139.97, 139.80, 137.40, 135.46, 128.34, 126.73, 120.09, 86.29, 56.76, 39.43, 37.59, 33.11, 32.37, 25.92, 21.41, 13.73; Anti-isomer: δ 143.11, 142.72, 140.76, 139.72, 139.16, 137.37, 135.43, 128.29, 126.60, 119.98, 91.53, 56.45, 40.06, 37.65, 33.03, 32.24, 25.88, 21.36, 19.36.

Step 8:
TsOH (200 mg) was added to the solution of 43.02 g (140.4 mmol) of 1-methoxy-2-methyl-4-(3,5-dimethylphenyl)-1,2,3,5,6,7-hexahydro-s-indacene in 600 ml of toluene and the resulting solution was refluxed using Dean-Stark head for 15 min. After cooling to room temperature the reaction mixture was washed with 200 ml of 10% NaHCO$_3$. The organic layer was separated, and the aqueous layer was additionally extracted with 300 ml of dichloromethane. The combined organic extract was evaporated to dryness to give light orange oil. The product was isolated by flash-chromatography on silica gel 60 (40-63 μm; eluent: hexanes, then hexanes-dichloromethane=10:1, vol.). This procedure gave 35.66 g (93%) of 4-(3,5-dimethylphenyl)-6-methyl-1,2,3,5-tetrahydro-s-indacene as a slightly yellowish oil which spontaneously solidified to form a white mass.

$^1$H NMR (CDCl$_3$): δ 7.09 (s, 1H), 6.98 (br.s, 2H), 6.96 (br.s, 1H), 6.44 (m, 1H), 3.14 (s, 2H), 2.95 (t, J=7.3 Hz, 2H), 2.76 (t, J=7.3 Hz, 2H), 2.35 (s, 6H), 2.07 (s, 3H), 2.02 (quin, J=7.3 Hz, 2H). $^{13}$C{$^1$H} NMR (CDCl$_3$): δ 145.46, 144.71, 142.81, 140.17, 139.80, 137.81, 137.50, 134.33, 128.35, 127.03, 126.48, 114.83, 42.00, 33.23, 32.00, 25.87, 21.38, 16.74

Synthesis of MC-IE2

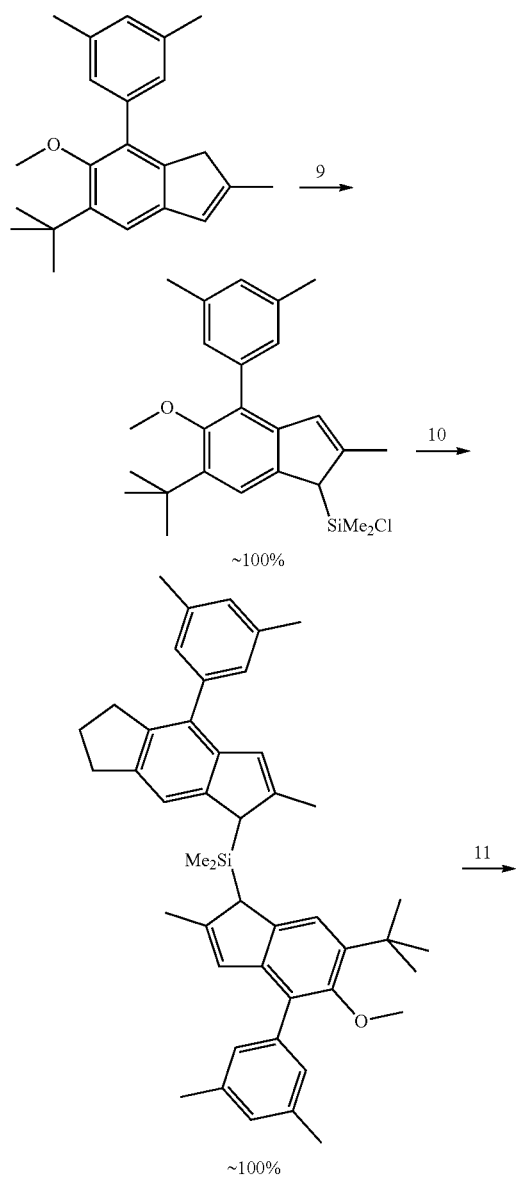

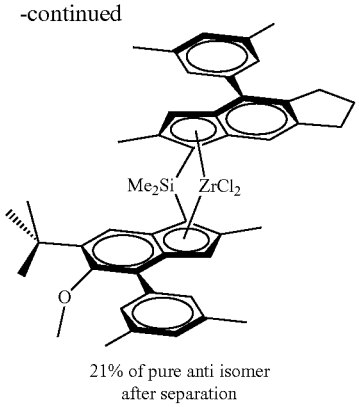

21% of pure anti isomer after separation

Step 9: a) $^n$BuLi in $^n$Bu$_2$O, −5° C.; b) 5 equiv Me$_2$SiCl$_2$, THF, −30° C.

$^n$BuLi in hexanes (2.43 M, 20.2 ml, 49.09 mmol) was added in one portion to a solution of 2-methyl-5-tert-butyl-6-methoxy-7-(3,5-dimethylphenyl)-1H-indene (15.69 g, 48.96 mmol) in 250 ml of di-n-butyl ether cooled to −5° C. The resulting mixture was stirred overnight at room temperature, then the formed white suspension with a large amount of precipitate (which makes effective stirring difficult) was cooled to −30° C., and THF (8 ml, 7.11 g, i.e. ca. 2.01 ratio of THF to the starting indene was used) was added to give a clear orange solution. This solution was cooled to −30° C., and then dichlorodimethylsilane (31.6 g, 244.9 mmol, 5 equiv.) was added in one portion. The obtained mixture was stirred overnight at room temperature and then filtered through a glass frit (G3). The filtrate was evaporated to dryness to give [2-methyl-4-(3,5-dimethylphenyl)-5-methoxy-6-tert-butyl-1H-inden-1-yl]chlorodimethylsilane as a slightly yellowish oil (containing some hard-to-remove impurity of di-n-butyl ether) which was used in the following step without additional purification Step 10: $^n$BuLi in hexanes (2.43 M, 20.1 ml, 48.84 mmol) was added in one portion to a solution of 4-(3,5-dimethylphenyl)-6-methyl-1,2,3,5-tetrahydro-s-indacene (13.43 g, 48.94 mmol) in a mixture of di-n-butyl ether (200 mL) and THF (8 ml, 7.11 g, i.e. ca. 2.02 ratio of THF to the starting indene) at −10° C. This mixture was stirred overnight at room temperature, giving an orange suspension. To this suspension, a solution of [2-methyl-4-(3,5-dimethylphenyl)-5-methoxy-6-tert-butyl-1H-inden-1-yl]chlorodimethylsilane (as prepared above, ca. 48.96 mmol) in 120 ml of di-n-butyl ether was added in one portion. This mixture was stirred overnight at room temperature.

Step 11:

$^n$BuLi in hexanes (2.43 M, 11.6 ml, 28.19 mmol) was added in one portion to a solution of 9.16 g (14.07 mol) of [6-tert-butyl-4-(3,5-dimethylphenyl)-5-methoxy-2-methyl-1H-inden-1-yl][4-(3,5-dimethylphenyl)-2-methyl-1,5,6,7-tetrahydro-s-indacen-1-yl]dimethylsilane in 190 ml of di-n-butyl ether cooled to −30° C. This mixture was stirred for 4 h at room temperature, then the resulting ruby solution was cooled to −30° C. (some yellow precipitate formed), and then ZrCl$_4$ (3.28 g, 14.08 mmol) was added. The reaction mixture was stirred for 24 h at room temperature to give light red solution with orange precipitate. This precipitate was filtered off (G4) and then dried in vacuum to give 4.7 g of a mixture of syn-complex and LiCl (thus, the adjusted net weight of syn-complex was 3.51 g). The filtrate was evaporated until a viscous oil was obtained, which was then triturated with 40 ml of n-hexane. The obtained suspension was filtered through glass frit (G3), and the so obtained precipitate was dried under vacuum. This procedure gave 3.5 g of pure anti-zirconocene dichloride (D69) as a yellow powder. Yellow powder precipitated from the solution overnight at −25° C. was collected and dried under vacuum. This procedure gave 1.85 g of anti-zirconocene contaminated with 5% of its syn-isomer. Thus, the total yield of syn- and anti-zirconocenes isolated in this synthesis was 8.86 g (78%).

Synthesis of MC-IE3

[2-methyl-4-(3,5-dimethylphenyl)-5-methoxy-6-tert-butyl-1H-inden-1-yl][2-methyl-4-(4-tert-butylphenyl)-1,5,6,7-tetrahydro-s-indacen-1-yl]dimethylsilane

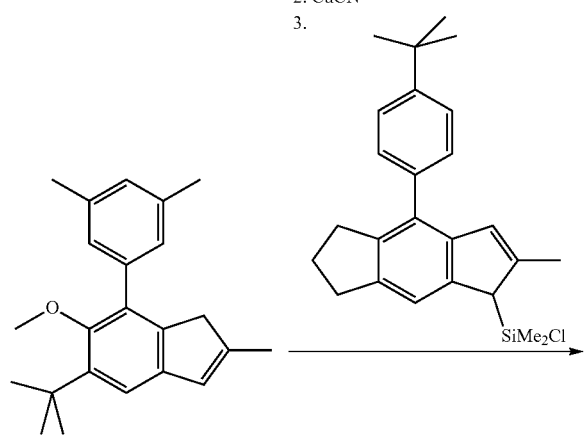

was stirred overnight at room temperature, then the resulting yellow solution with a large amount of yellow precipitate was cooled to −50° C. (wherein the precipitate disappeared completely), and 150 mg of CuCN was added. The obtained mixture was stirred for 0.5 h at −25° C., then a solution of 9.70 g (24.55 mmol) of 2-methyl-[4-(4-tert-butylphenyl)-1,5,6,7-tetrahydro-s-indacen-1-yl](chloro)dimethylsilane in 150 ml of ether was added in one portion. This mixture was stirred overnight at room temperature, then filtered through a pad of silica gel 60 (40-63 μm), which was additionally washed with 2×50 ml of dichloromethane. The combined filtrate was evaporated under reduced pressure, and the residue was dried in vacuum at elevated temperature. This procedure gave 16.2 g (97%) of [2-methyl-4-(3,5-dimethylphenyl)-5-methoxy-6-tert-butyl-1H-inden-1-yl][2-methyl-4-(4-tert-butylphenyl)-1,5,6,7-tetrahydro-s-indacen-1-yl]dimethylsilane (>95% purity by NMR, approx. 1:1 mixture of the stereoisomers) as a yellowish glassy solid which was further used without an additional purification.

$^1$H NMR (CDCl$_3$): δ 7.49 (s, 0.5H), 7.47-7.42 (m, 2H), 7.37-7.32 (m, 2.5H), 7.25 (s, 0.5H), 7.22 (s, 0.5H), 7.15-7.09 (m, 2H), 7.01-6.97 (m, 1H), 6.57, 6.56 and 6.45 (3s, sum 2H), 3.70, 3.69, 3.67 and 3.65 (4s, sum 2H), 3.28 and 3.27 (2s, sum 3H), 3.01-2.79 (m, 4H), 2.38 (s, 6H), 2.19, 2.16 and 2.13 (3s, sum 6H), 2.07-2.00 (m, 2H), 1.43 and 1.41 (2s, sum 9H), 1.38 (s, 9H), −0.18, −0.19, −0.20 and −0.23 (4s, sum 6H). $^{13}$C{$^1$H} NMR (CDCl$_3$): δ 155.30, 155.27, 149.14, 149.10, 147.45, 147.38, 146.01, 145.77, 143.98, 143.92, 143.73, 143.68, 142.13, 142.09, 139.51, 139.41, 139.26, 139.23, 139.19, 139.15, 138.22, 137.51, 137.08, 137.05, 136.98, 130.05, 130.01, 129.11, 128.22, 127.90, 127.48, 127.44, 126.18, 126.13, 125.97, 125.92, 124.82, 120.55, 120.49, 118.50, 118.27, 60.54, 60.50, 47.34, 47.33, 46.87, 46.72, 35.14, 34.54, 33.34, 33.28, 32.30, 31.44, 31.25, 31.20, 26.02, 26.01, 21.45, 17.95, 17.87.

Anti-dimethylsilanediyl[2-methyl-4-(3,5-dimethylphenyl)-5-methoxy-6-tert-butylinden-1-yl][2-methyl-4-(4-tert-butylphenyl)-1,5,6,7-tetrahydro-s-indacen-1-yl]zirconium dichloride

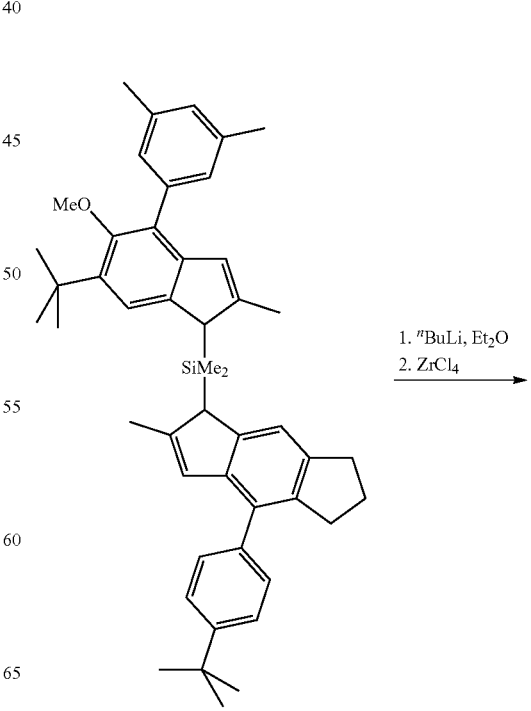

To a solution of 7.87 g (24.56 mmol) of 2-methyl-5-tert-butyl-6-methoxy-7-(3,5-dimethylphenyl)-1H-indene in 150 ml of ether, 10.1 ml (24.54 mmol) of 2.43 M $^n$BuLi in hexanes was added in one portion at −50° C. This mixture -continued

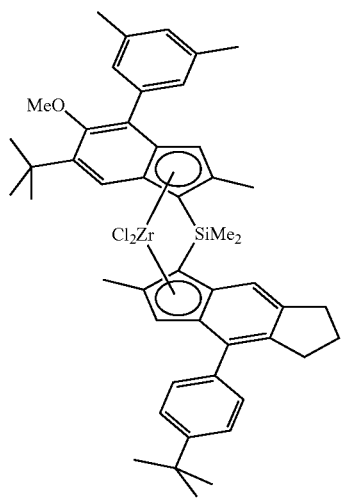

To a solution of 16.2 g (23.86 mmol) of [2-methyl-4-(3,5-dimethylphenyl)-5-methoxy-6-tert-butyl-1H-inden-1-yl][2-methyl-4-(4-tert-butylphenyl)-1,5,6,7-tetrahydro-s-indacen-1-yl]dimethylsilane (prepared above) in 250 ml of ether, cooled to −50° C., 19.7 ml (47.87 mmol) of 2.43 M $^n$BuLi in hexanes was added in one portion. This mixture was stirred for 4 h at room temperature, then the resulting red solution was cooled to −50° C., and 5.57 g (23.9 mmol) of $ZrCl_4$ was added. The reaction mixture was stirred for 24 h at room temperature to give red solution with orange precipitate. This mixture was evaporated to dryness. The residue was treated with 150 ml of hot toluene, and the formed suspension was filtered through glass frit (G4). The filtrate was evaporated to 50 ml, and then 20 ml of n-hexane was added. The orange crystals precipitated from this solution overnight at room temperature were collected, washed with 10 ml of cold toluene, and dried in vacuum. This procedure gave 5.02 g (25%) of anti-zirconocene as a solvate with toluene (×0.75 toluene). The mother liquor was evaporated to ca. 30 ml, and 30 ml of n-hexane was added. The orange powder precipitated from this solution overnight at room temperature was collected and dried in vacuum. This procedure gave 6.89 g (34%) of a ca. 3 to 7 mixture of anti- and syn-zirconocenes. Thus, the total yield of rac-zirconocene isolated in this synthesis was 11.91 g (60%).

Anti-dimethylsilanediyl[2-methyl-4-(3,5-dimethylphenyl)-5-methoxy-6-tert-butylinden-1-yl][2-methyl-4-(4-tert-butylphenyl)-1,5,6,7-tetrahydro-s-indacen-1-yl]zirconium dichloride.

Anal. calc. for $C_{48}H_{56}Cl_2OSiZr×0.75C_7H_8$: C, 70.42; H, 6.88. Found: C, 70.51; H, 6.99.

$^1$H NMR (CDCl$_3$): δ 7.63-7.03 (very br.s, 2H), 7.59-7.51 (br.m, 2H), 7.51-7.42 (m, 4H), 6.98 (s, 1H), 6.78 (s, 1H), 6.60 (s, 1H), 3.46 (s, 3H), 3.11-3.04 (m, 1H), 3.04-2.93 (m, 2H), 2.88-2.81 (m, 1H), 2.36 (s, 6H), 2.22 (s, 3H), 2.21 (s, 3H), 2.12-1.94 (m, 2H), 1.41 (s, 9H), 1.36 (s, 9H), 1.32 (s, 3H), 1.31 (s, 3H). $^{13}$C{$^1$H} NMR (CDCl$_3$): δ 159.78, 149.90, 144.67, 144.07, 143.07, 136.75, 135.44, 135.40, 133.97, 133.51, 132.90, 132.23, 128.84, 128.76, 127.34, 127.01, 126.73, 125.28, 125.17, 122.89, 121.68, 121.59, 120.84, 117.94, 81.60, 81.26, 62.61, 35.73, 34.60, 33.20, 32.17, 31.36, 30.34, 26.56, 21.40, 18.41, 18.26, 2.65, 2.54.

Synthesis of MC-IE4

Chloro[2-methyl-4-(4-tert-butylphenyl)-1,5,6,7-tetrahydro-s-indacen-1-yl]dimethylsilane

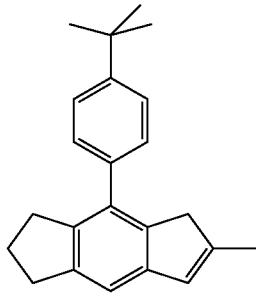

1. $^n$BuLi, Et$_2$O
2. 5 eq. Me$_2$SiCl$_2$

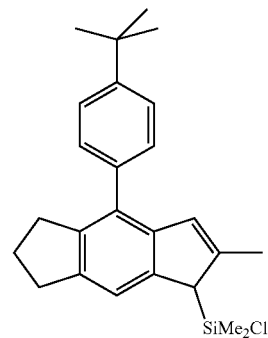

$^n$BuLi in hexanes (2.43 M, 16.9 ml, 41.07 mmol) was added in one portion to a solution of 12.43 g (41.1 mmol) of 4-(4-tert-butylphenyl)-6-methyl-1,2,3,5-tetrahydro-s-indacene in 200 ml of ether cooled to −50° C. The resulting mixture was stirred overnight at room temperature; the resulting yellow slurry (light orange solution with a large amount of yellow precipitate) was then cooled to −50° C., during the cooling the precipitate completely dissolved to form an orange solution, and 26.5 g (205 mmol, 5 equiv.) of dichlorodimethylsilane was added in one portion. The obtained solution was stirred overnight at room temperature and then filtered through a glass frit (G3), the flask and the filter cake were rinsed with 50 ml of toluene. The filtrate was evaporated to dryness to give 16 g (99%) of chloro[2-methyl-4-(4-tert-butylphenyl)-1,5,6,7-tetrahydro-s-indacen-1-yl]dimethylsilane as slightly yellowish oil which was used without further purification.

$^1$H NMR (CDCl$_3$): δ 7.47-7.41 (m, 2H), 7.34-7.27 (m, 3H), 6.56 (s, 1H), 3.56 (s, 1H), 3.05-2.78 (m, 4H), 2.20 (s, 3H), 2.04 (quin, J=7.4 Hz, 2H), 1.38 (s, 9H), 0.44 (s, 3H), 0.18 (s, 3H). $^{13}$C{$^1$H} NMR (CDCl$_3$): δ 149.27, 144.42, 142.14, 141.40, 139.94, 139.83, 136.84, 130.18, 129.07, 126.87, 124.86, 118.67, 49.76, 34.55, 33.26, 32.31, 31.43, 26.00, 17.60, 1.17, −0.60.

[2-methyl-4-(3,5-di-tert-butylphenyl)-5-methoxy-6-tert-butyl-1H-inden-1-yl][2-methyl-4-(4-tert-butylphenyl)-1,5,6,7-tetrahydro-s-indacen-1-yl]dimethylsilane

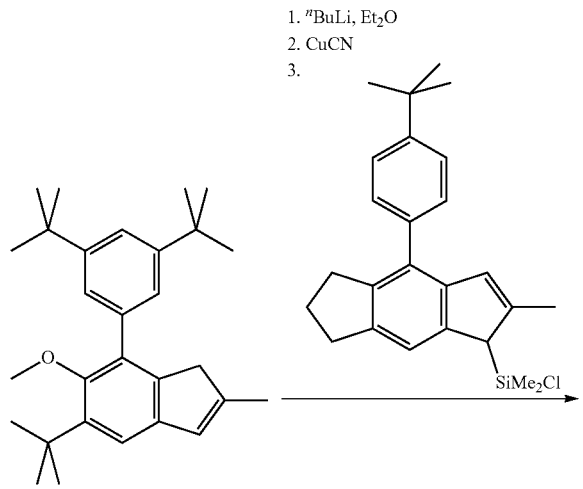

$^n$BuLi in hexanes (2.43 M, 13.8 ml, 33.53 mmol) was added in one portion to a solution of 13.55 g (33.49 mmol) of 2-methyl-5-tert-butyl-6-methoxy-7-(3,5-di-tert-butylphenyl)-1H-indene in 200 ml of ether at −50° C. This mixture was stirred for 5 h at room temperature; the resulting orange slurry with a large amount of yellow precipitate was then cooled to −50° C., and 150 mg of CuCN was added. The obtained mixture was stirred for 0.5 h at −25° C., then a solution of 13.23 g (33.49 mmol) of chloro[2-methyl-4-(4-tert-butylphenyl)-1,5,6,7-tetrahydro-s-indacen-1-yl]dimethylsilane in 150 ml of ether was added in one portion. This mixture was stirred overnight at room temperature, then filtered through a pad of silica gel 60 (40-63 μm), which was additionally washed with 2×50 ml of dichloromethane. The combined filtrate was evaporated under reduced pressure, and the product was isolated by flash-chromatography on silica gel 60 (40-63 μm; eluent: hexanes-dichloromethane=10:1, then 3:1 vol). This procedure gave 18.4 g (72%) of [2-methyl-4-(3,5-di-tert-butylphenyl)-5-methoxy-6-tert-butyl-1H-inden-1-yl][4-(4-tert-butylphenyl)-2-methyl-1,5,6,7-tetrahydro-s-indacen-1-yl]dimethylsilane (>95% purity by NMR, approx. 1:1 mixture of stereoisomers) as yellowish glass which was used without further purification.

$^1$H NMR (CDCl$_3$): δ 7.52-7.40 (m, 3H), 7.40-7.30 (m, 4H), 7.27 (s, 1H), 7.22 (s, 1H), 6.57, 6.52 and 6.51 (3s, sum 2H), 3.71, 3.69 and 3.66 (3s, sum 2H), 3.20 and 3.19 (2s, sum 3H), 3.02-2.77 (m, 4H), 2.20, 2.18 and 2.16 (3s, sum 6H), 2.09-1.97 (m, 2H), 1.43 and 1.42 (2s, sum 9H), 1.38 and 1.37 (2s, sum 27H), −0.18, −0.19 and −0.23 (3s, sum 6H). $^{13}$C{$^1$H} NMR (CDCl$_3$): δ 155.49, 150.23, 149.15, 149.11, 147.36, 147.29, 146.04, 145.83, 143.99, 143.70, 142.15, 142.10, 139.53, 139.42, 139.24, 139.18, 139.13, 137.21, 137.17, 137.10, 130.07, 130.02, 129.13, 128.06, 126.18, 124.82, 124.72, 120.46, 120.40, 119.84, 118.54, 118.31, 60.08, 47.29, 46.92, 46.80, 35.17, 34.86, 34.54, 33.31, 32.31, 31.57, 31.46, 31.23, 31.19, 26.01, 18.08, 18.04, 17.99, 17.88, −5.30, −5.57, −5.62, −5.84.

Anti-dimethylsilanediyl[2-methyl-4-(3,5-di-tert-butylphenyl)-5-methoxy-6-tert-butyl-inden-1-yl][2-methyl-4-(4-tert-butylphenyl)-5,6,7-trihydro-s-indacen-1-yl]zirconium dichloride MC-IE4

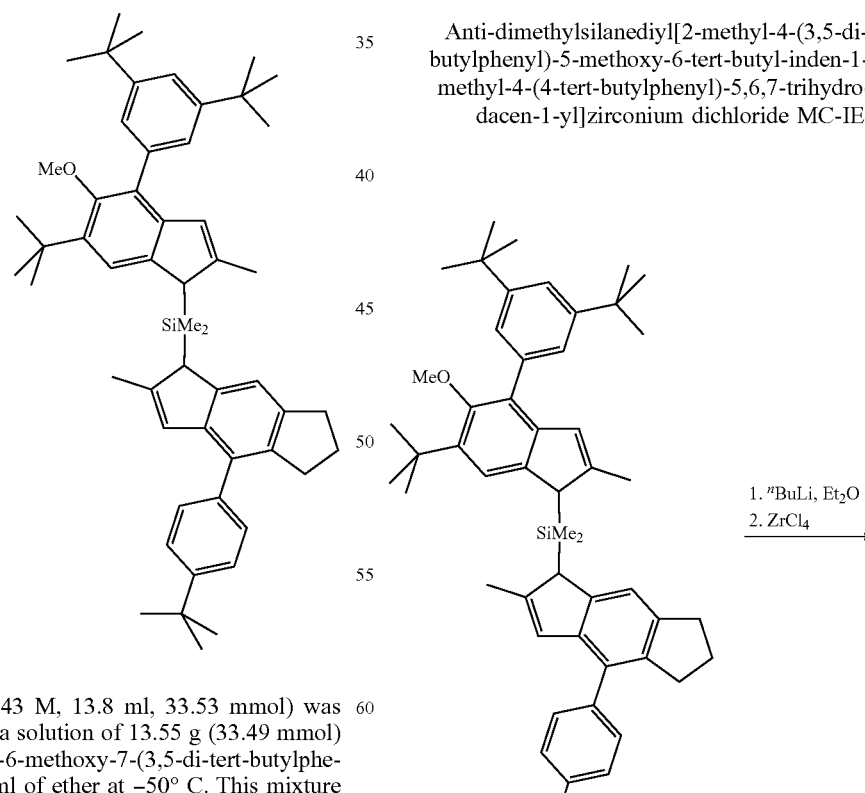

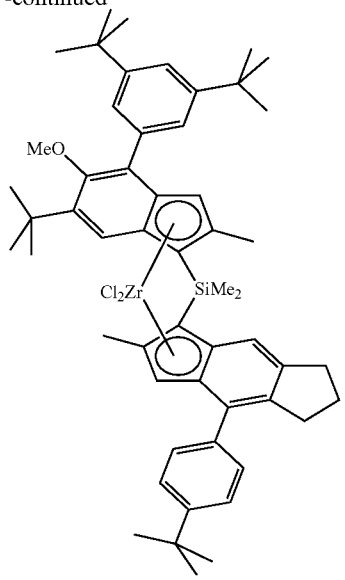

$^n$BuLi in hexanes (2.43 M, 19.9 ml, 48.36 mmol) was added in one portion to a solution of 18.4 g (24.11 mmol) of [2-methyl-4-(3,5-di-tert-butylphenyl)-5-methoxy-6-tert-butyl-1H-inden-1-yl][2-methyl-4-(4-tert-butylphenyl)-1,5,6,7-tetrahydro-s-indacen-1-yl]dimethylsilane (as prepared above) in 200 ml of ether cooled to −60° C. This mixture was stirred overnight at room temperature; the resulting orange slurry was then cooled to −60° C. and 5.62 g (24.12 mmol) of ZrCl$_4$ was added. The reaction mixture was stirred for 24 h at room temperature to give a red solution with a small amount of precipitate. This mixture was evaporated to dryness. The residue was heated with 150 ml of toluene, and the formed suspension was filtered through glass frit (G4). The filtrate was evaporated to 80 ml, and then 20 ml of n-pentane was added. Orange powder precipitated from this solution overnight at room temperature was collected and dried in vacuum. This procedure gave 6.02 g (27%) of syn-zirconocene as a solvate with toluene (×1 PhMe) contaminated with ca. 2% of anti-isomer. The mother liquor was evaporated to ca. 30 ml, and 30 ml of n-hexane was added. Orange powder precipitated from this solution overnight at room temperature was collected and dried under vacuum. This procedure gave 1.38 g (6%) of syn-zirconocene as a solvate with toluene (×1 PhMe) contaminated with ca. 8% of anti-isomer. The mother liquor was evaporated to the oily state, and this oil was dissolved in 50 ml of n-hexane. Yellow powder precipitated from this solution over 2 days at −30° C. was collected and dried in vacuum. This procedure gave 7.3 g (33%) of anti-zirconocene contaminated with ca. 3% of syn-isomer. Thus, the total yield of anti- and syn-zirconocenes isolated in this synthesis was 14.7 g (66%).

7.3 g (33%) of anti-zirconocene contaminated with ca. 3% of syn-isomer was additionally recrystallized from a hot mixture of 15 ml of toluene and 30 ml of n-hexane. Light-orange crystals precipitated overnight at room temperature were collected and dried under vacuum. This procedure gave 4.6 g of pure anti-zirconocene as a solvate with toluene (×0.8 PhMe).

Anti-dimethylsilanediyl[2-methyl-4-(3,5-di-tert-butylphenyl)-5-methoxy-6-tert-butylinden-1-yl][2-methyl-4-(4-tert-butylphenyl)-5,6,7-trihydro-s-indacen-1-yl]zirconium dichloride Anal. calc. for C$_{54}$H$_{68}$Cl$_2$OSiZr×0.8C$_7$H$_8$: C, 71.80; H, 7.52. Found: C, 72.04; H, 7.75.

$^1$H NMR (CDCl$_3$): δ 7.60-7.30 (set of signals, sum 9H), 6.73 (s, 1H), 6.60 (s, 1H), 3.33 (s, 3H), 3.16-3.02 (m, 1H), 3.02-2.88 (m, 2H), 2.88-2.77 (m, 1H), 2.20 (s, 3H), 2.19 (s, 3H), 2.11-1.91 (m, 2H), 1.38 (s, 9H), 1.34 (s, 9H), 1.33 (s, 18H), 1.29 (s, 3H), 1.28 (s, 3H). $^{13}$C{$^1$H} NMR (CDCl$_3$): δ 160.02, 149.90, 144.69, 143.96, 143.05, 135.95, 135.51, 135.40, 133.99, 133.72, 132.85, 132.16, 128.80, 127.54, 126.97, 125.16, 124.25, 122.74, 121.76, 121.12, 120.68, 120.45, 117.96, 81.85, 81.23, 62.26, 35.77, 34.96, 34.61, 33.18, 32.14, 31.56, 31.38, 30.32, 26.53, 18.39 (two resonances), 2.66, 2.61.

Synthesis of MC-IE5

Chloro[2-methyl-4-(3,5-dimethylphenyl)-1,5,6,7-tetrahydro-s-indacen-1-yl]dimethylsilane

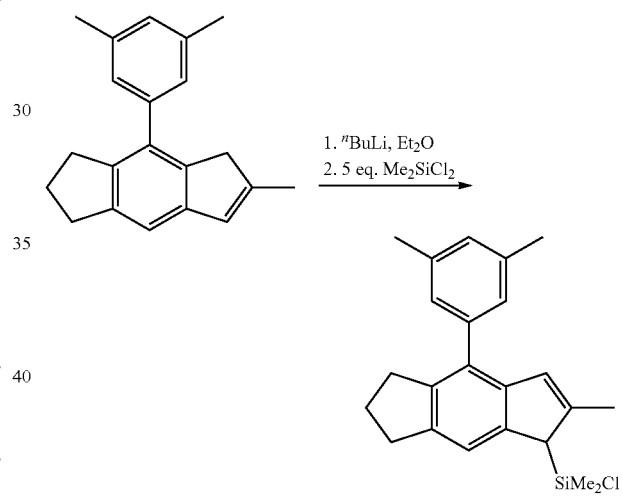

$^n$BuLi in hexanes (2.43 M, 12.6 ml, 30.62 mmol) was added in one portion to a solution of 8.4 g (30.61 mmol) of 4-(3,5-dimethylphenyl)-6-methyl-1,2,3,5-tetrahydro-s-indacene in a mixture of 150 ml of ether and 10 ml of THF cooled to −50° C. The resulting mixture was stirred overnight at room temperature; the obtained red solution was then cooled to −50° C., and 19.8 g (153.4 mmol, 5.01 equiv.) of dichlorodimethylsilane was added in one portion. This mixture was stirred overnight at room temperature and then filtered through a glass frit (G3), the flask and the filter cake were rinsed with 50 ml of toluene. The filtrate was evaporated to dryness to give 11.3 g (ca. 100%) of chloro[2-methyl-4-(3,5-dimethylphenyl)-1,5,6,7-tetrahydro-s-indacen-1-yl]dimethylsilane as reddish oil which was used without further purification.

$^1$H NMR (CDCl$_3$): δ 7.29 (s, 1H), 6.97 (s, 3H), 6.50 (m, 1H), 3.55 (s, 1H), 3.06-2.72 (m, 4H), 2.37 (s, 6H), 2.20 (s, 3H), 2.04 (quin, J=7.4 Hz, 2H), 0.43 (s, 3H), 0.19 (s, 3H). $^{13}$C{$^1$H} NMR (CDCl$_3$): δ 144.39, 142.06, 141.36, 139.81, 139.78, 137.40, 130.49, 128.24, 127.20, 126.80, 118.65, 49.74, 33.25, 32.20, 25.93, 21.43, 17.63, 1.16, −0.53

[2-methyl-4-(3,5-di-tert-butylphenyl)-5-methoxy-6-tert-butyl-1H-inden-1-yl][2-methyl-4-(3,5-dimethylphenyl)-1,5,6,7-tetrahydro-s-indacen-1-yl]dimethylsilane

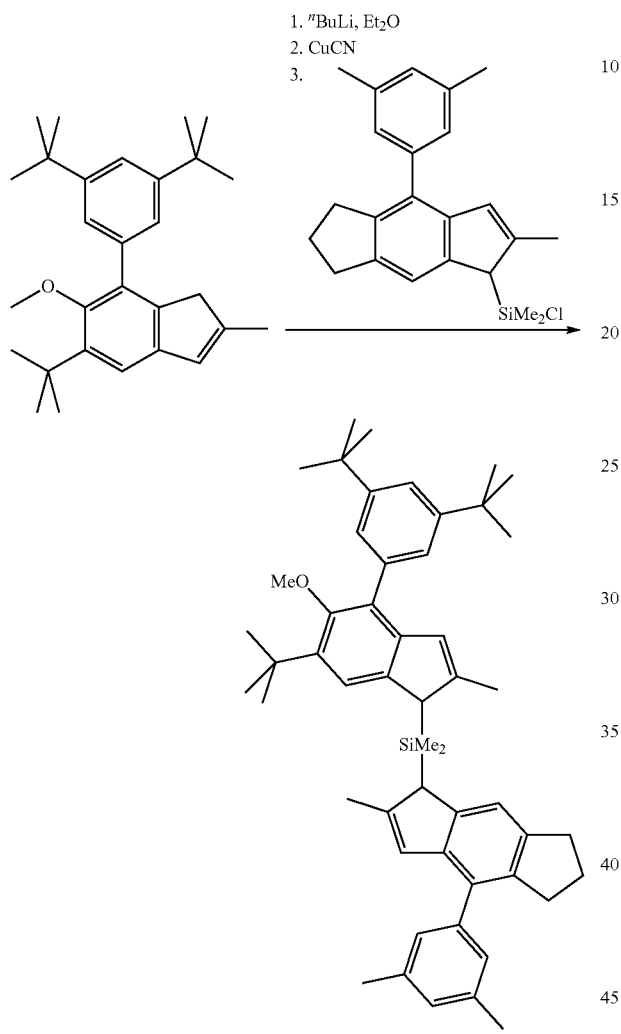

$^n$BuLi in hexanes (2.43 M, 12.6 ml, 30.62 mmol) was added in one portion to a solution of 12.39 g (30.62 mmol) of 2-methyl-5-tert-butyl-6-methoxy-7-(3,5-di-tert-butylphenyl)-1H-indene in 200 ml of ether at −50° C. This mixture was stirred overnight at room temperature; the resulting yellow slurry was then cooled to −50° C., and 150 mg of CuCN was added. The obtained mixture was stirred for 0.5 h at −25° C., then a solution of 11.3 g (30.61 mmol) of chloro[2-methyl-4-(3,5-dimethylphenyl)-1,5,6,7-tetrahydro-s-indacen-1-yl]dimethylsilane (as prepared above) in 150 ml of ether was added in one portion. This mixture was stirred for 20 h at room temperature, then filtered through a pad of silica gel 60 (40-63 μm) which was additionally washed by 2×50 ml of dichloromethane. The combined filtrate was evaporated under reduced pressure to give 22.34 g (99%) of [2-methyl-4-(3,5-di-tert-butylphenyl)-5-methoxy-6-tert-butyl-1H-inden-1-yl][2-methyl-4-(3,5-dimethylphenyl)-1,5,6,7-tetrahydro-s-indacen-1-yl]dimethylsilane as orange glass which was used without further purification.

Anti-dimethylsilanediyl[2-methyl-4-(3,5-di-tert-butylphenyl)-5-methoxy-6-tert-butyl-inden-1-yl][2-methyl-4-(3,5-dimethylphenyl)-5,6,7-trihydro-s-indacen-1-yl]zirconium dichloride MC-IE5

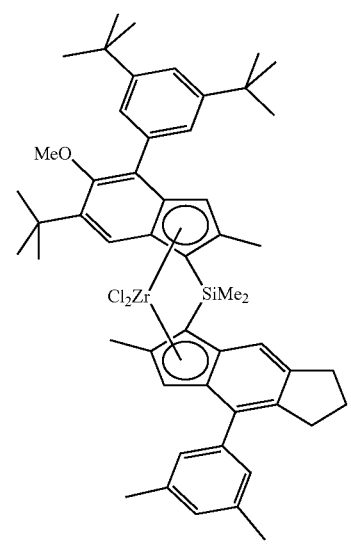

$^n$BuLi in hexanes (2.43 M, 25 ml, 60.75 mmol) was added in one portion to a solution of 22.34 g (30.39 mmol) of [2-methyl-4-(3,5-di-tert-butylphenyl)-5-methoxy-6-tertbutyl-1H-inden-1-yl][2-methyl-4-(3,5-dimethylphenyl)-1,5,6,7-tetrahydro-s-indacen-1-yl]dimethylsilane (as prepared above) in 250 ml of ether cooled to −50° C. This mixture was stirred overnight at room temperature, then the resulting dark-red solution was cooled to −60° C., and 7.09 g (30.43 mmol) of ZrCl₄ was added. The reaction mixture was stirred for 24 h at room temperature to give orange slurry (red solution with yellow precipitate). This mixture was evaporated to dryness. The residue was heated with 150 ml of toluene, and the formed suspension was filtered through glass frit (G4). The filtrate was evaporated to 60 ml, and the obtained suspension was heated to get a clear solution. Yellow powder precipitated from this solution over 30 min at room temperature was collected and dried under vacuum. This procedure gave 3.7 g of pure anti-zirconocene. Yellow powder precipitated from the mother liquor overnight at room temperature was collected and dried under vacuum. This procedure gave 10.1 g of a ca. 40 to 60 mixture of anti- and syn-zirconocenes. The mother liquor was evaporated to dryness and triturated with 10 ml of n-hexane. This procedure gave 3.38 g of a ca. 40 to 60 mixture of anti- and syn-zirconocenes. Thus, the total yield of anti- and syn-zirconocenes isolated in this synthesis was 17.18 g (63%).

Anti-dimethylsilanediyl[2-methyl-4-(3,5-di-tert-butylphenyl)-5-methoxy-6-tert-butylinden-1-yl][2-methyl-4-(3,5-dimethylphenyl)-5,6,7-trihydro-s-indacen-1-yl]zirconium dichloride Anal. calc. for $C_{52}H_{64}Cl_2OSiZr$: C, 69.76; H, 7.21. Found: C, 69.93; H, 7.49.

$^1$H NMR (CDCl₃): δ 7.75-7.01 (4 very br.s, sum 4H), 7.49 (s, 1H), 7.40 (s, 1H), 7.34 (t, J=1.8 Hz, 1H), 6.95 (m, 1H), 6.66 (s, 1H), 6.57 (s, 1H), 3.30 (s, 3H), 3.09-3.01 (m, 1H), 2.98-2.90 (m, 2H), 2.86-2.79 (m, 1H), 2.32 (s, 6H), 2.18 (s, 3H), 2.17 (s, 3H), 2.08-1.94 (m, 2H), 1.38 (s, 9H), 1.32 (s, 18H), 1.29 (s, 3H), 1.28 (s, 3H). NMR (CDCl₃): δ 159.85, 150.41 (broad s), 144.69, 143.92, 142.96, 138.30, 137.59 (broad s), 135.87, 135.35, 134.02, 133.57, 132.73, 132.42, 128.79, 127.55, 127.10, 126.97 (broad s), 124.41 (broad s), 122.83, 122.14, 121.24, 120.65, 120.38, 117.94, 81.87, 81.03, 62.25, 35.77, 34.98, 33.18, 31.99, 31.49, 30.37, 26.43, 21.31, 18.44, 18.37, 2.66, 2.63.

Synthesis of MC-IE6

Chloro[2-methyl-4-(3,5-di-tert-butylphenyl)-1,5,6,7-tetrahydro-s-indacen-1-yl]dimethylsilane

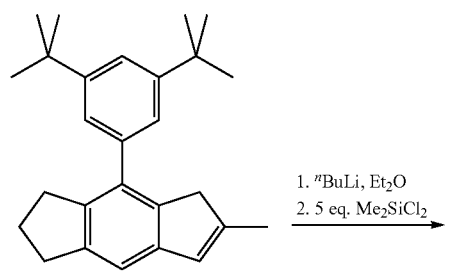

1. $^n$BuLi, Et₂O
2. 5 eq. Me₂SiCl₂

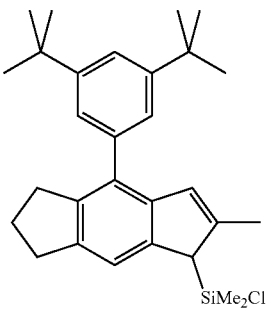

$^n$BuLi in hexanes (2.43 M, 15.0 ml, 36.45 mmol) was added in one portion to a solution of 13.07 g (36.45 mmol) of 4-(3,5-di-tert-butylphenyl)-6-methyl-1,2,3,5-tetrahydro-s-indacene in 200 ml of ether cooled to −50° C. The resulting mixture was stirred overnight at room temperature; the so obtained light-orange solution containing a large amount of white precipitate was then cooled to −60° C. and 23.5 g (182.1 mmol, 5 equiv.) of dichlorodimethylsilane was added in one portion. This mixture was stirred overnight at room temperature and then filtered through a glass frit (G3), the flask and the filter cake were rinsed with 50 ml of toluene. The filtrate was evaporated to dryness to give 16.6 g (ca. 100%) of chloro[2-methyl-4-(3,5-di-tert-butylphenyl)-1,5,6,7-tetrahydro-s-indacen-1-yl]dimethylsilane as yellowish oil which was used without further purification.

$^1$H NMR (CDCl₃): δ 7.36 (s, 1H), 7.30 (s, 1H), 7.23 (s, 2H), 6.58 (s, 1H), 3.57 (s, 1H), 3.05-2.93 (m, 2H), 2.93-2.83 (m, 2H), 2.21 (s, 3H), 2.10-2.01 (m, 2H), 1.36 (s, 18H), 0.45 (s, 3H), 0.20 (s, 3H). $^{13}$C{$^1$H} NMR (CDCl₃): δ 150.02, 144.42, 142.12, 141.53, 139.93, 139.91, 138.77, 131.40, 127.00, 123.93, 120.15, 118.63, 49.77, 34.88, 33.31, 32.50, 31.56, 26.03, 17.71, 1.25, −0.53.

[2-methyl-4-(4-tert-butylphenyl)-5-methoxy-6-tert-butyl-1H-inden-1-yl][2-methyl-4-(3,5-di-tert-butylphenyl)-1,5,6,7-tetrahydro-s-indacen-1-yl]dimethylsilane 1. $^n$BuLi, Et₂O
2. CuCN
3.

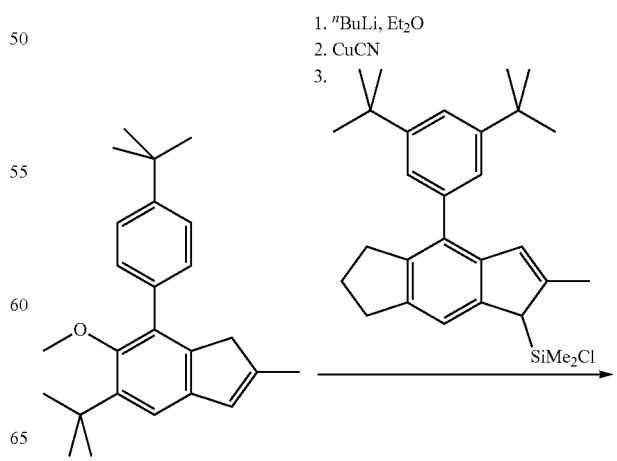

71

-continued

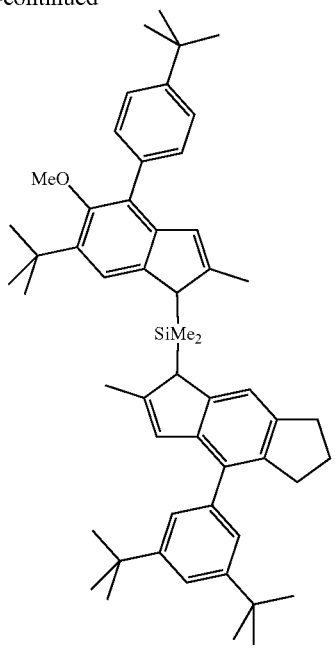

"BuLi in hexanes (2.43 M, 15.0 ml, 36.45 mmol) was added in one portion to a solution of 12.7 g (36.44 mmol) of 2-methyl-5-tert-butyl-6-methoxy-7-(4-tert-butylphenyl)-1H-indene in 200 ml of ether at −50° C. This mixture was stirred overnight at room temperature, then the resulting yellowish slurry with a large amount of precipitate was cooled to −40° C. and 100 mg of CuCN was added. The obtained mixture was stirred for 0.5 h at −25° C., then a solution of 16.6 g (ca. 36.45 mmol) of chloro[2-methyl-4-(3,5-di-tert-butylphenyl)-1,5,6,7-tetrahydro-s-indacen-1-yl]dimethylsilane in 150 ml of ether was added in one portion. This mixture was stirred overnight at room temperature, then filtered through a pad of silica gel 60 (40-63 nm) which was additionally washed with 2×50 ml of dichloromethane. The combined filtrate was evaporated under reduced pressure, and the residue was dried in vacuum at elevated temperature. This procedure gave 27.78 g (ca. 100%) of [2-methyl-4-(4-tert-butylphenyl)-5-methoxy-6-tert-butyl-1H-inden-1-yl][2-methyl-4-(3,5-di-tert-butylphenyl)-1,5,6,7-tetrahydro-s-indacen-1-yl]dimethylsilane (ca. 95% purity by NMR, approx. 1:1 mixture of stereoisomers) as yellowish glass which was used without further purification.

$^1$H NMR (CDCl$_3$): δ 7.54-7.20 (set of signals, sum 9H), 6.59 (s, 1H), 6.51 (s, 1H), 3.74, 3.69, 3.68 and 3.67 (4s, sum 2H), 3.23 and 3.22 (2s, sum 3H), 3.05-2.83 (m, 4H), 2.22 and 2.16 (2s, sum 6H), 2.11-1.99 (m, 2H), 1.44 and 1.41 (2s, sum 9H), 1.39 and 1.37 (2s, sum 27H), −0.18, −0.19 and −0.22 (3s, sum 6H). $^{13}$C{$^1$H} NMR (CDCl$_3$): δ 155.52, 149.97, 149.95, 149.43, 147.47, 146.01, 145.79, 144.10, 144.06, 143.79, 143.75, 142.15, 142.11, 139.65, 139.53, 139.40, 139.32, 139.18, 139.15, 139.04, 139.00, 137.14, 137.09, 135.26, 131.29, 129.77, 127.29, 127.27, 126.34, 126.27, 126.00, 125.05, 124.01, 120.62, 120.55, 120.04, 120.01, 118.49, 118.25, 60.52, 60.48, 47.42, 47.35, 46.92, 46.72, 35.17, 34.89, 34.57, 33.40, 33.35, 32.49, 31.58, 31.50, 31.28, 31.23, 26.04, 26.02, 18.09, 17.97.

72

Anti-dimethylsilanediyl[2-methyl-4-(4-tert-butylphenyl)-5-methoxy-6-tert-butylinden-1-yl][2-methyl-4-(3,5-di-tert-butylphenyl)-5,6,7-trihydro-s-indacen-1-yl]zirconium dichloride MC-IE-6

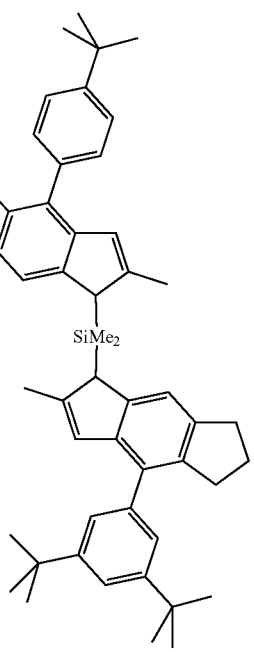

1. "BuLi, Et$_2$O
2. ZrCl$_4$

"BuLi in hexanes (2.43 M, 30 ml, 72.9 mmol) was added in one portion to a solution of 27.78 g (36.4 mmol) of [2-methyl-4-(4-tert-butylphenyl)-5-methoxy-6-tert-butyl-1H-inden-1-yl][2-methyl-4-(3,5-di-tert-butylphenyl)-1,5,6,7-tetrahydro-s-indacen-1-yl]dimethylsilane (as prepared above) in 300 ml of ether cooled to −50° C. This mixture was stirred overnight at room temperature; the resulting red solution was then cooled to −50° C. and 8.49 g (36.43 mmol) of ZrCl$_4$ was added. The reaction mixture was stirred for 24 h at room temperature to give an orange slurry (red solution with orange precipitate). This mixture was evaporated to dryness. The residue was heated with 150 ml of toluene, and the formed suspension was filtered through glass frit (G4). The filtrate was evaporated to 80 ml and heated to get a clear solution. Light-red crystals precipitated from this solution overnight at room temperature were collected and dried under vacuum. This procedure gave 8.3 g of syn-zirconocene as a solvate with toluene (×1 PhMe) contaminated with ca. 2% of anti-isomer. The mother liquor was evaporated to ca. 60 ml, 15 ml of n-hexane was added, and the resulting mixture was heated to get a clear solution. Yellow crystals precipitated from this solution overnight at room temperature were collected and dried in vacuum. This procedure gave 6.1 g of anti-zirconocene contaminated with ca. 2% of syn-isomer. The mother liquor was evaporated to ca. 30 ml, the resulting suspension was heated to ca. 100° C. and was filtered while hot via glass frit (G3). The obtained solid was dried under vacuum to give 2.4 g of anti-zirconocene contaminated with less than 1% of syn-isomer. The mother liquor was evaporated to dryness, and the obtained residue was recrystallized from a mixture of 20 ml of toluene and 5 ml of n-hexane to give 8.4 g of a ca. 28 to 72 mixture of anti- and syn-zirconocenes. Thus, the total yield of anti- and syn-zirconocenes isolated in this synthesis was 25.2 g (75%).

Anti-dimethylsilanediyl[2-methyl-4-(4-tert-butylphenyl)-5-methoxy-6-tert-butylinden-1-yl][2-methyl-4-(3,5-di-tert-butylphenyl)-5,6,7-trihydro-s-indacen-1-yl]zirconium dichloride Anal. calc. for $C_{54}H_{68}Cl_2OSiZr$: C, 70.24; H, 7.42. Found: C, 70.52; H, 7.70.

$^1$H NMR (CDCl$_3$): δ 7.61-7.30 (set of signals, sum 9H), 6.71 (s, 1H), 6.56 (s, 1H), 3.38 (s, 3H), 3.12-3.01 (m, 1H), 3.01-2.88 (m, 2H), 2.88-2.76 (m, 1H), 2.19 (s, 3H), 2.17 (s, 3H), 2.12-1.88 (m, 2H), 1.38 (s, 9H), 1.34 (s, 27H), 1.29 (s, 3H), 1.28 (s, 3H). $^{13}$C{$^1$H} NMR (CDCl$_3$): δ 159.92, 150.25, 150.00, 144.60, 143.92, 143.11, 137.55, 135.17, 134.00, 133.83, 133.76, 133.39, 133.21, 129.29, 126.92, 126.77, 125.31, 123.68, 123.09, 121.36, 121.21, 120.82, 117.84, 81.87, 81.42, 62.71, 35.74, 35.00, 34.62, 33.27, 32.45, 31.58, 31.42, 30.42, 26.64, 18.46, 18.29, 2.73, 2.60.

Synthesis of Comparative Metallocene MC-CE1

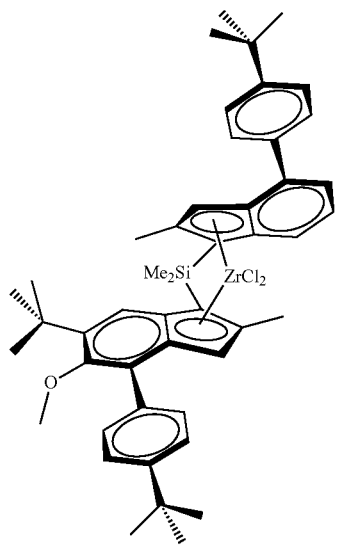

MC-CE1 (rac-anti-dimethylsilanediyl(2-methyl-4-(4-tert-butylphenyl)inden-1-yl)(2-methyl-4-(4'-tert-butylphenyl)-5-methoxy-6-tert-butyl inden-1-yl) zirconium dichloride) was synthetized according to the procedure as described in WO WO2013007650, E7.

Synthesis of Comparative Metallocene MC-CE2

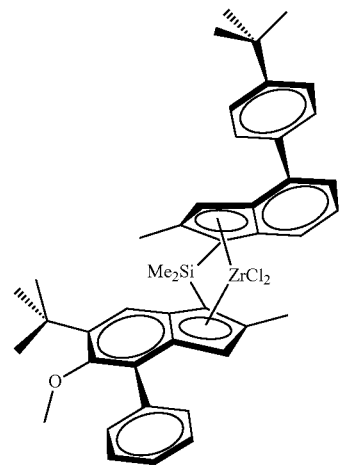

MC-CE2 (rac-anti-dimethylsilanediyl(2-methyl-4-(4'-tert-butylphenyl)inden-1-yl)(2-methyl-4-phenyl-5-methoxy-6-tert-butyl inden-1-yl) zirconium dichloride) was synthetized according to the procedure as described in WO WO2013007650, E2.

Synthesis of Comparative Metallocene MC-CE3

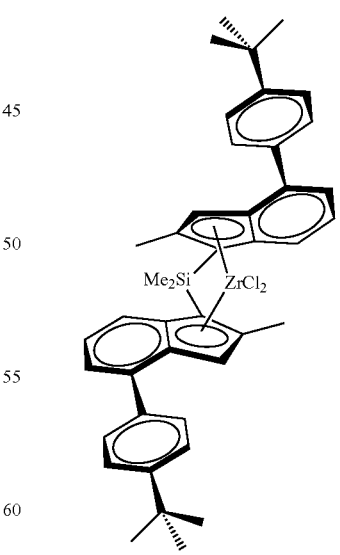

MC-CE3 (rac-dimethylsilanediylbis[2-methyl-4-(4-tert-butylphenyl)indenyl] zirconium dichloride) was synthetized according to the procedure as described in WO98040331, example 65.

Synthesis of Comparative Metallocene MC-CE4

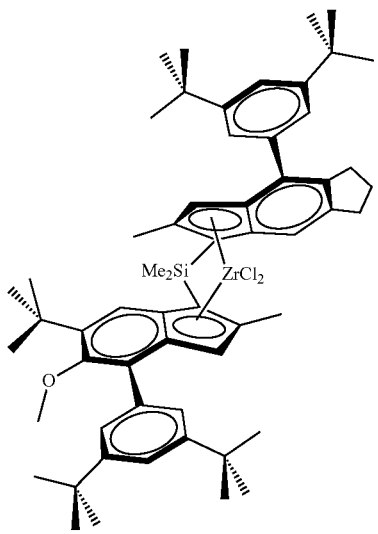

MC-CE4 (rac-anti-dimethylsilanediyl[2-methyl-4-(3',5'-di-tert-butylphenyl)-1,5,6,7-tetrahydro-s-indacen-1-yl][2-methyl-4-(3',5'-di-tert-butylphenyl)-5-methoxy-6-tert-butyl-inden-1-yl]zirconium dichloride) was synthetized according to the procedure as described in WO2015158790, example C2-Zr.

Synthesis of Comparative Metallocene MC-CE5

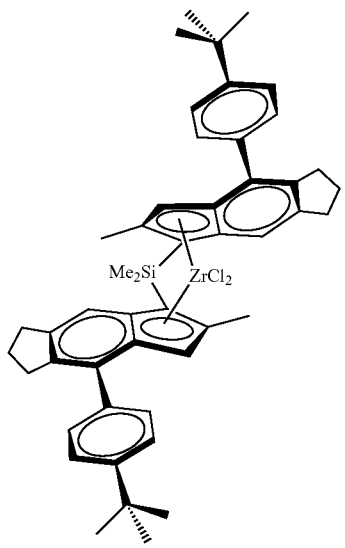

MC-CE5 (rac-μ-{bis-[η$^5$-2-methyl-4-(4-tert-butylphenyl)-1,5,6,7-tetrahydro-s-indacen-1-yl]dimethylsilanediyl}dichlorozirconium) was prepared as described in WO2006/097497A1. The 1H NMR spectrum of it corresponds to that reported in the mentioned patent application.

Comparative metallocene MC-CE6 and comparative metallocene MC-CE7 are made analogously.

Summary of Examples

MC-CE1

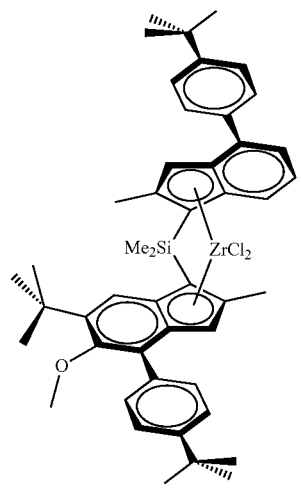

MC-CE2

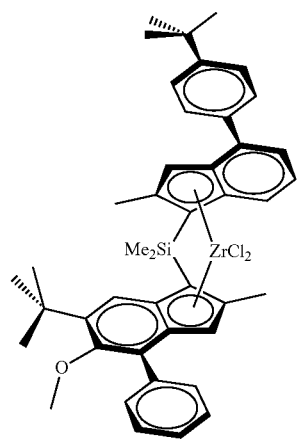

MC-CE3

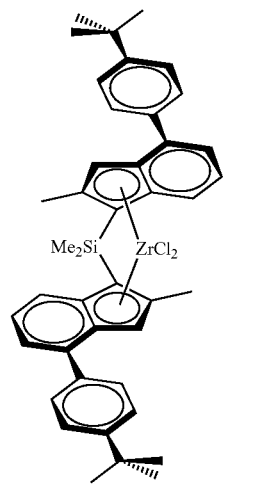

MC-CE4
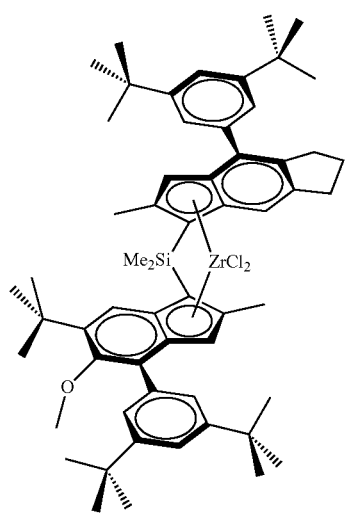
MC-CE5
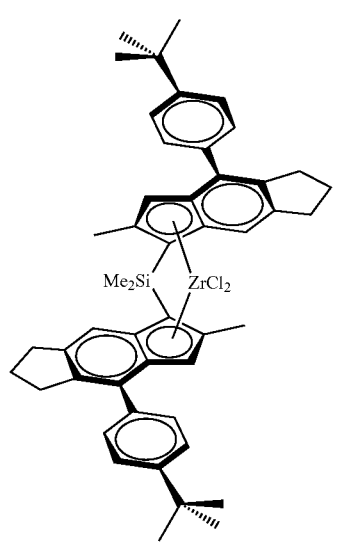
MC-CE6
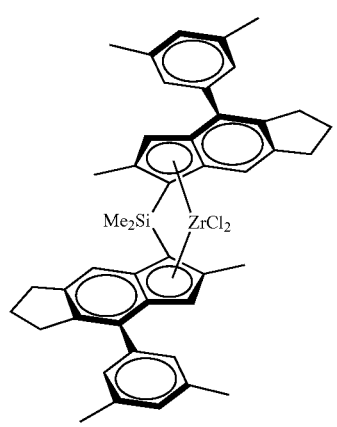
MC-CE7
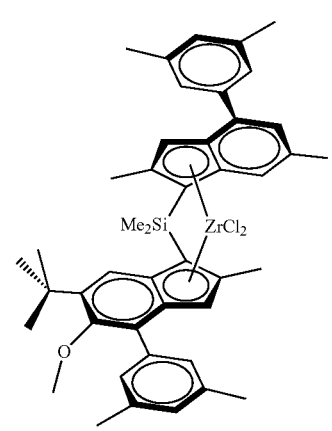
MC-IE1
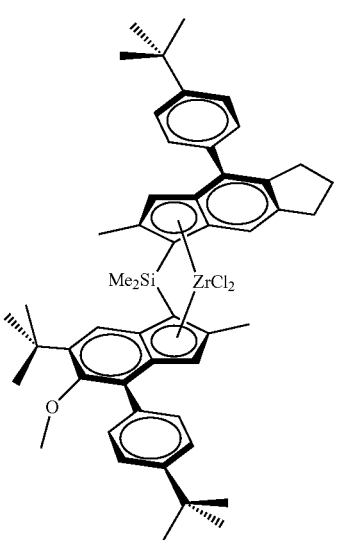
MC-IE2
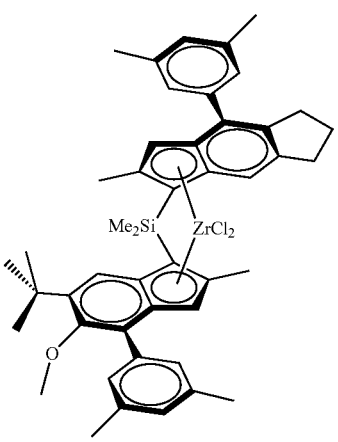

MC-IE3

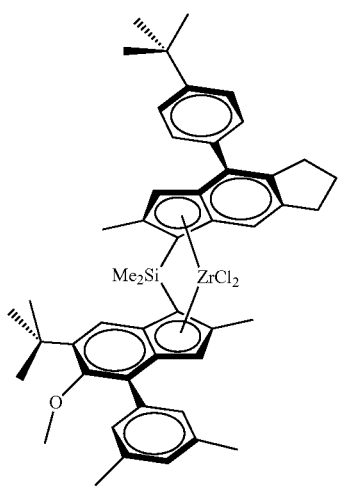

MC-IE4

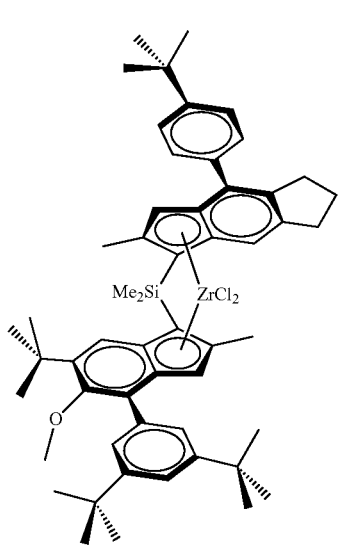

MC-IE5

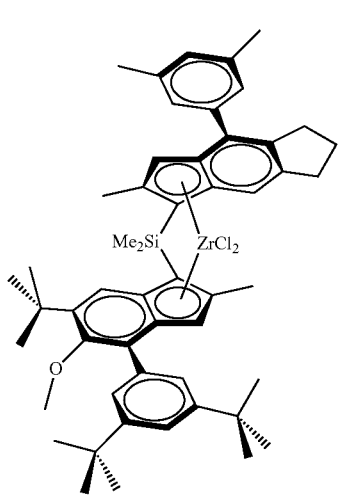

MC-IE6

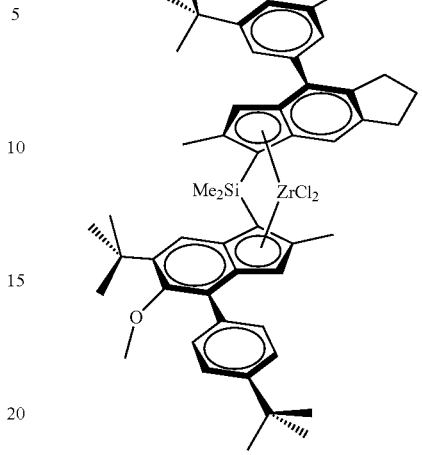

Non Supported Catalyst Preparation Examples

Materials

Inventive metallocenes MC-IE1, MC-IE2, MC-IE3, MC-IE4, MC-IE5 and MC-IE6 and comparative metallocenes MC-CE1, MC-CE2, MC-CE3, MC-CE4, MC-CE5, MC-CE6 and MC-CE7 as described above were used in preparing catalysts. MAO was used as a 30 wt-% solution in toluene. Trityl tetrakis(pentafluorophenyl)borate (Boulder Chemicals) was used as purchased. As surfactants were used perfluoroalkylethyl acrylate esters (CAS number 65605-70-1) purchased from the Cytonix corporation, dried over activated molecular sieves (2 times) and degassed by argon bubbling prior to use (S1) or 1H,1H-Perfluoro(2-methyl-3-oxahexan-1-ol) (CAS 26537-88-2) purchased from Unimatec, dried over activated molecular sieves (2 times) and degassed by argon bubbling prior to use (S2). Hexadecafluoro-1,3-dimethylyclohexane (PFC) (CAS number 335-27-3) was obtained from commercial sources and dried over activated molecular sieves (2 times) and degassed by argon bubbling prior to use. Propylene is provided by Borealis and adequately purified before use. Triethylaluminum was purchased from Crompton and used in pure form. Hydrogen is provided by AGA and purified before use.

All the chemicals and chemical reactions were handled under an inert gas atmosphere using Schlenk and glovebox techniques, with oven-dried glassware, syringes, needles or cannulas.

Catalyst Example IE1

Inside the glovebox, 85.9 mg of dry and degassed surfactant S2 was mixed with 2 mL of MAO in a septum bottle and left to react overnight. The following day, 43.9 mg MC-IE1 (0.076 mmol, 1 equivalent) was dissolved with 4 mL of the MAO solution in another septum bottle and left to stir inside the glovebox.

After 60 minutes, 4 mL of the MAO-metallocene solution and 1 mL of the surfactant solution were successively added into a 50 mL emulsification glass reactor containing 40 mL of PFC at −10° C. and equipped with an overhead stirrer (stirring speed=600 rpm). Total amount of MAO is 5 mL (450 equivalents). A red emulsion formed immediately and stirred during 15 minutes at 0° C./600 rpm. Then the emulsion was transferred via a 2/4 teflon tube to 100 mL of hot PFC at 90° C., and stirred at 600 rpm until the transfer is completed, then the speed was reduced to 300 rpm. After 15 minutes stirring, the oil bath was removed and the stirrer turned off. The catalyst was left to settle up on top of the PFC and after 45 minutes the solvent was siphoned off. The remaining red catalyst was dried during 2 hours at 50° C. over an argon flow. 0.62 g of a red free flowing powder was obtained.

Catalyst Example IE-2

Inside the glovebox, 86.2 mg of dry and degassed surfactant S2 was mixed with 2 mL of MAO in a septum bottle and left to react overnight. The following day, 41.1 mg MC-IE2 (0.076 mmol, 1 equivalent) was dissolved with 4 mL of the MAO solution in another septum bottle and left to stir inside the glovebox.

After 60 minutes, 4 mL of the MAO-metallocene solution and 1 mL of the surfactant solution were successively added into a 50 mL emulsification glass reactor containing 40 mL of PFC at −10° C. and equipped with an overhead stirrer (stirring speed=600 rpm). Total amount of MAO is 5 mL (450 equivalents). A red emulsion formed immediately and stirred during 15 minutes at 0° C./600 rpm. Then the emulsion was transferred via a 2/4 teflon tube to 100 mL of hot PFC at 90° C., and stirred at 600 rpm until the transfer is completed, then the speed was reduced to 300 rpm. After 15 minutes stirring, the oil bath was removed and the stirrer turned off. The catalyst was left to settle up on top of the PFC and after 45 minutes the solvent was siphoned off. The remaining red catalyst was dried during 2 hours at 50° C. over an argon flow. 0.54 g of a red free flowing powder was obtained.

Catalyst Example IE-3

Inside the glovebox, 85.3 mg of dry and degassed surfactant S2 was mixed with 2 mL of MAO in a septum bottle and left to react overnight. The following day, 42.4 mg MC-IE-3 (0.076 mmol, 1 equivalent) were dissolved with 4 mL of the MAO solution in another septum bottle and left to stir inside the glovebox.

After 60 minutes, 4 mL of the MAO-metallocene solution and 1 mL of the surfactant solution were successively added into a 50 mL emulsification glass reactor containing 40 mL of PFC at −10° C. and equipped with an overhead stirrer (stirring speed=600 rpm). Total amount of MAO is 5 mL (450 equivalents). A red emulsion formed immediately and stirred during 15 minutes at 0° C./600 rpm. Then the emulsion was transferred via a 2/4 teflon tube to 100 mL of hot PFC at 90° C., and stirred at 600 rpm until the transfer is completed, then the speed was reduced to 300 rpm. After 15 minutes stirring, the oil bath was removed and the stirrer turned off. The catalyst was left to settle up on top of the PFC and after 45 minutes the solvent was siphoned off. The remaining red catalyst was dried during 2 hours at 50° C. over an argon flow. 0.52 g of a red free flowing powder was obtained.

Catalyst Example IE-3.1b

Inside the glovebox, 234.3 mg of S2 surfactant solution (14 wt % in toluene) was added dropwise to 5 mL of 30 wt.-% MAO. The solutions were left under stirring for 30 min. Then, around 95.6 mg of metallocene MC-IE3 (0.114 mmol, 1 equivalent) was added to MAO/surfactant solution and the solution was stirred for 60 minutes. Then 104.9 mg of trityl tetrakis(pentafluorophenyl)borate was added. The mixture was left to react at room temperature inside the glovebox for 60 minutes.

Then, 5 mL of catalyst solution were added into a 50 mL emulsification glass reactor containing 40 mL of PFC at −10° C. and equipped with an overhead stirrer (stirring speed=600 rpm). A red emulsion formed immediately and stirred during 15 minutes at −10° C./600 rpm. Then the emulsion was transferred via a 2/4 Teflon tube to 100 mL of hot PFC at 90° C. and stirred at 600 rpm until the transfer is completed. Then the speed was reduced to 300 rpm. After 15 minutes stirring, the oil bath was removed and the stirrer turned off. The catalyst was left to settle up on top of the PFC and after 35 minutes the solvent was siphoned off. The remaining red catalyst was dried during 2 hours at 50° C. over an argon flow. 0.70 g of a red free flowing powder was obtained.

Catalyst Example IE4

Inside the glovebox, S2 surfactant solution (27.6 mg of dry and degassed S2 dilute in 0.2 mL toluene) was added dropwise to 5 mL of 30 wt.-% MAO. The solution was left under stirring for 10 min. Then, around 46.7 mg of metallocene was added to 5 ml MAO/surfactant solution and the solution was stirred for 60 minutes. Then, the MAO/MC-IE-4/S2 solution (5.2 mL) was added into a 50 mL emulsification glass reactor containing 40 mL of PFC at −10° C. and equipped with an overhead stirrer (stirring speed=600 rpm). A red emulsion formed immediately and stirred during 15 minutes at −10° C./600 rpm. Then the emulsion was transferred via a 2/4 Teflon tube to 100 mL of hot PFC at 90° C. and stirred at 600 rpm until the transfer is completed. Then the speed was reduced to 300 rpm. After 15 minutes stirring, the oil bath was removed and the stirrer turned off. The catalyst was left to settle on top of the PFC and after 35 minutes, the solvent was siphoned off. The remaining nice red catalyst was dried during 2 hours at 50° C. over an argon flow.

Comparative Catalyst Example CE-1

Inside the glovebox, 80 μl of dry and degassed surfactant S1 was mixed with 2 mL of MAO in a septum bottle and left to react overnight. The following day, 66.3 mg MC-CE1 (0.076 mmol, 1 equivalent) was dissolved with 4 mL of the MAO solution in another septum bottle and left to stir inside the glovebox. After 60 minutes, 4 mL of the MAO-metallocene solution and 1 mL of the surfactant solution were successively added into a 50 mL emulsification glass reactor containing 40 mL of PFC at −10° C. and equipped with an overhead stirrer (stirring speed=600 rpm). Total amount of MAO is 5 mL (300 equivalents). A red emulsion formed immediately and stirred during 15 minutes at 0° C./600 rpm. Then the emulsion was transferred via a 2/4 teflon tube to 100 mL of hot PFC at 90° C., and stirred at 600 rpm until the transfer is completed, then the speed was reduced to 300 rpm. After 15 minutes stirring, the oil bath was removed and the stirrer turned off. The catalyst was left to settle up on top of the PFC and after 45 minutes the solvent was siphoned off. The remaining red catalyst was dried during 2 hours at 50° C. over an argon flow. 0.31 g of a red free flowing powder was obtained.

Comparative Catalyst Example CE-1b (Same Metallocene as Comparative Example CE-1)

Inside the glovebox, 85.6 mg of dry and degassed S2 were mixed with 2 mL of MAO in a septum bottle and left to react overnight. The following day, 44.2 mg of MC-CE1 (0.051 mmol, 1 equivalent) were dissolved with 4 mL of the MAO solution in another septum bottle and left to stir inside the glovebox.

After 60 minutes, 1 mL of the surfactant solution and the 4 mL of the MAO-metallocene solution were successively added into a 50 mL emulsification glass reactor containing 40 mL of PFC at −10° C. and equipped with an overhead stirrer (stirring speed=600 rpm). Total amount of MAO is 5 mL (300 equivalents). A red emulsion formed immediately and stirred during 15 minutes at −10° C./600 rpm. Then the emulsion was transferred via a 2/4 teflon tube to 100 mL of hot PFC at 90° C., and stirred at 600 rpm until the transfer is completed, and then the speed was reduced to 300 rpm. After 15 minutes stirring, the oil bath was removed and the stirrer turned off. The catalyst was left to settle up on top of the PFC and after 35 minutes the solvent was siphoned off. The remaining catalyst was dried during 2 hours at 50° C. over an argon flow. 0.75 g of a red free flowing powder was obtained.

Comparative Catalyst Example CE-2

Inside the glovebox, 80 µl of dry and degassed surfactant S1 was mixed with 2 mL of MAO in a septum bottle and left to react overnight. The following day, 58.7 mg MC-CE2 (0.076 mmol, 1 equivalent) were dissolved with 4 mL of the MAO solution in another septum bottle and left to stir inside the glovebox.

After 60 minutes, 4 mL of the MAO-metallocene solution and 1 mL of the surfactant solution were successively added into a 50 mL emulsification glass reactor containing 40 mL of PFC at −10° C. and equipped with an overhead stirrer (stirring speed=600 rpm). Total amount of MAO is 5 mL (300 equivalents). A red emulsion formed immediately and stirred during 15 minutes at 0° C./600 rpm. Then the emulsion was transferred via a 2/4 teflon tube to 100 mL of hot PFC at 90° C., and stirred at 600 rpm until the transfer is completed, then the speed was reduced to 300 rpm. After 15 minutes stirring, the oil bath was removed and the stirrer turned off. The catalyst was left to settle up on top of the PFC and after 45 minutes the solvent was siphoned off. The remaining red catalyst was dried during 2 hours at 50° C. over an argon flow. 0.52 g of a red free flowing powder was obtained.

Comparative Catalyst Example CE-3

Inside the glovebox, 80 µl of dry and degassed surfactant S1 was mixed with 2 mL of MAO in a septum bottle and left to react overnight. The following day, 56.2 mg MC-CE3 (0.076 mmol, 1 equivalent) was dissolved with 4 mL of the MAO solution in another septum bottle and left to stir inside the glovebox.

After 60 minutes, 4 mL of the MAO-metallocene solution and 1 mL of the surfactant solution were successively added into a 50 mL emulsification glass reactor containing 40 mL of PFC at −10° C. and equipped with an overhead stirrer (stirring speed=600 rpm). Total amount of MAO is 5 mL (300 equivalents). A red emulsion formed immediately and stirred during 15 minutes at 0° C./600 rpm. Then the emulsion was transferred via a 2/4 teflon tube to 100 mL of hot PFC at 90° C., and stirred at 600 rpm until the transfer is completed, then the speed was reduced to 300 rpm. After 15 minutes stirring, the oil bath was removed and the stirrer turned off. The catalyst was left to settle up on top of the PFC and after 45 minutes the solvent was siphoned off. The remaining red catalyst was dried during 2 hours at 50° C. over an argon flow. 0.56 g of a red free flowing powder was obtained.

Comparative Catalyst Example CE-4

Inside the glovebox, 80 µl of dry and degassed surfactant S1 was mixed with 2 mL of MAO in a septum bottle and left to react overnight. The following day, 73.0 mg MC-CE4 (0.076 mmol, 1 equivalent) were dissolved with 4 mL of the MAO solution in another septum bottle and left to stir inside the glovebox.

After 60 minutes, 4 mL of the MAO-metallocene solution and 1 mL of the surfactant solution were successively added into a 50 mL emulsification glass reactor containing 40 mL of PFC at −10° C. and equipped with an overhead stirrer (stirring speed=600 rpm). Total amount of MAO is 5 mL (300 equivalents). A red emulsion formed immediately and stirred during 15 minutes at 0° C./600 rpm. Then the emulsion was transferred via a 2/4 teflon tube to 100 mL of hot PFC at 90° C., and stirred at 600 rpm until the transfer is completed, then the speed was reduced to 300 rpm. After 15 minutes stirring, the oil bath was removed and the stirrer turned off. The catalyst was left to settle up on top of the PFC and after 45 minutes the solvent was siphoned off. The remaining red catalyst was dried during 2 hours at 50° C. under an argon flow. 0.50 g of a red free flowing powder was obtained.

Comparative Catalyst Example CE-5

Inside the glovebox, 85.7 mg of dry and degassed S2 were mixed with 2 mL of MAO in a septum bottle and left to react overnight. The following day, 38.0 mg of MC-CE5 (0.051 mmol, 1 equivalent) were dissolved with 4 mL of MAO in another septum bottle and left to stir inside the glovebox.

After 60 minutes, 1 mL of the surfactant solution and the 4 mL of the MAO-metallocene solution were successively added into a 50 mL emulsification glass reactor containing 40 mL of PFC at −10° C. and equipped with an overhead stirrer (stirring speed=600 rpm). Total amount of MAO is 5 mL (300 equivalents). A red emulsion formed immediately and stirred during 15 minutes at −10° C./600 rpm. Then the emulsion was transferred via a 2/4 teflon tube to 100 mL of hot PFC at 90° C., and stirred at 600 rpm until the transfer is completed, and then the speed was reduced to 300 rpm. After 15 minutes stirring, the oil bath was removed and the stirrer turned off. The catalyst was left to settle up on top of the PFC and after 35 minutes the solvent was siphoned off. The remaining catalyst was dried during 2 hours at 50° C. over an argon flow. 0.66 g of a red free flowing powder was obtained.

Comparative Catalyst Example CE-6

Inside the glovebox, 85.7 mg of dry and degassed S2 were mixed with 2 mL of MAO in a septum bottle and left to react overnight. The following day, 58.1 mg of MC-CE6 (0.051 mmol, 1 equivalent) were dissolved with 4 mL of MAO in another septum bottle and left to stir inside the glovebox.

After 60 minutes, 1 mL of the surfactant solution and the 4 mL of the MAO-metallocene solution were successively added into a 50 mL emulsification glass reactor containing 40 mL of PFC at −10° C. and equipped with an overhead stirrer (stirring speed=600 rpm). Total amount of MAO is 5 mL (300 equivalents). A red emulsion formed immediately and stirred during 15 minutes at −10° C./600 rpm. Then the emulsion was transferred via a 2/4 teflon tube to 100 mL of hot PFC at 90° C., and stirred at 600 rpm until the transfer is completed, and then the speed was reduced to 300 rpm. After 15 minutes stirring, the oil bath was removed and the stirrer turned off. The catalyst was left to settle up on top of the PFC and after 35 minutes the solvent was siphoned off. The remaining catalyst was dried during 2 hours at 50° C. over an argon flow. 0.60 g of a red free flowing powder was obtained.

Comparative Catalyst Example CE-7

Inside the glovebox, 72.0 mg of dry and degassed S2 were mixed with 2 mL MAO in a septum bottle and left to react overnight. The following day, 39.8 mg of MC-CE7 (0.051 mmol, 1 equivalent) were dissolved with 4 mL of MAO in another septum bottle and left to stir inside the glovebox.

After 60 minutes, 1 mL of the surfactant solution and the 4 mL of the MAO-metallocene solution were successively added into a 50 mL emulsification glass reactor containing 40 mL of PFC at −10° C. and equipped with an overhead stirrer (stirring speed=600 rpm). Total amount of MAO is 5 mL (300 equivalents). A red emulsion formed immediately and stirred during 15 minutes at −10° C./600 rpm. Then the emulsion was transferred via a 2/4 teflon tube to 100 mL of hot PFC at 90° C., and stirred at 600 rpm until the transfer is completed, and then the speed was reduced to 300 rpm. After 15 minutes stirring, the oil bath was removed and the stirrer turned off. The catalyst was left to settle up on top of the PFC and after 35 minutes the solvent was siphoned off. The remaining catalyst was dried during 2 hours at 50° C. over an argon flow. 0.72 g of a red free flowing powder was obtained.

TABLE 1

Catalyst synthesis summary and elemental analysis

| Metallocene | Cat Ex | ICP Zr (wt.-%) | Al/Zr (mol/mol) |
|---|---|---|---|
| MC-IE1 | IE1 | 0.27 | 453 |
| MC-IE2 | IE2 | 0.26 | 479 |
| MC-IE3 | IE3 | 0.26 | 481 |
| MC-IE3 | IE3b | 0.50 | 215 |
| MC-IE4 | IE4 | 0.26 | 479 |
| MC-CE1 | CE1 | 0.35 | 291 |
| MC-CE1 | CE1b | 0.31 | 421 |
| MC-CE2 | CE2* | 0.41 | 283 |
| MC-CE3 | CE3 | 0.40 | 294 |
| MC-CE4 | CE4 | 0.33 | 335 |
| MC-CE5 | CE5 | 0.28 | 474 |
| MC-CE6 | CE6 | 0.37 | 346 |
| MC-CE7 | CE7 | 0.28 | 423 |

*CE2 Zr content (ICP) was re-measured over WO2013/007650 (E2).

Silica Supported Catalyst Examples

The silica-MAO catalysts have been prepared on 30μ SUNSPERA DM-L-303 silica produced by AGC Si-Tech Co, previously calcined at 600° C. for 2 hours in an Electric Muffle Furnace under a flow of dry air.

Preparation of Silica Supported Metallocene Catalyst (Silica-IE1)
Step-1

Toluene was dried over molecular sieves and degassed by bubbling with argon for at least 30 minutes.

Inside the glovebox, 6.3 g of the calcined silica was charged into a round-bottom flask equipped with an overhead stirrer and a sealed septum, and then ~30 mL of dry and degassed toluene was added into it. The resulting suspension was cooled down to 0° C. under mild stirring (200-300 rpm) and 16 mL of MAO solution added dropwise.

After around 20 minutes, the cooling bath was removed and stirring was continued for 2 hours. The silica-MAO slurry was allowed to settle and then the supernatant toluene solution was siphoned off via a 2/4 teflon tube. Then, around 20 mL of dried and degassed toluene was added and the slurry was stirred for 15 minutes at room temperature.

The flask was placed into the oil bath and warmed up to 80° C. and the slurry solution was stirred for additional 30 min. Then the silica-MAO slurry was again allowed to settle for 10 min. The hot toluene solution was siphoned off.

This washing procedure was repeated one more time, and then an additional washing has been performed using toluene (20 ml pentane, stirring 15 min). The toluene layer was siphoned off, then the solid was dried under argon flow at room temperature for about 3 h. The white flowing MAO-silica powder was collected and used for supported catalyst preparation Silica-TEL
Step-2

Inside the glove box, 0.25 mL of MAO solution was added to MC-IE1 solution (30 mg of MC-IE1 in 1 ml of toluene) in a septum bottle.

1 g of dry silica-MAO powder was placed into a 20 mL glass vial, and then ~5 mL of dry and degassed toluene was added into it. Then the complex solution was added and the slurry solution was stirred for 60 minutes at room temperature and the resulting slurry was allowed to stand overnight in the glove box. Then 5 mL of dried and degassed toluene was added; the bath temperature was set to 40° C. and stirred for 60 minutes. The solid catalyst was allowed to settle, and then the toluene layer was removed. Then another 5 mL of dried and degassed toluene was added; the bath temperature was set to 60° C. and stirred for 2 hours minutes. The solid catalyst was allowed to settle, and then the toluene layer was removed. Then three additional washing step has been performed at room temperature using 5 ml of dry toluene and the toluene layer was siphoned off and then the solid was dried under argon flow at room temperature for 3 h. 0.967 g of a red silica supported flowing powder was collected.

Preparation of Silica Supported Metallocene Catalyst (Silica-IE2)
Step 1

Toluene was dried over molecular sieves and degassed by bubbling with argon for at least 30 minutes. Inside the glovebox, 10 g of the calcined silica was charged into a round-bottom flask equipped with an overhead stirrer and a sealed septum, then ~50 mL of dry and degassed toluene was added into it. The resulting suspension was cooled down to 0° C. under mild stirring (200-300 rpm) by means of a cooling bath. 25 mL of a 30 wt-% MAO solution in toluene was slowly added with a dry and degassed syringe or by siphonation onto the silica suspension (dropwise, adding time~1 h). Then the cooling bath was removed and stirring was continued for 2 hours. The silica-MAO slurry was allowed to settle and then the supernatant toluene solution was siphoned off with an oven-dried cannula.

~30 mL of dried and degassed toluene was added, the slurry was stirred for 15 minutes at room temperature, then the flask was placed into the oil bath and warmed up to 80° C. Stirring was continued for additional 15 min, then the slurry was again allowed to settle for 10 min. The hot toluene solution was siphoned off from the top of the settled silica-MAO layer. This washing procedure was repeated one more time, and then an additional washing has been performed using pentane (30 ml pentane, stirring 15 min, settling 10 min). The pentane layer was siphoned off, then the solid was dried under argon flow at room temperature (20-25° C.) for about 3 h and finally the flask was placed in a water bath (+50° C.) and the last residues of solvent were removed under argon flow through silica-MAO solid layer. During the final drying steps the silica-MAO solid turned into an easily flowing powder.

This MAO-silica activated carrier was used to prepare catalyst Silica-IE2 (and to prepare Silica-CE1, and Silica-CE2).

Step 2

Preparation of complex solution. Inside a glove box, 0.25 mL of the toluene-MAO solution was added to a solution of 23 mg of rac-anti-dimethylsilanediyl[2-methyl-4-(3'5'-dimethyl phenyl)-1,5,6,7-tetrahydro-s-indacen-1-yl][2-methyl-4-(3'5'-dimethylphenyl)-5-methoxy-6-tertbutylinden-1-yl] zirconiumdichloride metallocene (MC-IE2) in 1 ml of toluene in a septum bottle.

1 g of the previously prepared silica-MAO dry powder was placed into a 20 mL glass vial, and the complex solution was added. The resulting slurry was allowed to stand overnight in the glove box. 5 mL of dried and degassed toluene was added; the bath temperature was set to 60° C. and stirred for 30 minutes. The solid catalyst was allowed to settle, and then the toluene layer was removed by syringe. The washing step was repeated twice more (2×5 mL toluene). The solid was allowed to cool down to room temperature and one final washing step was carried out by adding 5 ml of dry pentane, stirring the slurry gently for 30 min, allowing the catalyst to settle, and finally removing pentane by syringe and drying the solid under argon flow for 3 h.

Preparation of Silica Supported Metallocene Catalyst (Silica-CE2)

Preparation was carried out as for catalyst Silica-IE2 but using 32 mg of metallocene MC-CE2

Preparation of Silica Supported Metallocene Catalyst (Silica-CE1)

Preparation was carried out as for catalyst Silica-IE2 but using 30 mg of metallocene MC-CE1

The available composition data of the catalysts from ICP are listed in Table 1.

TABLE 1

Composition data of the catalysts used in this investigation

| Catalyst | MC | Zr (wt %) | Al (wt %) | Al/Zr (molar) | MC (wt %) |
|---|---|---|---|---|---|
| Silica-CE2 | MC-CE2 | 0.20 | 14.8 | 250 | 1.69 |
| Silica-CE1 | MC-CE1 | 0.18 | 14.8 | 280 | 1.63 |
| Silica-IE1 | MC-IE1 | 0.27 | 17.7 | 220 | 2.57 |
| Silica-IE2 | MC-IE2 | 0.19 | 15.3 | 270 | 1.69 |

Polymerisation Examples

Homopolymerisation of Propylene with Unsupported Metallocenes

The polymerisations were performed in a 5 L reactor. 200 µl of triethylaluminum was fed as a scavenger in 5 mL of dry and degassed pentane. The desired amount of hydrogen was then loaded (measured in mmol) and 1100 g of liquid propylene was fed into the reactor. The temperature was set to 20° C. The desired amount of catalyst (5 to 15 mg) in 5 mL of PFC is flushed into the reactor with a nitrogen overpressure. After 5 minutes prepolymerisation, the temperature is raised to 70° C. over a period of 15 minutes. The polymerisation is stopped after 60 minutes by venting the reactor and flushing with nitrogen before the polymer is collected. Polymerisation conditions and results are disclosed in Table 2.

$C_3$/$C_2$ Random Copolymerisation with Unsupported Metallocenes

The polymerisations were performed in a 5 L reactor. 200 µl of triethylaluminum was fed as a scavenger in 5 mL of dry and degassed pentane. The desired amount of hydrogen (6 mmol) was then loaded and 1100 g of liquid propylene was fed into the reactor. Desired amount of ethylene was fed in to the reactor. The temperature was set to 30° C. The desired amount of catalyst (5 to 20 mg) in 5 mL of PFC is flushed into the reactor with a nitrogen overpressure. The temperature is then raised to 70° C. over a period of 15 minutes. The polymerisation is stopped after 30 minutes by venting the reactor and flushing with nitrogen before the polymer is collected.

The catalyst activities were calculated on the basis of the 60 minute (homopolymerisation of propylene) or 30 minute (C3/C2 random copolymerisation) period according to the following formula:

$$\text{Catalyst Activity} (\text{kg}-PP/\text{g}-Cat/\text{h}) = \frac{\text{amount of polymer produced (kg)}}{\text{catalyst loading (g)} \times \text{polymerisation time (h)}}$$

Polymerisation results of C3/C2 random copolymerisations are collected in Table 3.

Performance of the inventive examples with comparison to the closest references is summarised in FIGS. 1-5. The best overall performance is obtained with the new metallocenes of the invention: high activity in homopolymerisation and in C3/C2 random copolymerisation, good homopolymer melting temperature and good molecular weight capability. Most importantly, ethylene has a strong positive effect on Mw with the catalysts of the invention.

Polymer Analysis

TABLE 2

Propylene homopolymerisation in liquid propylene. Polymerisation time 60 minutes. Tp = 70° C.

| Run # | Catalyst Amt (mg) | H2 (mmol) | Yield (g) | Activity (kg-PP/g-Cat/h) | Metal activity (kg-PP/g-Zr/h) | Mw (kg/mol) | Mw/Mn | Tm (° C.) | 2, 1e (%) | Mmmm (%) |
|---|---|---|---|---|---|---|---|---|---|---|
| IE 1.1 | 9.1 | 6 | 372 | 40.8 | 15128 | 516 | 2.5 | 150.9 | 0.96 | 99.59 |
| IE 2.1 | 9.1 | 6 | 322 | 39.7 | 15266 | 514 | 2.6 | 150.4 | 0.93 | 99.70 |
| IE 3.1 | 7.7 | 6 | 250 | 32.5 | 12493 | 510 | 2.7 | 150.8 | 0.91 | 99.61 |
| IE 3.1b | 6.7 | 6 | 463 | 69.1 | 13926 | 521 | 2.5 | 156.4 | — | — |
| CE 1.1 | 9.8 | 6 | 479 | 48.8 | 13956 | 472 | 2.2 | 149.4 | 1.09 | 99.77 |
| CE 2.1 | 10.0 | 6 | 298 | 29.8 | 7268 | 486 | 2.3 | 146.9 | n.d | n.d. |
| CE 3.1 | 10.0 | 6 | 269 | 26.9 | 6720 | 418 | 2.3 | 151.0 | 0.92 | 99.38 |
| CE 4.1 | 8.7 | 6 | 213 | 24.4 | 7409 | 233 | 2.8 | 156.2 | 0.54 | 99.44 |

TABLE 3

Ethylene-propylene random copolymerisations (with hydrogen, 6 mmol). Polymerisation time 30 minutes. Tp = 70° C.

| Run # | Catalyst Amt (mg) | C2 (mmol) | Yield (g) | Activity (kg-PP/g-Cat/h) | Metal activity (kg-PP/g-Zr/h) | Mw (kg/mol) | Mw/Mn | Tm (° C.) | NMR Ce (wt.-%) |
|---|---|---|---|---|---|---|---|---|---|
| IE 1.2 | 7.5 | 50.0 | 247. | 66.1 | 24464 | 702 | 2.6 | 119.4 | 4.22 |
| IE 3.2 | 8.1 | 50.0 | 433. | 107.0 | 41149 | 720 | 2.7 | 121.4 | 4.06 |
| CE 1.2 | 7.6 | 49.9 | 199 | 52.4 | 14962 | 517 | 2.4 | 120.3 | 4.15 |
| CE 2.2 | 15.0 | 49.9 | 236 | 31.4 | 7665 | 504 | 2.6 | 119.3 | 3.58 |
| CE 3.2 | 8.7 | 50.0 | 85 | 19.6 | 4908 | 297 | 2.4 | 124.3 | 3.55 |
| CE 4.2 | 9.1 | 50.5 | 176 | 38.6 | 11688 | 246 | 2.3 | 113.4 | 5.17 |

Polymerisation Examples with Offline Prepolymerised Catalyst

Off-Line Prepolymerization ("Prepping") Procedure

The CE5 catalyst was pre-polymerised according to the following procedure: Off-line pre-polymerisation experiment was done in a 125 mL pressure reactor equipped with gas-feeding lines and an overhead stirrer. Dry and degassed perfluoro-1.3-dimethylcyclohexane (15 cm$^3$) and the desired amount of the catalyst (CE5, 398.7 mg) to be pre-polymerised were loaded into the reactor inside a glove box and the reactor was sealed. The reactor was then taken out from the glove box and placed inside a water cooled bath kept at 25° C. The overhead stirrer and the feeding lines were connected and stirring speed set to 450 rpm. The experiment was started by opening the propylene feed into the reactor. The total pressure in the reactor was raised to about 5 barg and held constant by propylene feed via mass flow controller until the target degree of polymerisation was reached. The reaction was stopped by flashing the volatile components. Inside glove box, the reactor was opened and the content poured into a glass vessel. The perfluoro-1.3-dimethylcyclohexane was evaporated until a constant weight was obtained to yield 1.8057 g of the pre-polymerised catalyst.

The catalysts listed in the table 4 below were prepolymerised as described in the above procedure.

TABLE 4 prepolymerisation of catalysts (pp = offline prepolymerised)

| Catalyst-name | Catalyst weighed amount (mg) | Yield (g) | Prep-degree (g-Pol/g-Cat) |
|---|---|---|---|
| ppCE5 | 398.7 | 1.8057 | 3.5 |
| ppCE6 | 393.3 | 1.6514 | 3.2 |
| ppCE1b | 400.3 | 1.8622 | 3.7 |
| ppCE7 | 399.5 | 1.7488 | 3.4 |
| ppIE1 | 399.5 | 1.8154 | 3.5 |
| ppIE3 | 408.6 | 1.8096 | 3.4 |
| ppIE2 | 402.0 | 1.6670 | 3.2 |

The polymers have been produced in a 20-L reactor following three different procedures, as described in Table 5.

TABLE 5

| | | bulk | | | GP1 | | | | GP2 | | | |
|---|---|---|---|---|---|---|---|---|---|---|---|---|
| procedure | steps | T ° C. | H2 NL | Time min | P barg | T ° C. | Time min | H2 NL | P barg | T ° C. | Time min | C2/C3 wt/wt |
| 1 | 2 | 80 | 1.5 | ~40 | | | | | 20 | 70 | ~70 | 0.25 |
| 2 | 3 | 80 | 1.5 | 40 | 24 | 80 | 60 | 1.2 | 20 | 70 | 90 | 0.25 |
| 3 | 3 | 80 | 1.5 | 40 | 24 | 80 | 60 | 1.2 | 20 | 70 | 90-120 | 1.00 |

The details of the polymerisation procedures are described in the following:
Procedure 1: 2-Step Polymerisation
Step 1: Prepolymerisation and Bulk Homopolymerisation A 21.2 L stainless-steel reactor containing 0.4 barg propylene was filled with 3950 g propylene. Triethylaluminum (0.80 ml of a 0.62 mol/l solution in heptane) was injected into the reactor by additional 240 g propylene. The solution was stirred at 20° C. and 250 rpm for at least 20 min. The catalyst was injected as described in the following. The desired amount of solid, prepolymerised catalyst was loaded into a 5 ml stainless steel vial and a second 5 ml vial containing 4 ml n-heptane was added on top inside a glovebox. Then the vial on top was pressurized with 10 bars of nitrogen and attached to the autoclave. The valve between the two vials was opened and the solid catalyst was contacted with n-heptane under nitrogen pressure for 2 s, and then flushed into the reactor with 240 g propylene. The prepolymerisation was run for 10 min. At the end of the prepolymerisation step the temperature was raised to 80° C. When the internal reactor temperature has reached 71° C., 1.5 NL of H2 was added via mass flow controller in one minute. The reactor temperature was held constant at 80° C. throughout the polymerisation. The polymerisation time was measured starting when the internal reactor temperature reached 2° C. below the set polymerisation temperature.

Jacket T constraints: during the transition between prepolymerisation and target reactor temperature, the jacket temperature is controlled with a cooling device (HB-Therm). The set temperature limits to prevent overheating of the reactor were:
  dTSW: Defines the maximum temperature of the jacket liquid
    Set=max 10° C.>target temperature
  dTIW: Defines the maximum temperature difference between jacket and reactor during heating.
    Set=max 35° C.>actual temperature Step 2: Gas Phase C3C2 r-PP.Polymerisation After the bulk step was completed, the stirrer speed was reduced to 50 rpm and the pressure was reduced down to 0.3 bar-g by venting the monomers. Then triethylaluminum (0.80 ml of a 0.62 mol/l solution in heptane) was injected into the reactor by additional 250 g propylene through a steel vial. The pressure was then again reduced down to 0.3 bar-g by venting the monomers. The stirrer speed was set to 180 rpm and the reactor temperature was set to 70° C. Then the reactor pressure was increased to 20 bar-g by feeding a C3/C2 gas mixture (C2/C3=0.74 wt/wt). Pressure and temperature were held constant by feeding via mass flow controller a C3/C2 gas mixture (of composition corresponding to the target polymer composition) and by thermostat, until the set time for this step had expired.

Then the reactor was cooled down (to about 30° C.) and the volatile components flashed out. After flushing the reactor 3 times with N2 and one vacuum/N2 cycle, the product was taken out and dried overnight in a fume hood. 100 g of the polymer is additivated with 0.5 wt % Irganox B225 (solution in acetone) and dried overnight in a hood followed by 2 hours in a vacuum drying oven at 60° C.

Jacket T constraints. During the transition between bulk and gas phase temperature, the jacket temperature is controlled with a cooling device (HB-Therm). The set temperature limits to prevent overheating of the reactor were:
  dTSW: Defines the maximum temperature of the jacket liquid
    Set=max 10° C.>target temperature
  dTIW: Defines the maximum temperature difference between jacket and reactor during heating.
    Set=max 35° C.>actual temperature.

Procedure 2: 3-Step Polymerisation
Step 1: Prepolymerisation and Bulk Homopolymerisation
  Step 1 was performed as described in procedure 1 above.

Step 2: Gas Phase Homopolymerisation

After the bulk step was completed, the stirrer speed was reduced to 50 rpm and the pressure was reduced to 23 bar-g by venting the monomer. Afterwards the stirrer speed was set to 180 rpm, the reactor temperature to 80° C. and the pressure to 24 bar-g. Hydrogen (1.2 NL) was added via flow controller in one minute. During the gas phase homopolymerisation, both pressure and temperature have been held constant via mass flow controller (feeding propylene) and thermostat for 60 minutes.

Step 3: Gas Phase Ethylene Propylene Copolymerisation

Step 3 was performed as step 2 of procedure 1 described above. Differences: Feeding a C2/C3 gas mixture of C2/C3=0.56 (wt/wt) in the transition. Polymerisation in this step was run for 90 min.

Procedure 3: 3-Step Polymerisation
Step 1: Prepolymerisation and Bulk Homopolymerisation The autoclave containing 0.4 barg propylene was filled with 3970 g propylene. Triethylaluminum (0.80 ml of a 0.62 mol/l solution in heptane) was injected into the reactor by additional 240 g propylene. The solution was stirred at 20° C. and 250 rpm for at least 20 min. The catalyst was injected as described in the following. The desired amount of solid, prepolymerised catalyst was loaded into a 5 ml stainless steel vial and a second 5 ml vial containing 4 ml n-heptane was added on top inside a glovebox. Then the vial on top was pressurized with 10 bars of nitrogen and attached to the autoclave. The valve between the two vials was opened and the solid catalyst was contacted with n-heptane under nitrogen pressure for 2 s, and then flushed into the reactor with 240 g propylene. The prepolymerisation was run for 10 min. At the end of the prepolymerisation step the temperature was raised to 80° C. When the internal reactor temperature has reached 71° C., 1.5 NL of H2 was added via mass flow controller in three minutes. The reactor temperature was held constant at 80° C. throughout the polymerisation. The polymerisation time was measured starting when the internal reactor temperature reached 2° C. below the set polymerisation temperature.

Jacket T constraints. During the transition between prepolymerisation and target reactor temperature, the jacket temperature is controlled with a cooling device (HB-Therm). The set temperature limits to prevent overheating of the reactor were:
  dTSW: Defines the maximum temperature of the jacket liquid
    Set=max 10° C.>target temperature
  dTIW: Defines the maximum temperature difference between jacket and reactor during heating.
    Set=max 35° C.>actual temperature Step 2: Gas Phase Homopolymerisation After the bulkstep was completed, the stirrer speed was reduced to 50 rpm and the pressure was reduced to the desired gas phase pressure. (=target pressure-0.5) by venting the monomer. Afterwards the stirrer speed was set to 180 rpm, the reactor temperature to 80° C. and the pressure to 24 barg. The desired amount of hydrogen was added via flow controller. During the gas phase homopolymerisation, both target pressure and temperature have been held constant via mass flow controller (feeding propylene) and thermostat until the runtime for this step was expired.

Step 3: Gas Phase C3C2 r-PP.Polymerisation

After the first gas phase step was completed, the stirrer speed was reduced to 50 rpm and the pressure was reduced down to 0.3 barg by venting the monomers. Then triethylaluminum (0.80 ml of a 0.62 mol/l solution in heptane) was injected into the reactor by additional 250 g propylene through a steel vial. The pressure was then again reduced down to 0.3 barg by venting the monomers. The stirrer speed was set to 180 rpm and the reactor temperature was set to 70° C. Then the reactor pressure was increased to 20 bar-g by feeding a C3/C2 gas mixture (C2/C3=2.22 wt/wt). Pressure and temperature were held constant by feeding via mass flow controller a C3/C2 gas mixture (of composition corresponding to the target polymer composition) and by thermostat, until the set time for this step had expired.

Then the reactor was cooled down (to about 30° C.) and the volatile components flashed out. After purging the reactor 3 times with N2 and one vacuum/N2 cycle, the product was taken out and dried overnight in a fume hood. 100 g of the polymer is additivated with 0.5 wt % Irganox B225 (solution in acetone) and dried overnight in a hood followed by one hour in a vacuum drying oven at 60° C.

Jacket T constraints. During the transition between bulk and first gas phase and first and second gasphase, the jacket temperature is controlled with a cooling device (HB-Therm). The set temperature limits to prevent overheating of the reactor were:

dTSW: Defines the maximum temperature of the jacket liquid

Set=max 10° C.>target temperature dTIW: Defines the maximum temperature difference between jacket and reactor during heating.

Set=max 35° C.>actual temperature.

Results are set out in tables 6 to 8.

TABLE 6

Two-step polymerisations (procedure 1), result summary

| Metallocene<br>Catalyst | MC-CE1<br>ppCE1b | MC-CE5<br>ppCE5 | MC-CE6<br>ppCE6 | MC-IE1<br>ppIE1 | MC-IE2<br>ppIE2 |
|---|---|---|---|---|---|
| MFR whole material | 9.4 | 5 | 16 | 4 | 2.5 |
| $XS_{gravim}$ | 57 | 64 | 52 | 63 | 54 |
| C2(XS) | 24.8 | 27.3 | 27.1 | 27.7 | 24.4 |
| $iV_{EPR}$ | 1.6 | 1.9 | 1.6 | 2.3 | 2.3 |

TABLE 7

Three-step polymerisations (procedure 2), result summary

| Metallocene<br>Catalyst | MC-CE1<br>ppCE1b | MC-CE7<br>ppCE7 | MC-IE3<br>ppIE3 | MC-IE2<br>ppIE2 |
|---|---|---|---|---|
| MFR whole material | 9 | 14 | 9 | 6 |
| Split bulk-GP1-GP2 (calc with MFC) | 50-35-15 | 43-32-25 | 39-32-29 | 38-36-26 |
| $XS_{gravim}$ ($XS_{Crystex}$) | 19 (17) | 31 (28) | 31 (30) | 27 (26) |
| C2(XS) | 21.4 | 20.9 | 21.6 | 20.8 |
| $iV_{EPR}$ | 1.6 | 1.9 | 2.3 | 2.4 |

TABLE 8

Three-step polymerisations (procedure 3), result summary

| Metallocene<br>Catalyst | MC-CE1<br>ppCE1b | MC-IE1<br>ppIE1 | MC-IE3<br>ppIE3 | MC-IE2<br>ppIE2 |
|---|---|---|---|---|
| MFR whole material | 9.6 | 18.6 | 21.4 | 9.4 |
| Split bulk-GP1-GP2 (calc with MFC) | 45-37-18 | 40-40-20 | 39-43-18 | 44-37-19 |
| $XS_{gravim}$ ($XS_{Crystex}$) | 20 (20) | 20 (20) | 17 (18) | 20 (20) |
| C2(XS) | 47.9 | 47.0 | 47.6 | 47.3 |
| $iV_{EPR}$ | 1.7 | 2.1 | 2.0 | 2.2 |

The results clearly indicate that the catalysts ppIE1, ppIE2, and ppIE3 produce heterophasic copolymers having a rubber phase with a higher molecular weight than the heterophasic copolymers produced under similar conditions with the comparison catalysts.

The Mw/Mn of the matrix produced in the three-step experiments ranges from 4.5 to 6.2.

The need for a cyclopentyl ring condensed on one of the indenes is shown by comparing the iV(EPR) of the heterophasic copolymer obtained with CE1 or CE7 to those obtained with the three inventive metallocenes (Tables 6-8).

Polymerisation Procedure for 1-Step Homopolymerisation hPP in Bulk (5 Litre Reactor) Using Unsupported Metallocene Catalyst IE4

Polymerisation Procedure

The polymerisations were performed in a 5 L reactor. 200 µl of triethylaluminum was fed as a scavenger in 5 mL of dry and degassed pentane. The desired amount of hydrogen was then loaded (mmol, see Table 9) and 1100 g of liquid propylene was fed into the reactor. The temperature was set to 20° C. The desired amount of catalyst (5 to 15 mg) in 5 mL of PFC is flushed into the reactor with a nitrogen overpressure. After 5 minutes prepolymerisation, the temperature is raised to 70° C. over a period of 15 minutes. The polymerisation is stopped after 60 minutes by venting the reactor and flushing with nitrogen before the polymer is collected.

The catalyst activity was calculated based on the 60 minute period at 70° C. according to the following formula:

$$\text{Catalyst Activity (kg-}PP/\text{g-}Cat/\text{h}) = \frac{\text{amount of polymer produced (kg)}}{\text{catalyst loading (g)} \times \text{polymerisation time (h)}}$$

Polymerisation results are collected in Table 9.

TABLE 9

Results for homopolymerisation in liquid propylene experiments and for the polymer characterisation.

Polymerisation time 60 minutes. Tp = 70 °C.

| Catalyst | Catalyst (mg) | H2 (mmol) | Yield (g) | Activity (kg-PP/g-Cat/h) | MFR21 (g/10 min) | Tm (° C.) |
|---|---|---|---|---|---|---|
| IE4 | 13.7 | 1 | 244.4 | 17.8 | 4.64 | 155.4 |
| IE4 | 9.0 | 6 | 329.5 | 36.6 | 72.1 | 156.7 |

Polymerisation Procedure for 2-Step hPP in Bulk+Gas Phase Experiments Using Silica Supported Metallocenes Step 1: Prepolymerisation and Bulk Homopolymerisation A 20.9 L stainless-steel reactor containing 0.4 bar-g propylene was filled with 3950 g propylene. Triethylaluminum (0.80 ml of a 0.62 mol/l solution in heptane) was placed into a stainless steel vial and injected into the reactor by means of a flow of 240 g propylene. 2.0 NL of H2 was added via mass flow controller in one minute. The solution was stirred at 20° C. and 250 rpm for at least 20 min. The catalyst was injected as described in the following. The desired amount of solid, prepolymerised catalyst was loaded into a 5 ml stainless steel vial inside a glovebox and a second 5 ml vial containing 4 ml n-heptane pressurized with 10 bars of nitrogen was added on top of the first vial. This catalyst feeder system was mounted on a port on the lid of the reactor, the valve between the two vials was opened and the solid catalyst was contacted with heptane under nitrogen pressure for 2 s, and then flushed into the reactor with 240 g propylene. The prepolymerisation was run for 10 min. At the end of the prepolymerisation step the temperature was raised to 80° C. The reactor temperature was held constant at 80° C. throughout the polymerisation. The liquid propylene polymerisation was run for 40 minutes. The polymerisation time was measured starting when the internal reactor temperature reached 2° C. below the set polymerisation temperature.

Step 2: Gas Phase Homopolymerisation

After the bulk step was completed, the stirrer speed was reduced to 50 rpm and the pressure was reduced to 23.5 bar-g by venting the monomer. Afterwards the stirrer speed was set to 180 rpm, the reactor pressure was set at 24 bar-g while keeping the reactor temperature at 80° C., and 2.0 NL hydrogen were added via flow controller in 4 minutes. The gas phase homopolymerisation was run for 60 minutes, while keeping the pressure constant by feeding propylene via mass flow controller and the temperature constant at 80° C. by thermostat.

Figure 6:
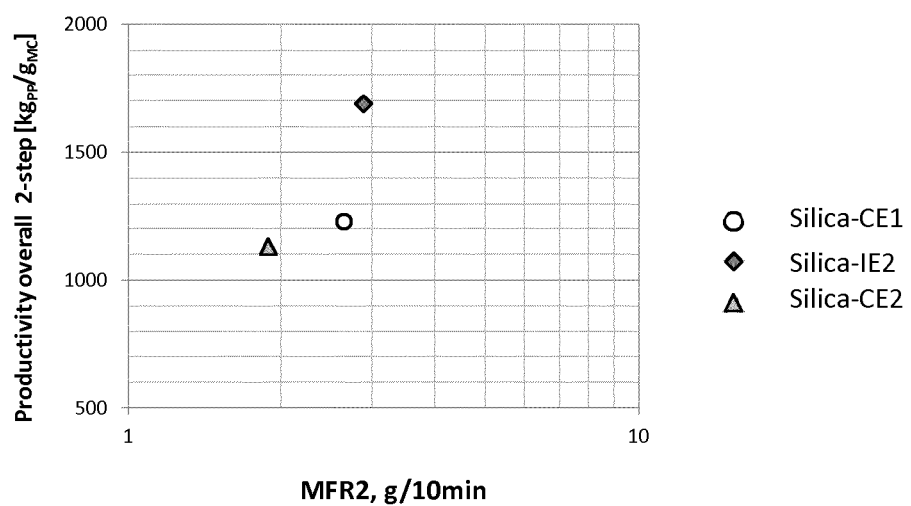
FIG. 6 illustrates productivity-MFR correlation for silica catalysts (2-step experiments). Productivities are based on metallocene amounts.

The 2-step hPP in bulk+ gas phase polymerisation results with the SiO2 supported catalysts and metallocenes CE1, CE2, IE2 are listed in Table 10 and Table 11. FIG. 6 shows the results graphically.

Polymerisation Procedure for 3-Step Heterophasic PP/EPR (Bulk+Gas Phase+Gas Phase) Experiments with Silica Supported Metallocenes Step 1: Prepolymerisation and Bulk Homopolymerisation A 20.9 L stainless-steel reactor containing 0.4 bar-g propylene was filled with 3950 g propylene. Triethylaluminum (0.80 ml of a 0.62 mol/l solution in heptane) was placed into a stainless steel vial and injected into the reactor by means of a flow of 240 g propylene. 2.0 NL of H2 was added via mass flow controller in one minute. The solution was stirred at 20° C. and 250 rpm for at least 20 min. The catalyst was injected as described in the following. The desired amount of solid, prepolymerised catalyst was loaded into a 5 ml stainless steel vial inside a glovebox and a second 5 ml vial containing 4 ml n-heptane pressurized with 10 bars of nitrogen was added on top of the first vial. This catalyst feeder system was mounted on a port on the lid of the reactor, the valve between the two vials was opened and the solid catalyst was contacted with heptane under nitrogen pressure for 2 s, and then flushed into the reactor with 240 g propylene. The prepolymerisation was run for 10 min. At the end of the prepolymerisation step the temperature was raised to 80° C. The reactor temperature was held constant at 80° C. throughout the polymerisation. The liquid propylene polymerisation was run for 30 minutes. The polymerisation time was measured starting when the internal reactor temperature reached 2° C. below the set polymerisation temperature.

Step 2: Gas Phase Homopolymerisation

After the bulk step was completed, the stirrer speed was reduced to 50 rpm and the pressure was reduced to 23.5 bar-g by venting the monomer. Afterwards the stirrer speed was set to 180 rpm, the reactor pressure was set at 24 bar-g while keeping the reactor temperature at 80° C., and 2.0 NL hydrogen were added via flow controller in 4 minutes. The gas phase homopolymerisation was run for 40 minutes, while keeping the pressure constant by feeding propylene via mass flow controller and the temperature constant at 80° C. by thermostat.1

Step 3: Gas Phase Ethylene Propylene Copolymerisation

After the gas phase homopolymerisation step was completed, the stirrer speed was reduced to 50 rpm and the pressure was reduced down to 0.3 bar-g by venting the monomers. Then triethylaluminum (0.80 ml of a 0.62 mol/l solution in heptane) was injected into the reactor by additional 250 g propylene through a steel vial. The pressure was then again reduced down to 0.3 bar-g by venting the monomers. The stirrer speed was set to 180 rpm and the

TABLE 10

2-step homopolymerisation experiments: settings and results.

Prepoly 10 min, all H2 fed before prepoly; Bulk step at 80° C., 40 min; Gas phase step at 80° C., 24 bar-g.

| Catalyst | Catalyst amount mg | MC amount in catalyst mg | Time from 20° C. to 80° C. min | Time from bulk to GP min | C3 fed in GP (MFC) g | Total yield g | Overall productivity kg/g$_{cat}$ | kg/g$_{MC}$ | Bulk Split wt % | GP1 split wt % | MFR2 g/10 min | Powder bulk density g/cm$^3$ |
|---|---|---|---|---|---|---|---|---|---|---|---|---|
| Silica CE2 | 113 | 1.91 | 18 | 11 | 195 | 2158 | 19 | 1130 | 77 | 23 | 1.9 | 0.49 |
| Silica CE1 | 79 | 1.29 | 18 | 15 | 364 | 1585 | 20 | 1231 | 77 | 23 | 2.6 | 0.47 |
| Silica IE2 | 55 | 0.93 | 22 | 5 | 302 | 1571 | 29 | 1690 | 81 | 19 | 2.8 | 0.46 |

TABLE 11

2-step homopolymers: analytics

| catalyst | XS (wt %) | T$_m$ (° C.) | M$_n$ (g/mol) | M$_w$ (g/mol) | M$_w$/M$_n$ |
|---|---|---|---|---|---|
| Silica CE2 | 0.4 | 150 | 96200 | 335000 | 3.5 |
| Silica CE1 | 0.2 | 151 | 89250 | 311500 | 3.5 |
| Silica IE2 | 0.3 | 154 | 71000 | 304000 | 4.3 | reactor temperature was set to 70° C. Then the reactor pressure was increased to 20 bar-g by feeding a C2/C3 gas mixture (C2/C3=0.56 wt/wt). The temperature was held constant by thermostat and the composition C2/C3=0.25 wt/wt for a set time (values in table 6).

Then the reactor was cooled down to about 30° C. while the volatile components were flashed out. After purging the reactor 3 times with N2 and one vacuum/N2 cycle, the product was taken out and dried overnight in a fume hood. 100 g of the polymer was additivated with 0.5 wt % Irganox B225 (solution in acetone) and dried overnight in a hood followed by 2 hours in a pressure was held constant by feeding via mass flow controller a C3/C2 gas mixture of covacuum drying oven at 60° C.

The 3-step heterophasic copolymers have been produced in three polymerisation steps: hPP in bulk at 80° C., hPP in gas phase at 80° C., 24 bar-g, then a C2/C3 copolymerisation in gas phase at 70° C., 20 bar-g, without adding H2. The polymerisation results with the SiO2/MAO catalysts based on Asahi Sunspera DM-L-33-$C_1$ silica and metallocenes MC-CE2, MC-CE2, MC-IE1 and MC-IE2 are listed in table 12 and Table 13.

TABLE 12

3-step heterophasic copolymerisation experiments: settings and results. Prepoly 10 min, all H2 fed before prepoly; Bulk step at 80° C., 30 min; Gas phase 1 step at 80° C., 40 min, 24 bar-g; Gas phase 2 step at 70° C., 20 bar-g, no added H2.

| Catalyst name | Catalyst amount mg | Pre-polym. H2 NL | H2 NL | Time transition prepoly to bulk min | Bulk Total H2 NL | (C3) Propylene fed in transition g | Time of transition bulk to GP1 min | H2 in GP NL | Propylene fed in GP1 g | Time of transition GP1 to GP2 min | Propylene fed in transition g | Ethylene fed in transition g |
|---|---|---|---|---|---|---|---|---|---|---|---|---|
| Silica-CE2 | 118 | 2,018 | 0 | 17 | 2,018 | 170 | 11 | 2,01 | 452 | 7 | 372 | 208 |
| Silica-CE1 | 80 | 2,018 | 0 | 18 | 2,018 | 80 | 12 | 2,01 | 287 | 7 | 378 | 212 |
| Silica IE2 | 56 | 2,020 | 1,01 | 19 | 3,030 | 0 | 7 | 3,02 | 189 | 7 | 366 | 206 |
| Silica IE1 | 74 | 2,019 | 0 | 18 | 2,019 | 159 | 21 | 2,01 | 372 | 14 | 376 | 214 |

3-step heterophasic copolymerisation experiments: settings and results. Prepoly 10 min, all H2 fed before prepoly; Bulk step at 80° C., 30 min; Gas phase 1 step at 80° C., 40 min, 24 bar-g; Gas phase 2 step at 70° C., 20 bar-g, no added H2.

| GP2 (C2/C3) | | | | | |
|---|---|---|---|---|---|
| Duration GP2 min | Propylene fed in GP2 g | Ethylene fed in GP2 g | Feed C2/C3 in gas phase 2 wt/wt | yield g | Catalyst productivity kg/g cat |
| 90 | 686 | 172 | 0,25 | 3018 | 26 |
| 90 | 296 | 73 | 0,25 | 1831 | 23 |
| 120 | 178 | 45 | 0,25 | 1465 | 26 |
| 90 | 259 | 64 | 0,25 | 2295 | 31 |

TABLE 13

3-step heterophasic copolymers: analytics

| Catalyst | MFR2, powder | powder bulk density g/ml | split bulk % | split gas phase 1 % | split gas phase 2 % | soluble fraction wt % | $T_m2$ ° C. | iV(XS) dl/g | C2 (FT-IR) (XS) wt % |
|---|---|---|---|---|---|---|---|---|---|
| Silica-CE2 | 2,31 | 0,45 | 56,6 | 15,0 | 28 | 27,5 | 150 | 2,1 | 19,9 |
| Silica-CE1 | 0,89 | 0,45 | 64,2 | 15,7 | 20 | 16,7 | 151 | 2,4 | 18,5 |
| Silica IE2 | 4,3 | 0,44 | 71,8 | 12,9 | 15 | 11,8 | 152 | 3,2 | 19,2 |
| Silica IE1 | 5,64 | 0,44 | 69,7 | 16,2 | 14,1 | 13,3 | 153 | 3,4 | 20,1 |

Figure 7:
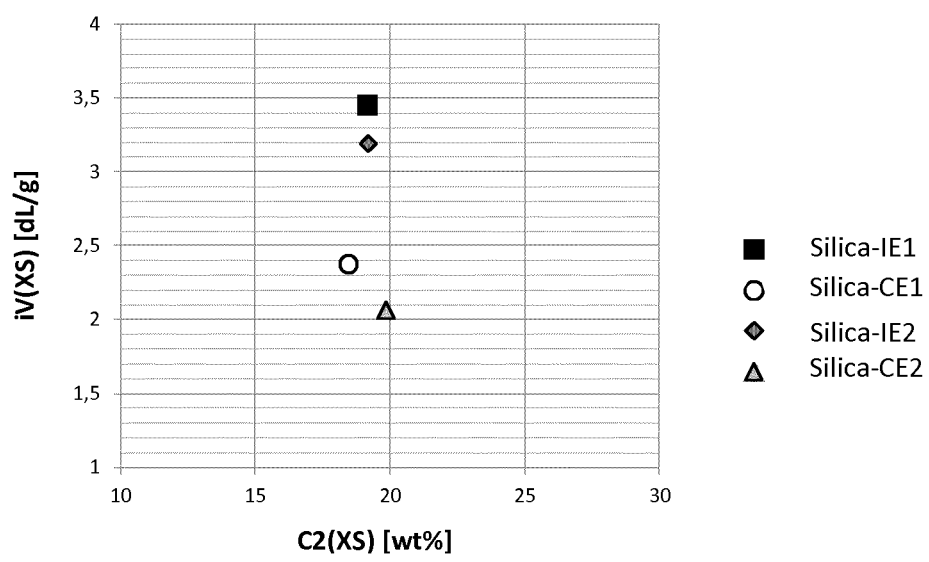
FIG. 7 illustrates composition-molecular weight correlation of the rubber phase (xylene insoluble fraction) of heterophasic copolymers produced with silica catalysts (3-step experiments).

FIG. 7 shows the correlation between ethylene content of the rubber phase (C2 wt % in xylene soluble fraction) and its molecular weight (intrinsic viscosity). It is apparent that the inventive examples give much higher molecular weight compared to the comparative examples at the same ethylene content in the rubber.

The invention claimed is:

1. A complex of formula (Ia)

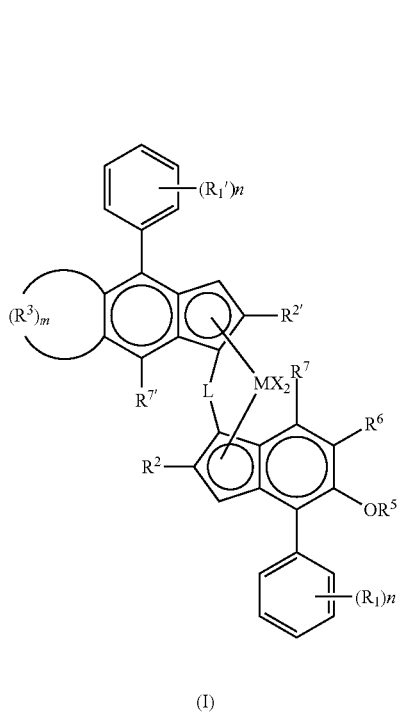

(Ia)

wherein:
M is Hf or Zr;
each X is a sigma ligand;
L is:
  a bridge of formula —SiR$^8{}_2$, where each R$^8$ is independently a C$_1$-C$_{10}$-hydrocarbyl or C$_6$-C$_{10}$-aryl group;
  or
  an alkylene group;
each n is independently 1 or 2;
R$^1$ and R$^{1'}$ are each independently the same or different and are a linear or branched C$_1$-C$_6$-alkyl group or C$_{6-20}$ aryl group, wherein at least one of the C(4) or C(4') phenyl rings is 3,5-dimethyl phenyl or 4-(tert-butyl)-phenyl;
R$^2$ and R$^{2'}$ are the same or are different and are a CH$_2$—R$^9$ group, with R$^9$ being H or linear or branched C$_{1-6}$-alkyl group, C$_{3-8}$ cycloalkyl group, or C$_{6-10}$ aryl group;
Each R$^3$ is a —CH$_2$—, —CHRx- or C(Rx)$_2$- group, wherein Rx is C$_{1-4}$ alkyl and where m is 2-6;
R$^5$ is a linear or branched C$_1$-C$_6$-alkyl group, C$_{7-20}$ arylalkyl, C$_{7-20}$ alkylaryl group, or C$_6$-C$_{20}$-aryl group;
R$^6$ is a C(R$^{10}$)$_3$ group, with R$^{10}$ being a linear or branched C$_1$-C$_6$ alkyl group; and
R$^7$ and R$^{7'}$ are H.

2. The complex according to claim 1, wherein the complex is of formula (II)

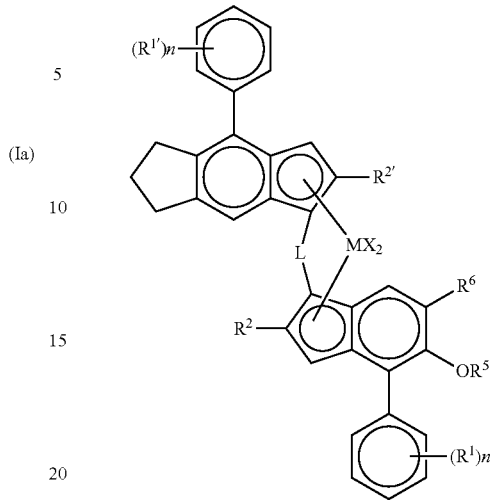

(II)

wherein:
M is Hf or Zr;
X is a sigma ligand;
L is:
  an alkylene bridge or
  a bridge of the formula —SiR$^8{}_2$—, wherein each R$^8$ is independently C$_1$-C$_6$-alkyl, C$_{3-8}$ cycloalkyl or C$_6$-aryl group;
each n is independently 1 or 2;
R$^1$ and R$^{1'}$ are each independently the same or different and are a linear or branched C$_1$-C$_6$-alkyl group, wherein at least one of the C(4) or C(4') phenyl rings is 3,5-dimethyl phenyl or 4-(tert-butyl)-phenyl;
R$^2$ and R$^{2'}$ are the same or are different and are a CH$_2$—R$^9$ group, with R$^9$ being H or linear or branched C$_{1-6}$-alkyl group;
R$^5$ is a linear or branched C$_1$-C$_6$-alkyl group; and
R$^6$ is a C(R$^{10}$)$_3$ group, with R$^{10}$ being a linear or branched C$_1$-C$_6$ alkyl group.

3. The complex according to claim 1, wherein the complex is of formula (III)

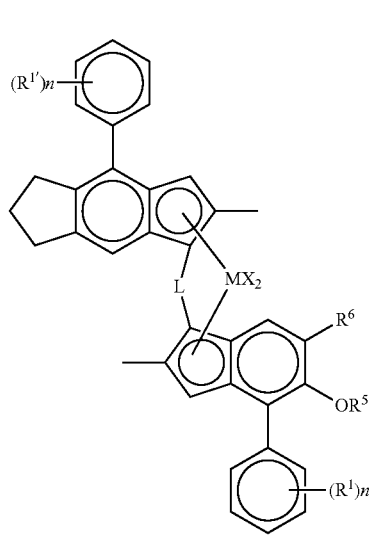

(III)

wherein:

M is Hf or Zr;

each X is a sigma ligand;

L is —SiR$^8_2$—, wherein each R$^8$ is C$_{1-6}$ alkyl or C$_{3-8}$ cycloalkyl;

each n is independently 1 or 2;

R$^1$ and R$^{1'}$ are each independently the same or different and are a linear or branched C$_1$-C$_6$-alkyl group, wherein at least one of the C(4) or C(4') phenyl rings is 3,5-dimethyl phenyl or 4-(tert-butyl)-phenyl;

R$^5$ is a linear or branched C$_1$-C$_6$-alkyl group; and

R$^6$ is a C(R$^{10}$)$_3$ group, with R$^{10}$ being a linear or branched C$_1$-C$_6$ alkyl group.

4. The complex according to claim 1, wherein the complex is of formula (IV)

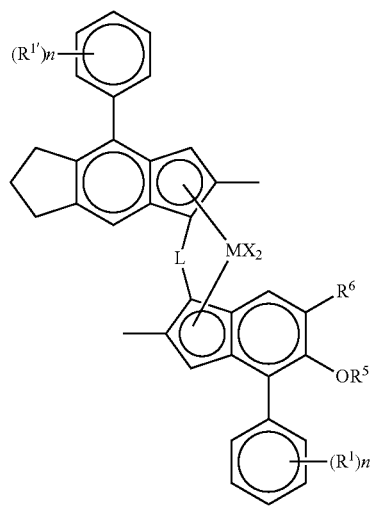

(IV)

wherein:

M is Hf or Zr;

each X is a hydrogen atom, a halogen atom, C$_{1-6}$ alkoxy group, C$_{1-6}$ alkyl, phenyl or benzyl group;

L is —SiR$^8_2$—, wherein each R$^8$ is C$_{1-4}$ alkyl or C$_{5-6}$ cycloalkyl;

each n is independently 1 or 2;

R$^1$ and R$^{1'}$ are each independently the same or can be different and are a linear or branched C$_1$-C$_6$-alkyl group, wherein at least one of the C(4) or C(4') phenyl rings is 3,5-dimethyl phenyl or 4-(tert-butyl)-phenyl;

R$^5$ is a linear or branched C$_1$-C$_6$-alkyl group; and

R$^6$ is a C(R$^{10}$)$_3$ group, with R$^{10}$ being a linear or branched C$_1$-C$_6$ alkyl group.

5. The complex according to claim 1, wherein the complex is of formula (V)

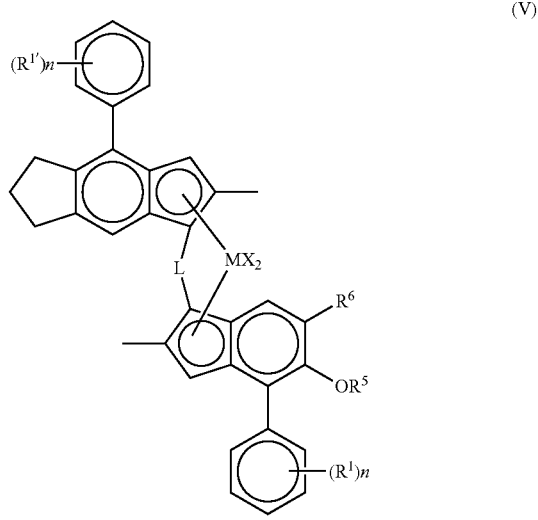

(V)

wherein

M is Hf or Zr;

X is a hydrogen atom, a halogen atom, C$_{1-6}$ alkoxy group, C$_{1-6}$ alkyl, phenyl or benzyl group;

L is —SiMe$_2$;

each n is independently 1 or 2;

R$^1$ and R$^{1'}$ are each independently the same or can be different and are a linear or branched C$_1$-C$_6$-alkyl group, wherein at least one of the C(4) or C(4') phenyl rings is 3,5-dimethyl phenyl or 4-(tert-butyl)-phenyl;

R$^5$ is a linear or branched C$_1$-C$_4$-alkyl group; and

R$^6$ is a C(R$^{10}$)$_3$ group, with R$^{10}$ being a linear or branched C$_1$-C$_4$ alkyl group.

6. The complex according to claim 1, wherein the complex is of formula (VI)

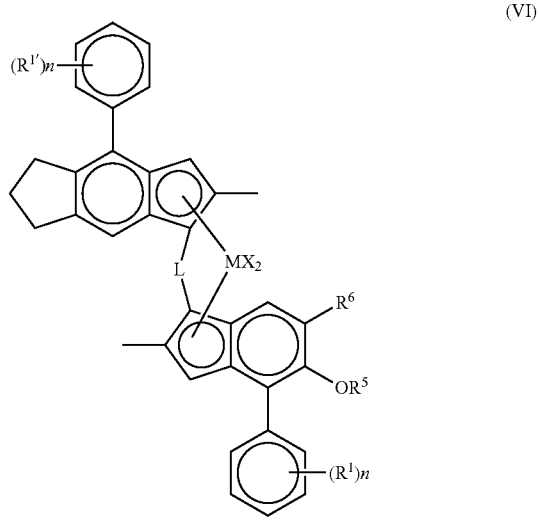

(VI)

wherein

M is Hf or Zr;

X is a hydrogen atom, a halogen atom, C$_{1-6}$ alkoxy group, C$_{1-6}$ alkyl, phenyl or benzyl group;

L is —SiMe$_2$;

each n is independently 1 or 2;

R[1] and R[1'] are each independently the same or different and are a linear or branched $C_1$-$C_6$-alkyl group, wherein at least one of the C(4) or C(4') phenyl rings is 3,5-dimethyl phenyl or 4-(tert-butyl)-phenyl;

R[5] is a linear $C_1$-$C_4$-alkyl group such as methyl; and

R[6] is tert butyl.

7. The complex according to claim 1, wherein the complex is of formula (VII)

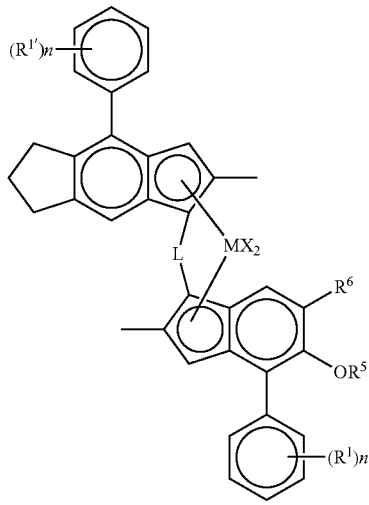

(VII)

wherein:

M is Hf or Zr;

X is a hydrogen atom, a halogen atom, $C_{1-6}$ alkoxy group, $C_{1-6}$ alkyl, phenyl or benzyl group, especially chlorine;

L is —SiMe$_2$;

each n is independently 1 or 2;

R[1] and R[1'] are each independently the same or can be different and are a linear or branched $C_1$-$C_4$-alkyl group, wherein at least one of the C(4) or C(4') phenyl rings is 3,5-dimethyl phenyl or 4-(tert-butyl)-phenyl;

R[5] is methyl; and

R[6] is tert butyl.

8. The complex according to claim 1, wherein the complex is of formula (VIII)

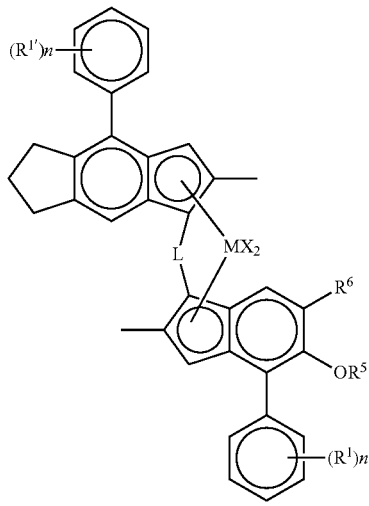

(VIII)

wherein:

M is Hf or Zr;

X is Cl;

L is —SiMe$_2$;

each n is independently 1 or 2;

R[1] and R[1'] are each independently methyl or tert butyl, wherein at least one of the C(4) or C(4') phenyl rings is 3,5-dimethyl phenyl or 4-(tert-butyl)-phenyl;

R[5] is methyl; and

R[6] is tert butyl.

9. The complex according to claim 1, wherein at least one of the C(4) or C(4') phenyl rings is 3,5-dimethyl phenyl.

10. The complex according to claim 1, wherein at least one of the C(4) or C(4') phenyl rings is 4-(tert-butyl)-phenyl.

11. The complex according to claim 1, wherein R[1], R[1'] and each value of n are selected such that the C(4) or C(4') phenyl rings are 3,5-dimethyl phenyl, 3,5-ditertbutylphenyl and/or 4-(tert-butyl)-phenyl.

12. A catalyst system comprising:
(i) the complex according to claim 1; and
(ii) a cocatalyst.

13. The catalyst system according to claim 12, wherein the cocatalyst comprises a boron containing cocatalyst, an Al cocatalyst, or both Al and B cocatalysts.

14. The catalyst system as claimed in claim 12, wherein the catalyst system is in solid form.

15. The catalyst system as claimed in claim 14, wherein the catalyst system is supported on silica.

16. A process for the manufacture of the catalyst system as claimed in claim 12, said catalyst system comprising obtaining the complex (i) as claimed in claim 11 and the cocatalyst (ii);

said process comprising forming a liquid/liquid emulsion system, which comprises a solution of catalyst system components (i) and (ii) dispersed in a solvent in the form of dispersed droplets, and solidifying said dispersed droplets to form solid particles of said catalyst system.

17. The process as claimed in claim 16, the process further comprising off line prepolymerisation of the catalyst.

18. A process for the preparation of a polypropylene homopolymer, a propylene-ethylene copolymer, or a propylene C4-10 alpha olefin copolymer the process comprising polymerising propylene, propylene and ethylene or propylene and a C4-10 alpha olefin, in the presence of the catalyst system according to claim 12.

19. A process for the preparation of a heterophasic polypropylene copolymer comprising:
(I) polymerising propylene in bulk in the presence of the catalyst system as claimed in claim 12 to form a polypropylene homopolymer matrix;
(II) in the presence of said matrix and said catalyst system and in the gas phase, polymerising propylene and ethylene to form a heterophasic polypropylene copolymer comprising a homopolymer matrix and an ethylene propylene rubber (EPR).

20. A process for the preparation of a heterophasic polypropylene copolymer comprising:
(I) polymerising propylene in bulk in the presence of the catalyst system as claimed in claim 12 to form a polypropylene homopolymer;
(II) in the presence of said homopolymer and said catalyst and in the gas phase, polymerising propylene to form a polypropylene homopolymer matrix;
(III) in the presence said matrix and said catalyst system and in the gas phase, polymerising propylene and ethylene to form a heterophasic polypropylene copolymer comprising a homopolymer matrix and an ethylene propylene rubber (EPR).

21. The process as claimed in claim 19, wherein which the EPR component is fully soluble in xylene at room temperature.

22. The process as claimed in claim 19, wherein the iV of the EPR is above 2.0 dL/g when measured in decaline.

23. The process as claimed in claim 19, wherein the Mw/Mn of the polypropylene homopolymer matrix component, as measured by GPC, is broader than 3.5.

24. The process as claimed in claim 19, wherein the Mw/Mn of the polypropylene homopolymer matrix component, as measured by GPC, is 4.0 to 8.0.

* * * * *